(12) United States Patent
Iwanaka et al.

(10) Patent No.: US 7,931,555 B2
(45) Date of Patent: Apr. 26, 2011

(54) HYBRID DRIVE DEVICE

(75) Inventors: Makoto Iwanaka, Anjo (JP); Shigeki Takami, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 919 days.

(21) Appl. No.: 11/802,741

(22) Filed: May 24, 2007

(65) Prior Publication Data

US 2007/0275808 A1    Nov. 29, 2007

(30) Foreign Application Priority Data

May 25, 2006    (JP) .............................. 2006-145570

(51) Int. Cl.
*F16H 3/72*    (2006.01)
(52) U.S. Cl. .......................... 475/5; 475/282
(58) Field of Classification Search ................. 475/150, 475/282, 288, 904; 903/911
See application file for complete search history.

(56) References Cited

U.S. PATENT DOCUMENTS

| | | | |
|---|---|---|---|
| 5,433,282 A * | 7/1995 | Moroto et al. ........... | 180/65.21 |
| 5,730,675 A | 3/1998 | Yamaguchi | |
| 6,837,816 B2 * | 1/2005 | Tsai et al. ...................... | 475/5 |

FOREIGN PATENT DOCUMENTS

| | | |
|---|---|---|
| JP | A-8-183356 | 7/1996 |
| JP | A 2005-206136 | 8/2005 |
| JP | A-2005-238898 | 9/2005 |
| JP | A-2006-77857 | 3/2006 |

* cited by examiner

*Primary Examiner* — Edwin A Young
(74) *Attorney, Agent, or Firm* — Oliff & Berridge, PLC

(57) ABSTRACT

A hybrid drive apparatus includes an engine; an input shaft that is connected to the engine; an output shaft that is connected to wheels; a rotary electric machine; a first planetary gear apparatus; and a second planetary gear apparatus. In an electric torque converter mode, the first planetary gear apparatus reduces an absolute value of a rotational speed of the rotary electric machine and transfers a first resulting rotational speed to the second planetary gear apparatus, and the second planetary gear apparatus combines the first resulting rotational speed and a rotation of the input shaft, reduces an absolute value of a rotational speed of the input shaft, and transmits a second resulting rotational speed to the output shaft.

24 Claims, 23 Drawing Sheets

F I G. 1
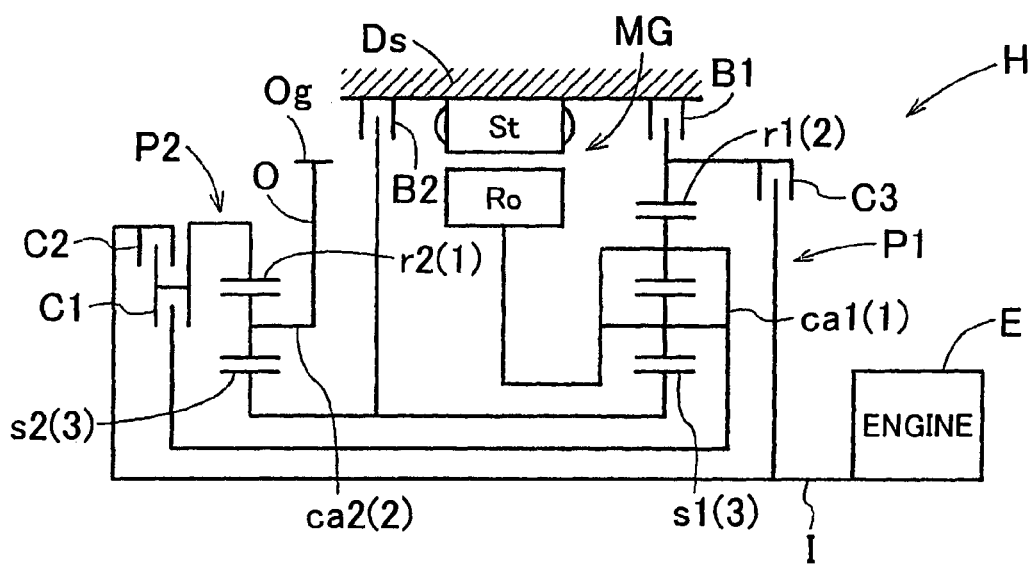

| MODE | | ENGAGEMENT ELEMENT | C1 | C2 | C3 | B1 | B2 |
|---|---|---|---|---|---|---|---|
| ELECTRIC TRAVEL | 1st | | O | | | O | |
| | 2nd | | O | | | | O |
| ELECTRIC TORQUE CONVERTER | | | | O | | O | |
| PARALLEL | 1st | | O | O | | O | |
| | 2nd | | O | O | | | O |
| | 3rd | | O | O | O | | |
| | 4th | | O | | O | | O |

- ○ : MOTOR-GENERATOR
- △ : INPUT SHAFT (ENGINE)
- ☆ : OUTPUT SHAFT
- × : BRAKE

- ○ : MOTOR-GENERATOR
- △ : INPUT SHAFT (ENGINE)
- ☆ : OUTPUT SHAFT
- × : BRAKE

| MODE | ENGAGEMENT ELEMENT | C1 | C2 | C3 | C4 | B1 | B2 | B3 |
|---|---|---|---|---|---|---|---|---|
| ELECTRIC TRAVEL | 1st | O | | | | O | | |
| | 2nd | O | | | | | | O |
| | 3rd | O | | | | | O | |
| ELECTRIC TORQUE CONVERTER | | | O | | | O | | |
| PARALLEL | 1st | O | O | | | O | | |
| | 2nd | O | O | | | | | O |
| | 3rd | O | O | | | | O | |
| | 4th | O | O | O | | | | |
| | 5th | O | | O | | | O | |
| | 6th | O | | O | | | | O |
| | REV | O | | | O | O | | |

| MODE | | ENGAGEMENT ELEMENT | C1 | C2 | C3 | B1 | B2 |
|---|---|---|---|---|---|---|---|
| ELECTRIC TRAVEL | 1st | | O | | | | O |
| | 2nd | | O | | | O | |
| ELECTRIC TORQUE CONVERTER | | | | O | | O | |
| ENGINE TRAVEL | 1st | | | O | | O | O |
| PARALLEL | 1st | | O | O | | | O |
| | 2nd | | O | O | | O | |
| | 3rd | | O | O | O | | |
| | 4th | | O | | | O | O |

| MODE | ENGAGEMENT ELEMENT | C1 | C2 | C3 | B1 | B2 | B3 |
|---|---|---|---|---|---|---|---|
| ELECTRIC TRAVEL | 1st | O | | | | | O |
| | 2nd | O | | | | O | |
| | 3rd | O | | | O | | |
| ELECTRIC TORQUE CONVERTER | | | O | | O | | |
| ENGINE TRAVEL | 1st | | O | | O | | O |
| | 2nd | | O | | O | O | |
| PARALLEL | 1st | O | O | | | | O |
| | 2nd | O | O | | | O | |
| | 3rd | O | O | | O | | |
| | 4th | O | O | O | | | |
| | 5th | O | | O | O | | |
| | 6th | O | | O | | O | |

○: MOTOR-GENERATOR
△: INPUT SHAFT (ENGINE)
☆: OUTPUT SHAFT
×: BRAKE

○: MOTOR-GENERATOR
△: INPUT SHAFT (ENGINE)
☆: OUTPUT SHAFT
×: BRAKE

HYBRID DRIVE DEVICE

INCORPORATION BY REFERENCE

The disclosure of Japanese Patent Application No. 2006-145570 filed on May 25, 2006, including the specification, drawings, and abstract, is incorporated herein by reference in its entirety.

BACKGROUND

The present invention relates to hybrid drive apparatuses.

Japanese Patent Application Publication No. JP-A-2005-206136 (FIG. 17), for example, discloses a structure shown in FIG. 42 in which a hybrid drive apparatus has a state in which it functions as an electric torque converter. This hybrid drive apparatus is provided with an input shaft I that is connected to an engine, an output shaft O that is connected to wheels, a first rotary electric machine M1, a second rotary electric machine M2, a power distribution mechanism SP that includes a double pinion planetary gear apparatus PG, and an automatic transmission AT that is serially connected via the transfer member T between the power distribution mechanism SP and the output shaft O. Here, as rotating elements, the planetary gear apparatus PG is provided with a sun gear ss, carrier cas that supports a plurality of pinion gears that mesh together, and a ring gear rs that meshes with the sun gear ss via the pinion gears. In addition, the carrier cas is connected to the input shaft I and the engine (not illustrated), the sun gear ss is connected to the first rotary electric machine M1, and the ring gear rs is connected to the transfer member T and the second rotary electric machine M2. In addition, a switching brake B0 is provided between the sun gear ss and the transmission case Ds, and a switching clutch C0 is provided between the sun gear ss and the carrier cas. When the switching clutch C0 and the switching brake B0 are released, the planetary gear apparatus PG functions as a continuously variable transmission having a gear change ratio that changes continuously.

Here, because the planetary gear apparatus PG is of a double pinion type, the order of the rotational speeds is: the carrier cas, the ring gear rs, and the sun gear ss. Therefore, when the first rotary electric machine M1 that is connected to the sun gear ss functions as a reaction force point on the rotational torque of the input shaft I (engine), the rotation of the input shaft I (engine) that is connected to the carrier cas is reduced and transferred to the ring gear rs. In addition, the rotation of this ring gear rs is transferred to the automatic transmission AT side via the transfer member T, and it is output from the output shaft O. Here, where $\lambda$ denotes the gear ratio of the planetary gear apparatus PG (the ratio of the number of teeth of the sun gear ss and the ring gear rs= [number of teeth on the sun gear ss]/[number of teeth on the ring gear rs]), the relationship engine torque: output torque of the planetary gear apparatus: torque of the first rotary electric machine=$(1-\lambda):1:\lambda$ is established. Therefore, for example, when the gear ratio $\lambda=0.5$ approximately, a torque that is approximately twice the engine torque is output from the carrier cas because the first rotary electric machine M1 distributes a torque that is equivalent to the engine torque. In addition, it is possible to start the vehicle smoothly by using the output torque that is approximately $1/(1-\lambda)$ times the engine torque because the reaction force is increased by gradually increasing the torque of the first rotary electric machine M1. Thereby, this planetary gear apparatus PG functions as an electric torque converter that starts a vehicle while multiplying and outputs a rotational torque of the engine by using the torque of the first rotary electric machine M1.

SUMMARY

In the hybrid drive apparatus described above, the rotational torque that is generated by the first rotary electric machine M1 becomes a reaction force with respect to the rotational torque of the input shaft I (engine) in the planetary gear apparatus PG. Therefore, the upper limit of the rotational torque that can be transferred to the transfer member T side, that is, to the output shaft O side, from the planetary gear apparatus PG, is determined by the upper limit of the rotational torque that is generated by the first rotary electric machine M1 and the gear ratio $\lambda$ of the planetary gear apparatus PG. Here, when the upper limit of the rotational torque that can be transferred to the output shaft O side is increased by decreasing the gear ratio $\lambda$ of the planetary gear apparatus PG, the multiplication factor of the engine torque generated when the hybrid drive apparatus functions as the electric torque converter decreases. Thus, in order to enable the transfer of a large rotational torque without changing the multiplication factor of the engine torque to the output shaft O side, a rotary electric machine that has a large output torque must be used as the first rotary electric machine M1. However, there are the disadvantages in that a rotary electric machine that has a large output torque has a large shape, and is heavy and expensive and the like.

In consideration of the problems described above, the disclosure provides, among other things, a hybrid drive apparatus that functions as an electric torque converter and enables the transfer of a large rotational torque to the output shaft side even when a rotary electric machine is used that has a comparatively small output torque.

The hybrid drive apparatus according to an exemplary aspect of the invention includes an engine; an input shaft that is connected to the engine; an output shaft that is connected to wheels; a rotary electric machine; a first planetary gear apparatus; and a second planetary gear apparatus. In an electric torque converter mode, the first planetary gear apparatus reduces an absolute value of a rotational speed of the rotary electric machine and transfers a first resulting rotational speed to the second planetary gear apparatus, and the second planetary gear apparatus combines the first resulting rotational speed and a rotation of the input shaft, reduces an absolute value of a rotational speed of the input shaft, and transmits a second resulting rotational speed to the output shaft.

The hybrid drive apparatus according to an exemplary aspect of the invention includes an engine; an input shaft that is connected to the engine; an output shaft that is connected to wheels; a rotary electric machine; a first planetary gear apparatus; and a second planetary gear apparatus. The first planetary gear apparatus and the second planetary gear apparatus each comprise at least three rotating elements, which are, in order of rotational speed, a first rotating element, a second rotating element, and a third rotating element. In the first planetary gear apparatus, the first rotating element is connected to the rotary electric machine, the second rotating element is held stationary on a non-rotating member, and in this state, a gear ratio is set such that an absolute value of a rotational speed of the third rotating element is reduced with respect to an absolute value of a rotational speed of the first rotating element. In the second planetary gear apparatus, the first rotating element is connected to the input shaft, the second rotating element is connected to the output shaft, and the third rotating element is connected to the third rotating element of the first planetary gear apparatus.

The hybrid drive apparatus according to an exemplary aspect of the invention includes an engine; an input shaft that is connected to the engine; an output shaft that is connected to wheels; a rotary electric machine; a first planetary gear apparatus; and a second planetary gear apparatus. The first planetary gear apparatus and the second planetary gear apparatus each comprise at least three rotating elements, which are, in order of rotational speed, a first rotating member, a second rotating element, and a third rotating element. In the first planetary gear apparatus, the first rotating element is connected to the rotary electric machine, and the third rotating element is held stationary on a non-rotating member. In the second planetary gear apparatus, the first rotating element is connected to the input shaft, the second rotating element is connected to the output shaft, and the third rotating element is connected to the second rotating element of the first planetary gear apparatus.

BRIEF DESCRIPTION OF THE DRAWINGS

Various exemplary aspects will be described with reference to the drawings, wherein:

FIG. 1 is a skeletal diagram of the hybrid drive apparatus according to a first embodiment of the present invention;

DETAILED DESCRIPTION OF EMBODIMENTS

First Embodiment

Figure 2:
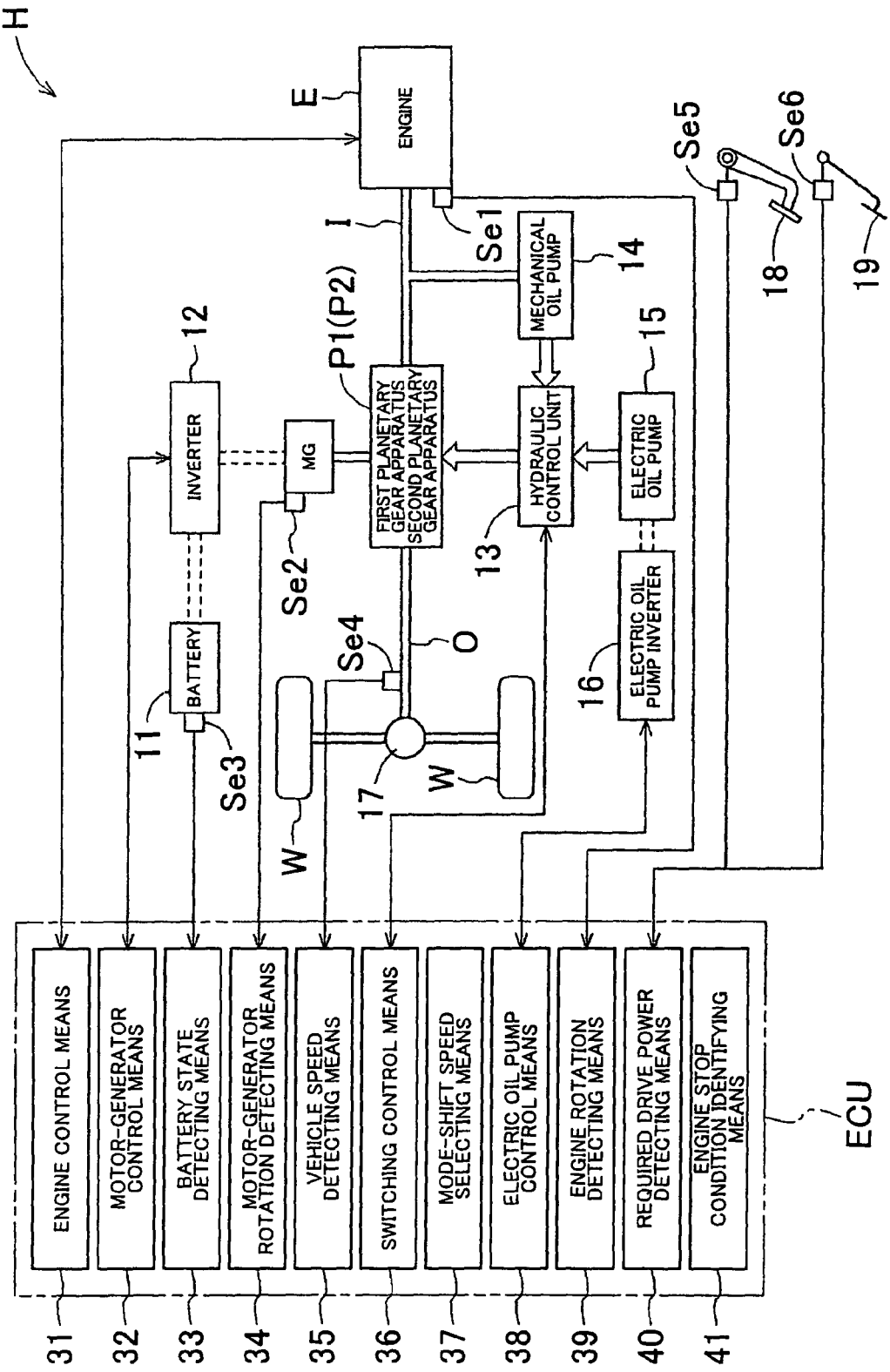
FIG. 2 is a system structure diagram of the drive apparatus for a hybrid vehicle according to the first embodiment.

First, a first embodiment of the present invention will be explained with reference to the drawings. FIG. 1 is a skeletal diagram showing the structure of a hybrid drive apparatus H according to the present embodiment. In addition, FIG. 2 is a schematic drawing showing the system structure of the hybrid drive apparatus H according to the present embodiment. Note that in FIG. 2, the double solid lines show the transfer paths of the drive power, the double broken lines show the transmission paths of the electric power, and the wide arrows show the flow of the lubricating oil. In addition, the solid arrows show the transmission paths for each type of information. As shown in these figures, the hybrid drive apparatus H is provided with an input shaft I that is connected to the engine E, an output shaft O that is connected to wheels W, a motor-generator MG, a first planetary gear apparatus P1, and a second planetary gear apparatus P2. In addition, these structures are accommodated in a drive apparatus transmission case Ds (below, simply referred to as a "transmission case Ds") that serves as a non-rotating member that is fastened to the vehicle. Note that the motor-generator corresponds to the "rotary electric machine" in the present invention. The structure of each of the components of the hybrid drive apparatus H As shown in FIG. 1, the input shaft I is connected to the engine E. Here, it is possible to use well-known types of engine, such as a gasoline engine or a diesel engine, as the engine E. In the present example, the input shaft I is integrally connected to the output rotating shaft of the crankshaft of the engine E or the like. Note that it is also advantageous to use a structure in which the input shaft I is connected to the output rotating shaft of the engine E with a damper or a clutch or the like interposed therebetween. In the present embodiment, the output shaft O is integrally formed with the external gear Og. In addition, the output shaft O is connected so as to be able to transfer the rotating drive power to the wheels W via a gear train (not illustrated) that engages with the external gear Og or a differential apparatus 17 shown in FIG. 2, or the like.

The motor-generator MG includes a stator St that is attached to the transmission case Ds and a rotor Ro that is supported so as to rotate freely on the inner radial direction of this stator St. The rotor Ro of this motor-generator MG is connected to the carrier ca1 of the first planetary gear apparatus P1 so as to rotate integrally therewith. As shown in FIG. 2, the motor-generator MG is electrically connected to the battery 11, which serves as an accumulator, via an inverter 12. In addition, the motor-generator MG can both function as a motor that generates mechanical power by receiving a supply of electrical power and function as a generator that generates electrical power by receiving a supply of mechanical power. Specifically, the motor-generator MG carries out electrical power generation due to being rotationally driven by the rotation of the input shaft I due to the engine E or the rotation of the output shaft O due to the inertia of the vehicle during deceleration, and charges the battery 11. In addition, the motor-generator MG functions as a drive motor that assists the drive power for running the vehicle.

The first planetary gear mechanism P1 is structured by a double pinion planetary gear mechanism that is disposed coaxially to the input shaft I. Specifically, the planetary gear apparatus P1 includes as rotating elements a carrier ca1 that supports a plurality of sets of pinion gears and a sun gear s1 and a ring gear r1 that mesh with the respective pinion gears. The carrier ca1 is connected to the motor-generator MG so as to rotate integrally therewith. In addition, the ring gear r1 is selectively held stationary on the transmission case Ds via the first brake B1, and is selectively connected to the input shaft I via a third clutch C3. In addition, the sun gear s1 is connected to the sun gear s2 of the second planetary gear apparatus P2 so as to rotate integrally therewith. These sun gears s1 and s2 are selectively held stationary on the transmission case Ds via a second brake B2. In addition, the gear ratio of the first planetary gear apparatus P1 is set such that the absolute value of the rotational speed of the sun gear s1 is decreased with respect to the absolute value of the rotational speed of the carrier ca1 while the ring gear r1 is held stationary on the transmission case Ds by the first brake B1. In the present embodiment, the carrier ca1, the ring gear r1, and the sun gear s1 respectively correspond to the "first rotating element (1)", the "second rotating element (2)", and the "third rotating element (3)" of the first planetary gear apparatus P1 in the present invention.

The second planetary gear apparatus P2 is structured by a single pinion planetary gear mechanism that is disposed coaxially with the input shaft I. Specifically, the second planetary gear apparatus P2 includes as rotating elements a carrier ca2 that supports a plurality of pinion gears and a sun gear s2 and a ring gear r2 that mesh with the pinion gears. The ring gear r2 is selectively connected to the carrier ca1 of the first planetary gear apparatus P1 via a first clutch C1 and is selectively connected to the input shaft I via a second clutch C2. Specifically, in this ring gear r2, the rotation of the input shaft I is selectively transferred by a second clutch C2 and the rotation of the motor-generator MG is selectively transferred by a first clutch C1. In addition, the carrier ca2 is connected to the output shaft O so as to rotate integrally therewith. Additionally, the sun gear s2 is connected to the sun gear s1 of the first planetary gear apparatus P1 so as to rotate integrally therewith. As explained above, the sun gears s1 and s2 are selectively held stationary on the transmission case Ds via the second brake B2. In the present embodiment, the ring gear r2, the carrier ca2, and the sun gear s2 respectively correspond to the "first rotating element (1)", the "second rotating element (2)" and the "third rotating element (3)" of the second planetary gear apparatus P2 in the present invention.

As described above, the hybrid drive apparatus H is provided with, as friction engagement elements, the first clutch C1, the second clutch C2, the third clutch C3, the first brake B1, and the second brake B2. Either multi-plate clutches or multi-plate brakes that are hydraulically actuated can be used as these friction engagement elements. As shown in FIG. 2, the oil pressure that is supplied to these friction engagement elements is controlled by a hydraulic control apparatus 13, which is actuated by control instructions from the control apparatus ECU. The supply of working oil to this hydraulic control apparatus 13 is carried out by a mechanical oil pump 14 while the engine E is operating, and is carried out by the electric oil pump 15 while the engine E is stopped. Here, the mechanical oil pump 14 is driven by the rotating drive power of the input shaft I. In addition, the electric pump 15 is driven by electrical power (the transmission path is omitted from the figure) from the battery 11, which is supplied via an inverter 16 for an electric oil pump. Note that in FIG. 2, each of the friction engagement elements C1, C2, C3, B1, and B2 are assumed to be included in the first planetary gear apparatus P1 and the second planetary gear apparatus P2, and are omitted from the figure.

Figures 3, 4:
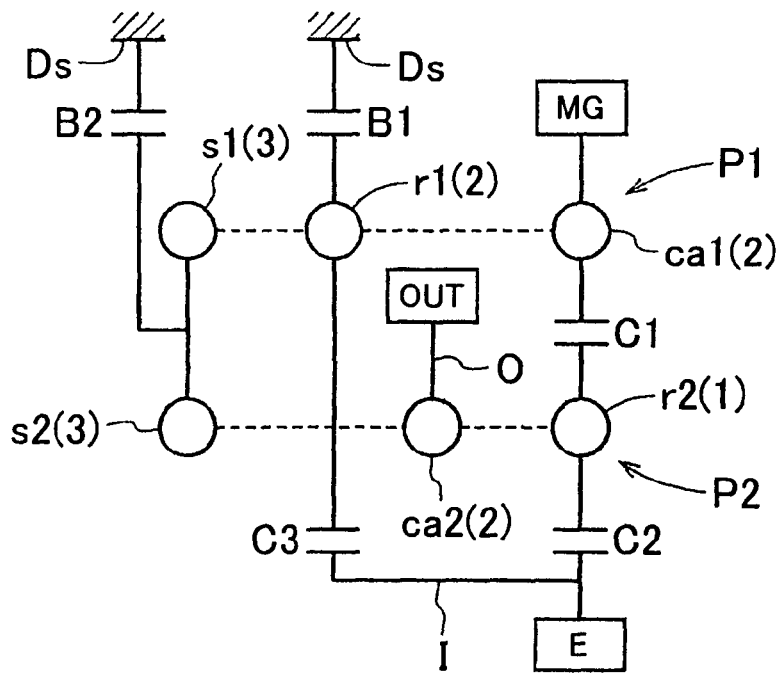
FIG. 3 is a schematic diagram representing the connection state of each of the essential components of the first embodiment.
FIG. 4 is a drawing that shows the operating diagram of the first embodiment.

FIG. 3 is a schematic diagram that is a simplified representation of the connection state of each of the essential structures of this hybrid drive apparatus H. In this drawing, each of the rotating elements of the first planetary gear apparatus P1 and the second planetary gear apparatus P2 are disposed horizontally in order of rotational speed and are shown connected by broken lines, and the essential elements that are connected to each of these rotating elements is shown connected by a solid line. As shown in the figure, the first planetary gear apparatus P1 includes, in order of rotational speed, a carrier ca1, a ring gear r1, and a sun gear s1. In addition, the second planetary gear apparatus P2 includes, in order of rotational speed, a ring gear r2, a carrier ca2, and a sun gear s2. Here, the sun gear s1 of the first planetary gear apparatus P1 and the sun gear s2 of the second planetary gear apparatus P2 are connected so as to rotate integrally.

In addition, the carrier ca1 of the first planetary gear apparatus P1 is connected to the motor-generator MG so as to rotate integrally therewith, and can be selectively connected to the ring gear r2 of the second planetary gear apparatus P2 via the first clutch C1. The ring gear r1 of the first planetary gear apparatus P1 can be selectively held stationary on the transmission case Ds via the first brake B1, and can be selectively connected to the input shaft I via the third clutch C3. The ring gear r2 of the second planetary gear apparatus P2 can be selectively connected to the carrier ca1 of the first planetary gear apparatus P1 via the first clutch C1, and can be selectively connected to the input shaft I via the second clutch C2. The carrier ca2 of the second planetary gear apparatus is connected to the output shaft O so as to rotate integrally therewith. In addition, the sun gear s1 of the planetary gear apparatus P1 and the sun gear s2 of the second planetary gear apparatus P2, which are connected together, can be selectively held stationary on the transmission case Ds via the second brake B2.

Structure of the Control System for the Hybrid Drive Apparatus H

In addition, as shown in FIG. 2, the control apparatus ECU carries out operation control of the engine E, the motor-generator MG, the friction engagement elements of the first planetary gear apparatus P1 and the second planetary gear apparatus P2 via the hydraulic control apparatus 13 and the electric oil pump 15 and the like by using information obtained by the sensors Se1 to Se6 that are provided on each of the components of the vehicle. In this example, examples of sensors include an engine rotational speed sensor Se1, a motor-generator rotational speed sensor Se2, a battery state detecting sensor Se3, a vehicle speed sensor Se4, an accelerator operation detecting sensor Se5, and a brake operation sensor Se6.

Here, the engine rotational speed sensor Se1 is a sensor for detecting the rotational speed of the output rotation shaft of the engine E. The motor-generator rotational speed sensor Se2 is a sensor for detecting the rotational speed of the rotor Ro of the motor-generator MG. The battery state detecting sensor Se3 is a sensor for detecting the state of the state of charge of the battery 11. The vehicle speed sensor Se4 is a sensor for detecting the rotational speed of the output shaft O in order to detect the vehicle speed. The accelerator operation detecting sensor Se5 is a sensor for detecting the amount of operation of the accelerator pedal 18. The brake operation detecting sensor Se6 is a sensor for detecting the amount of operation of the brake pedal 19 that links to the wheel brakes (not illustrated).

In addition, the control apparatus ECU is provided with engine control means 31, motor-generator control means 32, battery state detecting means 33, motor-generator rotation detecting means 34, vehicle speed detecting means 35, switching control means 36, mode-shift speed selecting means 37, electric oil pump control means 38, engine rotation detecting means 39, required drive power detecting means 40, and engine stop condition identifying means 41. Each of these means in the control apparatus ECU are structured such that an arithmetic processing apparatus such as a CPU serves as a core member, and the functional units for carrying out various types of processing on the input data are implemented by hardware, software (programs), or both. It is to also be understood that the terms "means," "device," "apparatus," and like terms are to be considered synonyms, and are thus interchangeable.

The engine control means 31 carries out operation controls such as starting and stopping the operation, the rotational speed control, and the output torque control of the engine. The motor-generator control means 32 carries out control such as the rotational speed control and the rotational torque control of the motor-generator MG via the inverter 12. The battery state detecting means 33 detects the state of charge of the battery 11 based on the output of the battery state detecting sensor Se3. The motor-generator rotation detecting means 34 detects the rotational speed of the motor-generator MG based on the output of the motor-generator rotational speed sensor Se2. The vehicle speed detecting means 35 detects the vehicle speed based on the output of the vehicle speed sensor Se4. The switching control means 36 carries out the engagement and disengagement of each of the friction engagement elements C1, C2, C3, B1 and B2 of the hybrid drive apparatus H and carries out control in which the operating mode and shift speed of the hybrid drive apparatus H are switched by controlling the operation of the hydraulic control apparatus 13 according to the operating mode and the shift speed that has been selected by the mode-shift speed selecting means 37.

Figure 6:
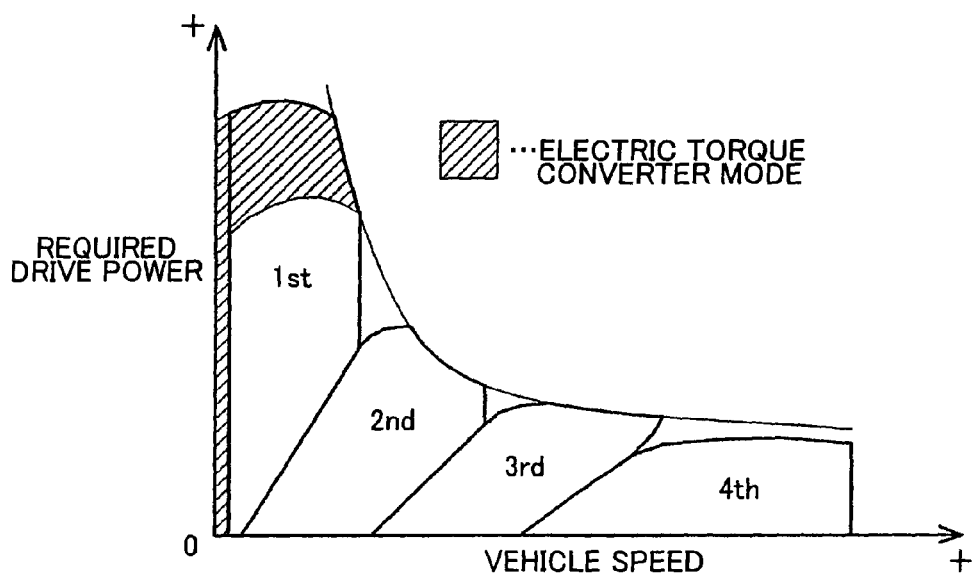
FIG. 6 is a diagram showing an example of a control map of the first embodiment.

The mode-shift speed selecting means 37 carries out the selection of the operating mode and the shift speed according to a control map such as that shown in FIG. 6. FIG. 6 is a diagram that shows an example of the control map that regulates the relationship between the speed of the vehicle (vehicle speed), the required drive power, and the assigned range of each of the shift speeds of the electric torque converter mode and the parallel mode. In this diagram, the abscissa axis is the vehicle speed and the ordinate is the required drive power. The mode-shift speed selecting means 37 carries out the selection of an appropriate operating mode and shift speed according to this map depending on the vehicle speed and the required drive power. Specifically, the mode-shift speed selecting means 37 obtains information about the vehicle speed from the vehicle speed detecting means 35. In addition, the mode-shift speed selecting means 37 obtains information about the required drive power from the required drive power detecting means 40. In addition, the mode-shift speed selecting means 37 selects the operating mode and the shift speed that are regulated according to the obtained vehicle speed and the required drive power according to the control map shown in FIG. 6. Specifically, the mode-shift speed selecting means 37 selects the electric torque converter mode when the vehicle is accelerating from a standstill or when the vehicle speed is extremely low. In addition, in states other than these, the mode-shift speed selecting means 37 selects each of the shift speeds of the parallel mode and electric travel mode depending on the vehicle speed and the required drive power and the like. Note that the electric travel mode is selected in the case in which the engine stop condition identifying means 41 has identified that the engine stop conditions have been satisfied.

The electric oil pump control means 38 carries out operating control of the electric oil pump 15 via the electric oil pump inverter 16. The engine rotation detecting means 39 detects the rotational speed of the output rotation shaft of the engine E based on the output from the engine rotational speed sensor Se1. The required drive power detecting means 40 calculates and obtains the drive power required by the driver based on the output from the accelerator operation detecting sensor Se5 and the brake operation detecting sensor Se6. The engine stop condition identifying means 41 carries out the identification of whether or not the engine stop conditions have been satisfied. Here, the engine stop conditions are stipulated as representing a state in which stopping the engine E is appropriate due to a combination of various types of conditions, such as the vehicle speed, the required drive power, the state of charge of the battery 11, the cooling water temperature, the lubricating oil temperature, the exhaust catalyst temperature, and the amount of time that has elapsed from the start-up of the engine and the like.

The Operating Modes of the Hybrid Drive Apparatus H

Figure 5:
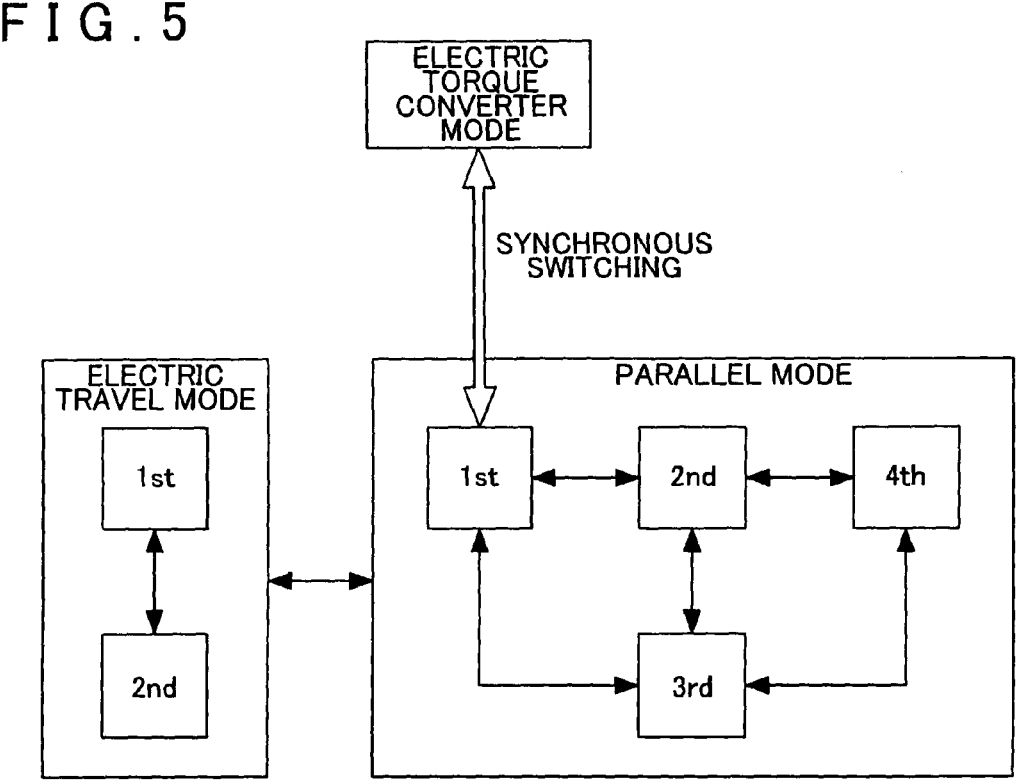
FIG. 5 is a diagram that shows the relationship between the operating modes and the shift speeds available for switching of the first embodiment.

Next, the operating modes that can be realized by the hybrid drive apparatus H according to the present embodiment will be explained. FIG. 4 is an operating diagram that shows a plurality of operating modes and the operating state of each of the friction engagement elements C1, C2, C3, B1, and B2 at one or more shift speeds that are provided for each of the operating modes. In this figure, an O represents the state in which each of the friction engagement elements is engaged, and a blank represents a state in which each of the friction engagement elements is disengaged. In addition, FIG. 5 is a drawing that shows the relationships between the operating modes to which the hybrid drive apparatus H can be switched and the shift speeds. Note that the wide arrows in the figure show the relationship in which synchronous switching is possible. FIG. 6 is a drawing that shows an example of the control map that is used for carrying out the selection of the operating mode and the shift speed in the mode-shift speed selection means 37 described above.

Figure 7:
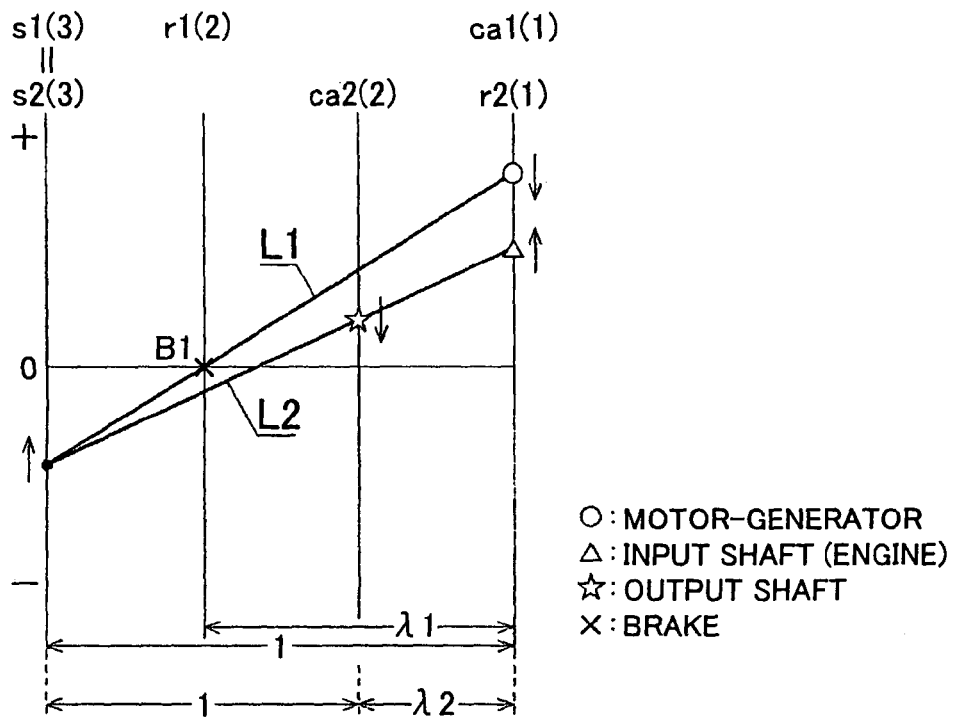
FIG. 7 is a velocity diagram for the electric torque converter mode of the first embodiment.
Figure 8:
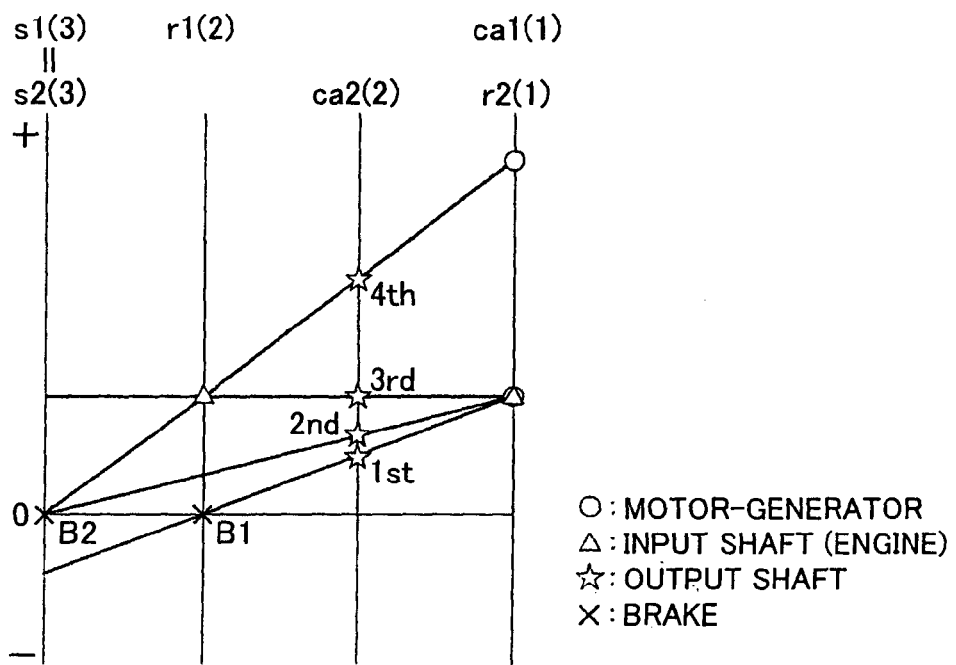
FIG. 8 is a velocity diagram for the parallel mode of the first embodiment.

In addition, FIG. 7 and FIG. 8 show velocity diagrams of the first planetary gear apparatus P1 and the second planetary gear apparatus P2, where FIG. 7 shows the velocity diagram for the electric torque converter mode and FIG. 8 shows the velocity diagram for the parallel mode. Note that "1st" and "2nd" in FIG. 8 are the same as the velocity diagram for the electric travel mode. In these velocity diagrams, the ordinates correspond to the rotational speeds of each of the rotating elements. Specifically, the "0" on an ordinate indicates that the rotational speed is nil, and the portion of the ordinate above the "0" is positive and the portion of the ordinate below "0" is negative. In addition, each of the plurality of ordinates that are disposed in parallel corresponds to each of the rotating elements of the first planetary gear apparatus P1 and the second planetary gear apparatus P2. That is, "ca1", "r1", and "s1" shown above the ordinates respectively correspond to the carrier ca1, the ring gear r1, and the sun gear s1 of the first planetary gear apparatus P1, and "r2", "c2", and "s2" shown above the ordinates respectively correspond to the ring gear r2, the carrier ca2, and the sun gear s2 of the second planetary gear apparatus P2. In addition, the gaps between the ordinates that correspond to each of the rotating elements correspond to the gear ratios of the first planetary gear apparatus P1 and the second planetary gear apparatus P2. In addition, in FIG. 7, the straight line L1 shows the operating state of the first planetary gear apparatus P1, and the straight line L2 shows the operating state of the second planetary gear apparatus P2. In addition, in FIG. 8, each of the straight lines shows the operating states of the first planetary gear apparatus P1 and the second planetary gear apparatus P2 at each of the shift speeds. Note that in these velocity diagrams, "○" shows the rotational speed of the motor-generator MG, "Δ" shows the rotational speed of the input shaft I (engine E), "☆" shows the rotational speed of the output shaft O, and "x" shows the brake.

Note that in FIG. 4 to FIG. 8, "1st" and "2nd" respectively show the first forward speed and the second forward speed of the parallel mode and the electric travel mode. In addition, "3rd" and "4th" respectively show the third forward speed and the fourth forward speed of the parallel mode.

As shown in FIG. 4 to FIG. 8, this hybrid drive apparatus H is structured so as to be able to switch between three operating modes, that is, the "electric torque converter mode", the "parallel mode", and the "electric travel mode" by using one motor-generator MG. In addition, this hybrid drive apparatus H includes four shift speeds in the parallel mode and two shift speeds in the electric travel mode. In addition, the switching of these operating modes and the shift speeds within these operating modes is carried out by engaging and disengaging each of the friction engagement elements C1, C2, C3, B1, and B2 by controlling the hydraulic control apparatus 13 by the control instructions from the switching control means 36 of the control apparatus ECU. At this time, the switching control means 36 outputs the control instructions to the hydraulic control apparatus 13 according to the results of the selection of the operating mode and the shift speed that has been carried out by the mode-shift speed selection means 37 according to control map shown in FIG. 6. Note that at this time, the control apparatus ECU also carries out control of the rotational speed and the rotational torque of the motor-generator MG and the control of the rotational speed and rotational torque of the engine E and the like. Below, the operating states of the hybrid drive apparatus H in each of the operating modes will be explained in detail.

Electric Torque Converter Mode

The electric torque converter mode is a mode in which the vehicle can be started while multiplying and outputting the rotational torque of the input shaft I (engine E) by using the rotational torque of the motor-generator MG. As shown in FIG. 4, in this electric torque converter mode, the second clutch C2 and the first brake B1 are engaged. Thereby, the ring gear r1 of the first planetary gear apparatus P1 is held stationary on the transmission case Ds, and the ring gear r2 of the second planetary gear apparatus P2 is connected to the input shaft I so as to rotate integrally therewith.

At this time, as shown in FIG. 7 as L1, in the first planetary gear apparatus P1, the rotational speed of the ring gear r1, which is intermediate in the order of rotational speed, becomes nil. Therefore, the sun gear s1 rotates in a direction that is opposite to the rotation of the carrier ca1, which is connected to the motor-generator MG so as to rotate integrally therewith. Here, because the motor-generator MG, similar to the input shaft I (engine E), is positively rotating (the rotational speed is positive), the sun gear s1 undergoes a negative rotation (the rotational speed is negative). In addition, at this time, the gear ratio $\lambda 1$ of the planetary gear apparatus P1 (the ratio of the number of teeth of the sun gear s1 to the ring gear r1=[number of teeth in the sun gear s1]/[number of teeth in the ring gear r1]) is set such that the absolute value of the rotational speed of the sun gear s1 is reduced with respect to the absolute value of the rotational speed of the carrier ca1. That is, in the present embodiment, the first planetary gear apparatus P1 is of a double pinion type, and the relationships of the gear ratio $\lambda 1$ is shown in the lower part of FIG. 7. Therefore, because the absolute value of the rotational speed of the sun gear s1 is reduced with respect to the absolute value of the rotational speed of the carrier ca1, the gear ratio $\lambda 1$ may be set larger than 0.5. Note that setting this gear ratio $\lambda 1$ to, for example, about 0.55 to 0.65 is more advantageous. Here, the sun gear s1 of the first planetary gear apparatus P1 and the sun gear s2 of the second planetary gear apparatus P2 are connected so as to rotate integrally. Therefore, the first planetary gear apparatus P1 reduces the absolute value of the rotational speed of the motor-generator MG and transfers the resulting rotational speed to the sun gear s2 of the second planetary gear apparatus P2. Thereby, the rotational torque of the motor-generator MG, which has been multiplied depending on the gear change ratio due to the first planetary gear apparatus P1, is transferred to the sun gear s2 of the second planetary gear apparatus P2. Specifically, at this first planetary gear apparatus P1, a relationship is obtained in which: rotational torque of the carrier ca1 (motor-generator MG): rotational torque of the ring gear r1: rotational torque of the sun gear s1=$(1-\lambda 1):1:\lambda 1$. Therefore, for example, in the case in which the gear ratio $\lambda 1$ of the first planetary gear apparatus P1 is 0.6 approximately, a rotational torque that is about 1.5 times the rotational torque of the motor-generator MG is transferred to the sun gear s2 of the second planetary gear apparatus P2 via the sun gear s1.

In addition, as shown in FIG. 7 as L2, in the second planetary gear apparatus P2, the carrier ca2, which is intermediate in the order of rotational speed, rotates integrally with the output shaft O, and the ring gear r2, which is at one side in the order of rotational speed, rotates integrally with the input shaft I. In addition, the rotation of the motor-generator MG, which has been reduced by the first planetary gear apparatus P1 as described above, is transferred to the sun gear s2, which is at the other side in the order of rotational speed. Therefore, the second planetary gear apparatus P2 combines the rotation of the motor-generator MG, which has been reduced, and the rotation of the input shaft I (engine E) and transfers the resulting rotation to the output shaft O. Specifically, at the second planetary gear apparatus P2, the rotational torque of the motor-generator MG, which has been transferred to the sun gear s2 via the first planetary gear apparatus P1, acts as a reaction force on the rotational torque of the input shaft I (engine E) that is transferred to the ring gear r2, and thus, these rotational torques are combined and transferred to the output shaft O. At this time, because the sun gear s2, which rotates integrally with the sun gear s1 of the first planetary gear apparatus P1, rotates negatively, the ring gear r2, which rotates integrally with the engine E and the input shaft I, rotates positively, the absolute value of the rotational speed of the carrier ca2, which is intermediate in the order of rotational speed, is reduced with respect to the absolute value of the rotational speed of the ring gear r2. Therefore, the second planetary gear apparatus P2 reduces the absolute value of the rotational speed of the input shaft I and transfers the resulting rotational speed to the output shaft O. Thereby, the rotational torque of the input shaft I is multiplied and transferred to the output shaft O. Specifically, in the present embodiment, because the second planetary gear apparatus P2 is of a double pinion type, as shown in the lower part of FIG. 7, where: gear ratio of the second planetary gear apparatus P2 (ratio of number of teeth of sun gear s2 and ring gear r2=[number of teeth in sun gear s2]/[number of teeth in ring gear r2] is $\lambda 2$, the relationship is obtained in which: rotational torque of ring gear r2 (input shaft I):rotational torque of carrier ca2 (output shaft O):rotational torque of sun gear s2=1:(1+$\lambda 2$):$\lambda 2$. Therefore, in the case in which, for example, the gear ratio $\lambda 2$=0.33 approximately, a rotational torque of about ⅓ of the rotational torque of the ring gear r2 (input shaft I) is distributed to the sun gear (the multiplied rotational torque of the motor-generator MG), and thereby a rotational torque of about 1.33 times the rotational torque of the input shaft I (engine E) is transferred to the output shaft O. Note that this gear ratio $\lambda 2$ can be appropriately set by taking into consideration the characteristics of the engine E and the motor-generator MG, the vehicle weight, and the like.

In addition, the hybrid drive apparatus H functions as an electric torque converter by operating as follows. Specifically, when the vehicle is starting, by causing the positively rotating motor-generator MG to carry out power generation and gradually increasing the rotational torque in the negative direction, the rotational torque in the positive direction of the sun gear s2 of the negatively rotating second planetary gear apparatus P2 is gradually increased to make the reaction force large, and the rotational speed of this sun gear s2 is increased (i.e., the absolute value of the rotational speed in the negative direction is reduced). Thereby, the rotational speed of the carrier ca2 of the second planetary gear apparatus P2, which is connected to the output shaft O, is gradually increased, and it is possible to start the vehicle smoothly. At this time, it is possible to transfer an output torque that is approximately (1+$\lambda 2$) times the engine torque to the output shaft O. In addition, at this time, because the rotational torque of the motor-generator MG, which has been multiplied by the first planetary gear apparatus P1, acts as a reaction force, even in the case in which a motor-generator MG that has a comparatively small output torque is used, it is possible to obtain a sufficient reaction force. Note that the upward and downward arrows shown at the side of each of the rotating elements in FIG. 7 show the direction of the rotational torque of each of the rotating elements during such a start-up.

In addition, as shown in FIG. 5, the hybrid drive apparatus H according to the present embodiment is structured so as to enable synchronous switching, in which, when switching modes from the electric torque converter mode to the first forward speed of the parallel mode, the engagement of the first clutch C1 is carried out while the rotational speeds of the input-side rotating member and the output-side rotating member of the first clutch C1 are the same. Specifically, as shown in FIG. 1, in the present embodiment, while the second clutch C2 is engaged, the ring gear r2 of the second planetary gear apparatus P2, which rotates integrally with the input shaft I (engine E) and the carrier ca1 of the first planetary gear apparatus P1, which rotates integrally with the motor-generator MG, correspond to the input-side rotating member and the output-side rotating member of the first clutch C1. In addition, in the electric torque converter mode, by gradually increasing further the rotational torque of the motor-generator MG in the negative direction from the state shown in FIG. 7 to reduce the rotational speed, it is possible to make the rotational speed of the motor-generator MG and the rotational speed of the input shaft I match, as shown by the straight line that represents the state of the first forward speed in the velocity diagram in FIG. 8. In this state, because the rotational speed of the ring gear r2 of the second planetary gear apparatus P2 and the rotational speed of the carrier ca1 of the first planetary gear apparatus P1, which are the input-side rotating member and the output-side rotating member of the first clutch C1, match, it is possible to engage the first clutch C1 without generating shock or the like. In addition, as shown in FIG. 4, by engaging the first clutch C1, it is possible to switch from the electric torque converter mode to the first forward speed of the parallel mode, and therefore, it is possible to realize synchronous switching therebetween. Note that, in this manner, the state in which the rotational speed of the motor-generator MG and the rotational speed of the input shaft I match is realized by a process in which the rotational speed of the output shaft O is increased while traveling in the electric torque converter mode. That is, when the vehicle is accelerating from a standstill, it is possible to carry out synchronous switching from the electric torque converter mode to the first forward speed of the parallel mode. Thus, when switching these modes, it is possible to carrying out smooth switching without generating the shock that accompanies the engagement of the first clutch C1.

Parallel Mode

The parallel mode is a mode that enables travel by transferring both the rotational torque of the input shaft I (engine E) and the rotational torque of the motor-generator MG to the output shaft O. In the present embodiment, in the parallel mode, in addition to the plurality of shift speeds that are formed when the input shaft I and the motor-generator MG are directly linked, the hybrid drive apparatus H includes an accelerating shift speed in which the absolute value of the rotational speed of the input shaft I is increased and the resulting rotational speed is transferred to the output shaft O, and the absolute value of the rotational speed of the motor-generator MG is reduced and the resulting rotational speed is transferred to the output shaft O. Specifically, this hybrid drive apparatus H is structured so as to have, in the parallel mode, a first forward speed and a second forward speed that serve as decelerating shift speeds and are established by directly linking the input shaft I and the motor-generator MG; and similarly, a third forward speed that serves as a direct coupling speed and is established by directly linking the input shaft I and the motor-generator MG, and transfers the rotational speed of the input shaft I to the output shaft O at the same speed; and a fourth forward speed that serves as an accelerating shift speed that increases the absolute value of the rotational speed of the input shaft I and transfers the resulting rotational speed to the output shaft O and reduces the absolute value of the rotational speed of the motor-generator MG and transfers the resulting rotational speed to the output shaft O. Below, the operating state of the hybrid drive apparatus H at each of the shift speeds will be explained.

As shown in FIG. 4, in the first forward speed, the first clutch C1, the second clutch C2, and the first brake B1 are engaged. As shown in FIG. 5, the first forward speed can switch between the electric torque converter mode and the second forward speed and the third forward speed of the parallel mode. Specifically, the first forward speed is realized from the electric torque converter mode by engaging the first clutch C1. As described above, it is possible to carry out the switching from this electric torque converter mode to the first forward speed by using synchronous switching. In addition, the first forward speed is realized from the second forward speed by disengaging the second brake B2 and engaging the first brake B1. In addition, the first forward speed is realized from the third forward speed by disengaging the third clutch C3 and engaging the first brake B1. In addition, it is also possible switch between the parallel mode and the electric travel mode. Additionally, the first forward speed of the electric travel mode can be realized from the first forward speed of the parallel mode by disengaging the second clutch C2.

In addition, as shown in FIG. 1 and FIG. 8, in the first forward speed, by engaging the first clutch C1 and the second clutch C2, the input shaft I (engine E) and the motor-generator MG are directly linked to the ring gear r2 of the second planetary gear apparatus P2, and these rotate integrally. In addition, by engaging the first brake B1, the absolute value of the rotational speed of the ring gear r2 of the second planetary gear apparatus P2 is reduced, and the resulting rotational speed is transferred to the carrier ca2 of the second planetary gear apparatus P2 and output form the output shaft O. Among the plurality of shift speeds in the parallel mode, the gear change ratio of the first forward speed is set so as to be largest.

As shown in FIG. 4, in the second forward speed, the first clutch C1, the second clutch C2, and the second brake B2 are engaged. As shown in FIG. 5, the second forward speed can switch between the first forward speed, the third forward speed, and the fourth forward speed of the parallel mode. Specifically, the second forward speed can be realized from the first forward speed by disengaging the first brake B1 and engaging the second brake B2. In addition, the second forward speed can be realized from the third forward speed by disengaging the third clutch C3 and engaging the second brake B2. Additionally, the second forward speed can be realized from the fourth forward speed by disengaging the third clutch C3 and engaging the second clutch C2. In addition, it is possible to switch between the parallel mode and the electric travel mode. Additionally, the second forward speed of the electric travel mode is realized from the second forward speed of the parallel mode by disengaging the second clutch C2.

In addition, as shown in FIG. 1 and FIG. 8, in the second forward speed, similar to the first forward speed, by engaging the first clutch C1 and the second clutch C2, the input shaft I (engine E) and the motor-generator MG are directly linked to the ring gear r2 of the second planetary gear apparatus P2, and these rotate integrally. In addition, by engaging the second brake B2, the absolute value of the rotational speed of the ring gear r2 of the second planetary gear apparatus P2 is reduced, and the resulting rotational speed is transferred to the carrier ca2 of the second planetary gear apparatus P2 and output from the output shaft O. The gear change ratio of this second forward speed is set so as to be smaller than the first forward speed.

As shown in FIG. 4, in the third forward speed, the first clutch C1, the second clutch C2, and the third clutch C3 are engaged. As shown in FIG. 5, this third forward speed can switch between the first forward speed, the second forward speed, and the fourth forward speed of the parallel mode. Specifically, the third forward speed is realized from the first forward speed by disengaging the first brake B1 and engaging the third clutch C3. In addition, the third forward speed is realized from the second forward speed by disengaging the second brake B2 and engaging the third clutch C3. Additionally, the third forward speed is realized from the fourth forward speed by disengaging the second brake B2 and engaging the second clutch C2. Note that it is possible to switch between the parallel mode and the electric travel mode, but in the present example, it is not possible to switch directly from the third forward speed of this parallel mode to the electric travel mode. This is because the hybrid drive apparatus H of the present embodiment is structured such that a shift speed having a gear change ratio of 1 cannot be realized while the input shaft I (engine E) is separated. Therefore, when switching from the third forward speed of the parallel mode to the electric travel mode, control for switching to the electric travel mode is carried out after switching to the second forward speed or the fourth forward speed of the parallel mode. This control processing will be explained by using a flowchart in "1-6. Special control processing" below.

In addition, as shown in FIG. 1 and FIG. 8, in the third forward speed, similar to the first forward speed, by engaging the first clutch C1 and the second clutch C2, the input shaft I (engine E) and the motor-generator MG are directly linked to the ring gear r2 of the second planetary gear apparatus P2, and these rotate integrally. Furthermore, by engaging the third clutch C3, the first planetary gear apparatus P1 and the second planetary gear apparatus P2 are in a directly linked state in which the whole rotates integrally, and the rotational speed of the input shaft I and the motor-generator MG is transferred at the same speed to the output shaft O and output. Therefore, the gear change ratio of this third forward speed becomes 1.

As shown in FIG. 4, in the fourth forward speed, the first clutch C1, the third clutch C3, and the second brake B2 are engaged. As shown in FIG. 5, this fourth forward speed can switch between the second forward speed and the third forward speed of the parallel mode. Specifically, the fourth forward speed is realized from the second forward speed by disengaging the second clutch C2 and engaging the third clutch C3. In addition, this fourth forward speed can be realized from the third forward speed by disengaging the second clutch C2 and engaging the second brake B2. In addition, it is possible to switch between the parallel mode and the electric travel mode. Additionally, the second forward speed of the electric travel mode is realized from the fourth forward speed of the parallel mode by disengaging the third clutch C3.

In addition, as shown in FIG. 1 and FIG. 8, in the fourth forward speed, by engaging the first clutch C1, the motor-generator MG is directly linked to the ring gear r2 the second planetary gear apparatus P2, and these rotate integrally. In addition, by engaging the third clutch C3 and the second brake B2, the absolute value of the rotational speed of the input shaft I (engine E) is increased via the sun gear s1 of the first planetary gear apparatus P1, the resulting rotational speed is transferred to the carrier ca1 of the first planetary gear apparatus P1 and then it is transferred along with the rotation of the motor-generator MG to the ring carrier r2 of the second planetary gear apparatus P2 via the first clutch C1. Additionally, the absolute value of the rotational speed of the ring gear r2 of the second planetary gear apparatus P2 is reduced, and the resulting rotational speed is transferred to the carrier ca2 of the second planetary gear apparatus P2 and output from the output shaft O. At this time, the gear ratios of the first planetary gear apparatus P1 and the second planetary gear apparatus P2 are set such that the absolute value of the rotational speed of the input shaft I is increased and the resulting rotational speed is transferred to the carrier ca2 of the second planetary gear apparatus P2. Therefore, the gear change ratio of this fourth forward speed is less than 1.

Electric Travel Mode

The electric travel mode is a mode in which it is possible to travel by separating the input shaft I (engine E) from the output shaft O and transferring the rotation of the motor-generator MG to the output shaft O. In the present embodiment, in the electric travel mode, the hybrid drive apparatus H includes s plurality of shift speeds, or specifically, a first forward speed and a second forward speed that serve as deceleration speeds, in which the absolute value of the rotational speed of the motor-generator MG is reduced and the resulting rotational speed is transferred to the output shaft O. The first forward speed and the second forward speed of this electric travel mode are similar to the first forward speed and the second forward speed of the parallel mode, except that the input shaft I is separated from the ring gear r2 of the second planetary gear apparatus P2 by disengaging the second clutch C2.

In addition, as described above, the first forward speed of the electric travel mode is realized from the first forward speed of the parallel mode by disengaging the second clutch C2. In addition, the second forward speed of the electric travel mode is realized from the second forward speed of the parallel mode by disengaging the second clutch C2 and is realized from the fourth forward speed of the parallel mode by disengaging the third clutch C3. In addition, it is possible to switch between the first forward speed and the second forward speed of the electric travel mode by engaging either one of the first brake B2 and the second brake B2.

Special Control Processing

Figure 9:
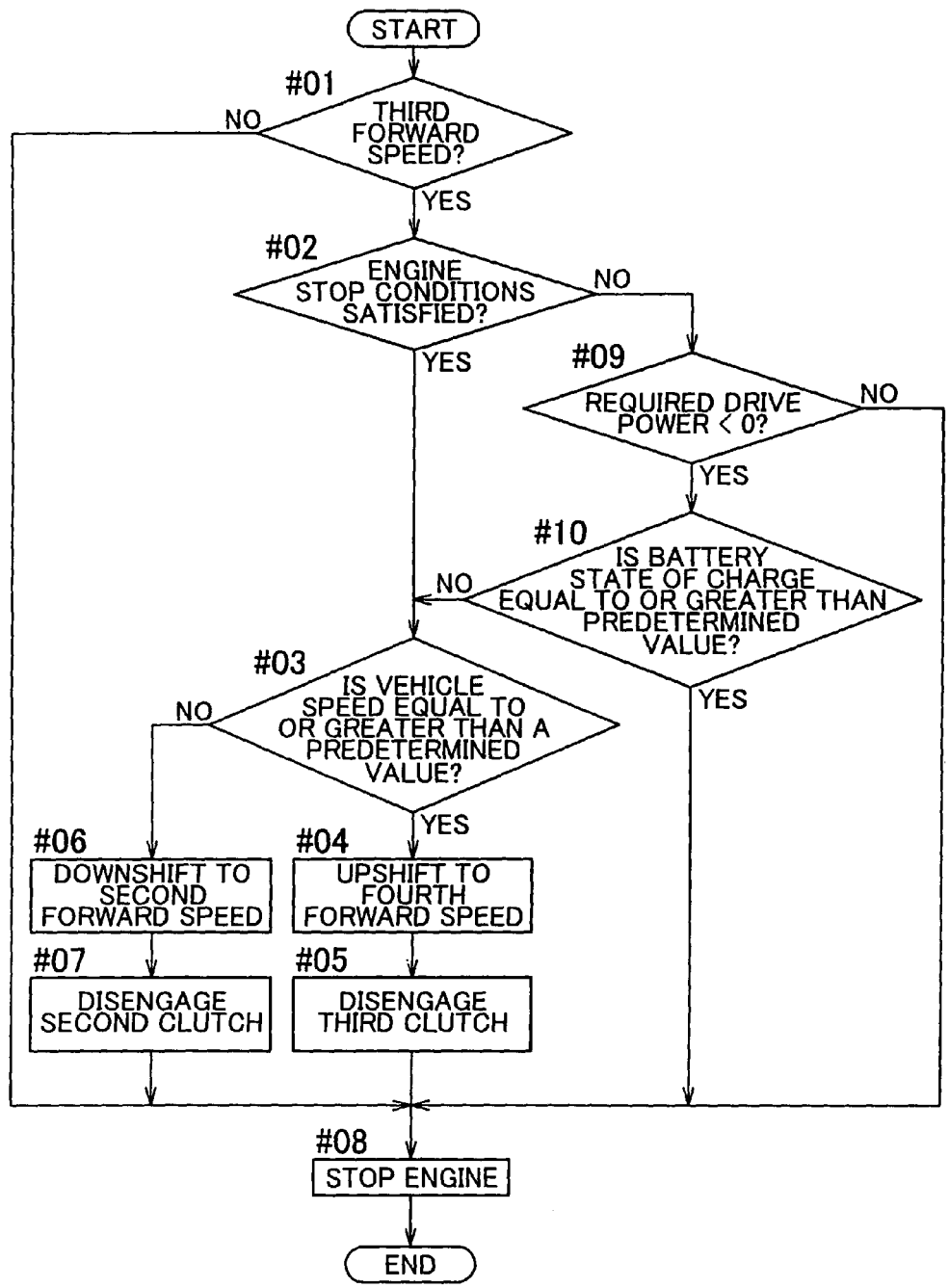
FIG. 9 is a drawing showing a flowchart for the special control processing of the first embodiment.

Next, special control processing will be explained. This special control processing is necessary because the hybrid drive apparatus H according to the present embodiment cannot directly switch from the third forward speed of the parallel mode (the shift speed having a gear change ratio of 1) to the electric travel mode. FIG. 9 is a flowchart that shows this control processing. Briefly, in this control processing, when switching from the third forward speed of the parallel mode to the electric travel mode, the mode is switched to the electric travel mode after switching to another shift speed in the parallel mode, here, after switching to the second forward speed or the fourth forward speed, depending on predetermined conditions. This control processing is carried out by the control apparatus ECU carrying out a determination based on information from each of the components of the vehicle and outputting command signals to each of the components of the hybrid drive apparatus H such as the hydraulic control apparatus 13. Below, this will be explained in detail.

First, the control apparatus ECU determines whether or not the current state of the hybrid drive apparatus H is the third forward speed of the parallel mode (step #01). In the case in which the current state is not the third forward speed of the parallel mode (step #01: No), the processing ends because it does not need to be carried out. In addition, in the case in which the current state is the third forward speed of the parallel mode (step #01: Yes), next, the control apparatus ECU determines whether or not the engine stop conditions are satisfied by using the engine stop condition identifying means 41 (step #02). Then, in the case in which the engine stop conditions are satisfied (step #02: Yes), next, the control apparatus ECU determines whether or not the vehicle speed that has been detected by the vehicle speed detecting means 35 is equal to or greater than a predetermined value (step #03). Here, the predetermined value that serves as a determination reference can be, for example, an intermediate vehicle speed between the vehicle speed to which the second forward speed of the parallel mode is normally assigned and the vehicle speed to which the fourth forward speed is normally assigned.

In addition, in the case in which the vehicle speed is equal to or greater than a predetermined value (step #03: Yes), the control apparatus ECU operates the hydraulic control apparatus 13 by using the switching control means 36 and upshifts the hybrid drive apparatus H to the fourth forward speed of the parallel mode (step #04). Subsequently, the control apparatus ECU operates the hydraulic control apparatus 13 by using the switching control means 36 to disengage the third clutch C3 (step #05). Thereby, the hybrid drive apparatus H is switched to the second forward speed of the electric travel mode. In contrast, in the case in which the vehicle speed is less than a predetermined value (step #3: No), the control apparatus ECU operates the hydraulic control apparatus 13 by using the switching control means 36, and downshifts the hybrid drive apparatus H to the second forward speed of the parallel mode (step #06). Subsequently, the control apparatus ECU operates the hydraulic control apparatus 13 by using the switching control means 36 to disengage the second clutch C2 (step #07). Thereby, the hybrid drive apparatus H is switched to second forward speed of the electric travel mode. Subsequently, the control apparatus ECU stops the engine E by using the engine control means 31 (step #08). Then the processing ends.

In contrast, in the case in which the engine stop conditions are not satisfied (step #02: No), the control apparatus ECU determines whether or not the required drive power is less than nil, that is, whether a deceleration is required (step #09). The determination of whether this required drive power is less than nil can be carried out based, for example, on one or both of the state in which the accelerator pedal of the vehicle is not being operated and the state in which the brake pedal is being operated by using the required drive power detecting means 40. In addition, in the case in which the required drive power is equal to or greater than nil (step #09: No), deceleration is not required, travel in the third forward speed of the parallel mode may be maintained, and the processing ends.

In contrast, in the case in which the required drive power is nil or less (step #09: Yes), the control apparatus ECU determines whether or not the state of charge of the battery 11 is equal to or greater than a predetermined value (step #10) by using the battery state detecting means 33. Here, it is advantageous to set the state of charge of the battery, which is the standard used in this determination, to the state of charge when the battery 11 requires substantially no charging, that is, in the neighborhood of the maximum value of the state of charge in the range of use of the battery 11. In addition, in the case in which the state of charge of the battery 11 is equal to or greater than a predetermined value (step #10: Yes), the control apparatus ECU stops the engine by using the engine control means 31 (step #08) while remaining in the third forward speed of the parallel mode. Thereby, while the input shaft I and the engine E continue to be connected to the output shaft O, regenerative braking is carried out. The engine E that has stopped continues to be rotated due to the rotating torque that is transferred from the wheels via the output shaft O, and the battery 11 is charged. Note that in these circumstances, although the recovery efficiency of the energy is reduced by the amount of energy that rotates the stopped engine E, the state of charge of the battery 11 is equal to or greater than a predetermined value, and such control is carried out because a substantial amount of charging is unnecessary. In contrast, in the case in which the state of charge of the battery 11 is less than a predetermined value (step #10: No), the processing proceeds to step #03, and after upshifting or downshifting is carried out depending on the vehicle speed, the input shaft I (engine E) is separated from the output shaft O, and the engine E is stopped (step #08). Thereby, regenerative braking is carried out while the input shaft I and the engine E are separated from the output shaft O, energy is recovered at a high efficiency, and it is possible to charge the battery 11. Then the processing ends.

Second Embodiment

Next, a second embodiment of the present invention will be explained. The hybrid drive apparatus H according to this embodiment is structured similarly to the hybrid drive apparatus H according to the first embodiment described above, but is structured so as to provide more stages in the parallel mode and the electric travel mode. The parallel mode has seven shift speeds including reverse, and the electric travel mode has three shift speeds. Below, the hybrid drive apparatus H according to this embodiment will be explained by focusing on the points of difference with the first embodiment. Note that the system structure of the hybrid drive apparatus H according to this embodiment is similar to that in FIG. 2, and thus the explanation of these points will be omitted. In addition, any points that are not specifically explained about the other structures are identical to those in the first embodiment described above.

Structure of Each of the Components of the Hybrid Drive Apparatus H

Figures 10, 11:
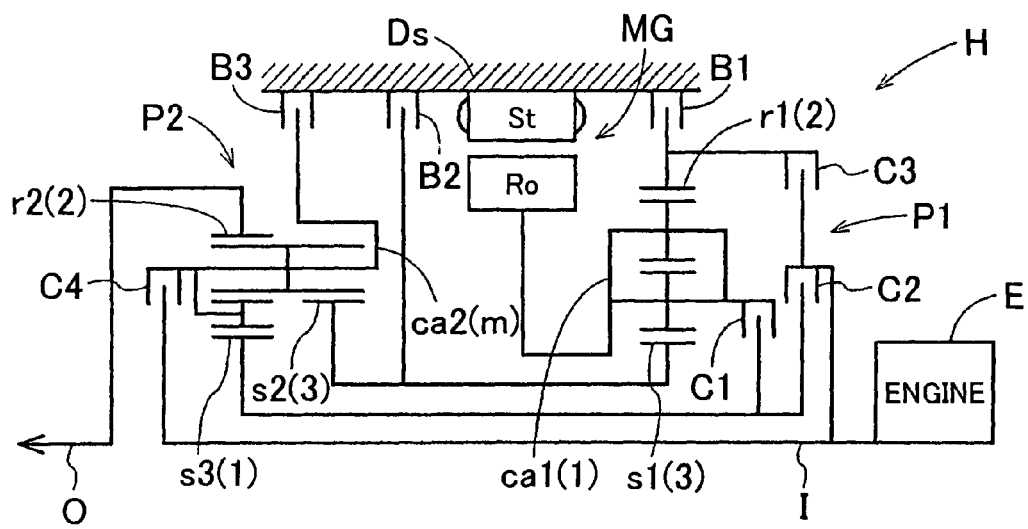
FIG. 10 is a skeletal diagram of the hybrid drive apparatus according to a second embodiment of the present invention.
FIG. 11 is a drawing that shows an operating diagram of the second embodiment.

FIG. 10 is a skeletal diagram that shows the structure of the hybrid drive apparatus H according to the present embodiment. As shown in the figure, similar to the first embodiment described above, this hybrid drive apparatus H is also provided with an input shaft I that is connected to the engine E, an output shaft O that is connected to the wheels W (refer to FIG. 2), a motor-generator MG, a first planetary gear apparatus P1, and a second planetary gear apparatus P2. In addition, these structures are accommodated in a case Ds, which serves as a non-rotating member that is fastened to the vehicle body. However, in the hybrid drive apparatus H of the present embodiment, the structure of the first planetary gear apparatus P1 is similar to that of the first embodiment described above, the second planetary gear apparatus P2 is structured so as to have four rotating elements, and this point differs from the first embodiment. In addition, accompanying this difference, the number of friction engagement elements is also larger than the first embodiment.

The second planetary gear apparatus P2 according to the present embodiment is structured by a Ravigneaux-type planetary gear apparatus that is disposed coaxially with the input shaft I. Specifically, the second planetary gear apparatus P2 includes as rotating elements two sun gears, that is, a first sun gear s2 and a second sun gear s3, a ring gear r2, and a shared carrier ca2 that supports a long pinion gear that meshes with both the first sun gear s2 and the ring gear r2 and a short pinion gear that meshes with this long pinion gear and the second sun gear s3. The ring gear r2 is connected to the output shaft O so as to rotate integrally therewith. In addition, the first sun gear s2 is connected to the sun gear s1 of the first planetary gear apparatus P1 so as to rotate integrally therewith. The sun gears s1 and s2 are selectively held stationary on the case Ds via the second brake B2. In addition, the second sun gear s3 is selectively connected to the carrier ca1 of the first planetary gear apparatus P1 via the first clutch C1, and selectively connected to the input shaft I via the second clutch C2. That is, this second sun gear s3 selectively transfers the rotation of the input shaft I by the second clutch C2 and selectively transfers the rotation of the motor-generator MG by the first clutch C1. In addition, the carrier ca2 is selectively held stationary on the case Ds via the third brake B3 and is selectively connected to the output shaft I via the fourth clutch C4. In the present embodiment, the second sun gear s3, the ring gear r2, and the first sun gear s2 respectively correspond to the "first rotating element (1)", the "second rotating element (2)", and the "third rotating element (3)" of the second planetary gear apparatus P2 in the present invention. In addition, the carrier ca2 corresponds to the "intermediate rotating element (m)" of the second planetary gear apparatus P2 in the present invention.

Note that, similar to each of the friction engagement elements according to the first embodiment described above, the fourth clutch C4 and the third brake B3 can use multi-plate clutch and a multi-plate brake that is actuated by oil pressure that is supplied via a hydraulic control apparatus 13.

Operating Modes of the Hybrid Drive Apparatus H

Figure 12:
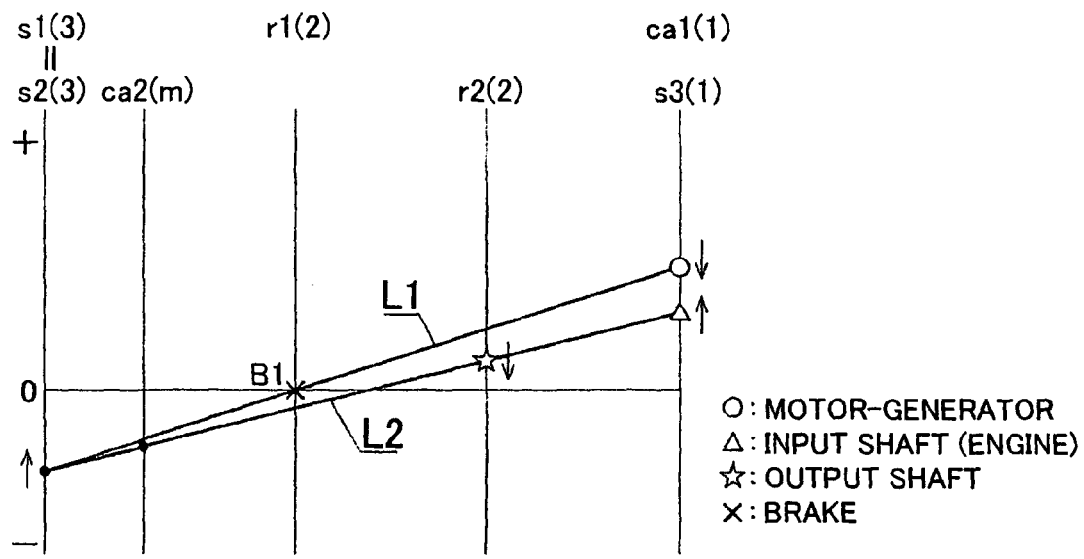
FIG. 12 is a velocity diagram for the electric torque converter mode of the second embodiment.
Figure 13:
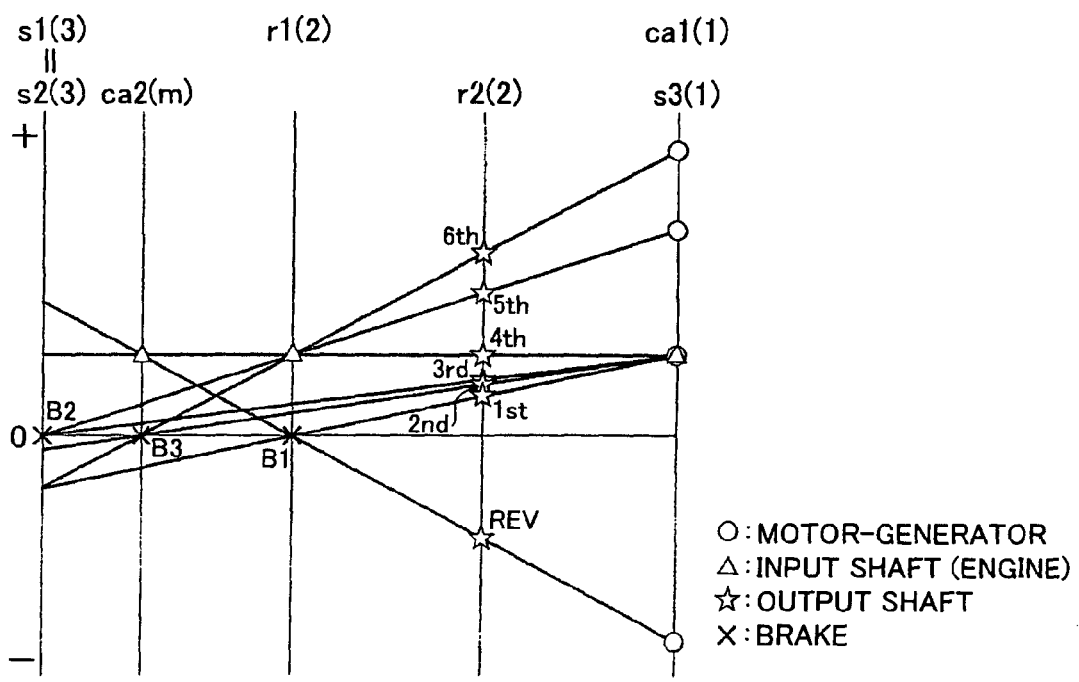
FIG. 13 is a velocity diagram for the parallel mode of the second embodiment.

Next, the operating modes that can be realized by the hybrid drive apparatus H according to the present embodiment will be explained. FIG. 11 is an operating diagram that shows a plurality of operating modes and the operating state of each of the friction engagement elements C1, C2, C3, C4, B1, B2, and B3 in one or more shift speeds provided in each of the operating modes. In addition, FIG. 12 and FIG. 13 respectively correspond to FIG. 7 and FIG. 8, which relate to the first embodiment. That is, these figures show the velocity diagrams of the first planetary gear apparatus P1 and the second planetary gear apparatus P2, where FIG. 12 is a velocity diagram of the electric torque converter mode and FIG. 13 is a velocity diagram of the parallel mode. Note that "1st", "2nd" and "3rd" in FIG. 13 are the same as the velocity diagram for the electric travel mode. In these velocity diagrams as well, similar to FIG. 7 and FIG. 8, each of the plurality of ordinates disposed in parallel corresponds to each of the rotating elements of the first planetary gear apparatus P1 and the second planetary gear apparatus P2. Specifically, "ca1", "r1", and "s1" shown above each of the ordinates respectively correspond to the carrier ca1, the ring gear r1, and the sun gear s1 of the first planetary gear apparatus P1, and "s3", "r2", "ca2", and "s2" respectively correspond to the second sun gear s3, the ring gear r2, the carrier ca2, and the first sun gear s2 of the second planetary gear apparatus P2. In addition, in FIG. 12, the straight line L1 indicates the operating state of the first planetary gear apparatus P1 and the straight line L2 indicates the operating state of the second planetary gear apparatus P2. In addition, in FIG. 13, each of the straight lines indicate the operating states of the first planetary gear apparatus P1 and the second planetary gear apparatus P2 in each of the shift speeds.

Note that in FIG. 11 to FIG. 13, "1st", "2nd", and "3rd" respectively indicate the first forward speed, the second forward speed, and the third forward speed in the parallel mode and the electric travel mode. In addition, "4th", "5th", "6th", and "REV" respectively indicate the fourth forward speed, the fifth forward speed, the sixth forward speed, and reverse in the parallel mode.

As shown in FIG. 11 to FIG. 13, this hybrid drive apparatus H uses one motor-generator MG, and the point that it is structured so as to be enable switching between three operational modes, the "electric torque converter mode", the "parallel mode", and the "electric travel mode", is similar to the first embodiment described above. In contrast, this hybrid drive apparatus H has more shift speeds than the first embodiment described above, and specifically, the parallel mode has seven shift speeds, including reverse, and the electric travel mode has three shift speeds. Below, the operating states of the hybrid drive apparatus H in each of the operating modes will be explained in detail.

Electric Torque Converter Mode

In the present embodiment as well, as shown in FIG. 11, in the electric torque converter mode, the second clutch C2 and the first brake B1 are engaged. Thereby, the ring gear r1 of the first planetary gear apparatus P1 is held stationary on the case Ds, and the second sun gear s3 of the second planetary gear apparatus P2 and the input shaft I are connected so as to rotate integrally. In addition, similar to the first embodiment, the gear ratio λ1 of the first planetary gear apparatus P1 (ratio of number of teeth of the gun gear s1 and the ring gear r1= [number of teeth in sun gear s1]/[number of teeth in ring gear r1]) is set such that the absolute value of the rotational speed of the sun gear s1 is reduced with respect to the absolute value of the rotational speed of the carrier ca1. Therefore, the first planetary gear apparatus P1 reduces the absolute value of the rotational speed of the motor-generator MG and transfers the resulting rotational speed to the first sun gear s2 of the second planetary gear apparatus P2. Thereby, the rotational torque of the motor-generator MG, which has been amplified depending on the gear change ratio due to the first planetary gear apparatus P1, is transferred to the first sun gear s2 of the second planetary gear apparatus P2.

In addition, as shown by L2 in FIG. 12, in the second planetary gear apparatus P2, the ring gear r2, which is second in order of rotation speed, rotates integrally with the output shaft O and the second sun gear s3, which is first in order of rotation speed, rotates integrally with the input shaft I. In addition, the rotation of the motor-generator MG, which has been reduced by the first planetary gear apparatus P1, is transferred to the first sun gear s2, which is fourth in order of rotation speed. In this mode, the carrier ca2, which is third in order of rotation speed, can rotate freely. Note that here, "in order of rotational speed" basically denotes the order from the high-speed side to the low-speed side, and in reverse in the parallel mode, denotes the order from the low-speed side to the high-speed side. By being structured in this manner, the second planetary gear apparatus P2 combines the rotation of the motor-generator MG after speed reduction and the rotation of the input shaft I (engine E), and transfers the resulting rotation to the output shaft O. Specifically, in the second planetary gear apparatus P2, the rotational torque of the motor-generator MG, which is transferred to the first sun gear s2 via the first planetary gear apparatus P1, acts as a reaction force on the rotating torque of the input shaft I (engine E), which is transferred to the second sun gear s3, and thus these rotational torques are combined and the resulting torque is transferred to the output shaft O. At this time, the first sun gear s2 has a negative rotation and the second sun gear s3, which rotates integrally with the engine E and the input shaft I, has a positive rotation, and thus the absolute value of the rotational speed of the ring gear r2, which, in order of rotational speed, is intermediate between the first sun gear s2 and the second sun gear s3, is reduced with respect to the absolute value of the rotational speed of the second sun gear s3. Therefore, similar to the first embodiment described above, the second planetary gear apparatus P2 reduces the absolute value of the rotational speed of the input shaft I and transfers the resulting rotational speed to the output shaft O. Thereby, the rotational torque of the input shaft I is amplified and the resulting rotational torque is output to the output shaft O.

In addition, this hybrid drive apparatus H functions as an electric torque converter by operating similarly to the first embodiment described above. Additionally, this hybrid drive apparatus H is also structured so as to enable simultaneous switching, in which the engaging of the first clutch C1 is carried out while the rotational speeds of the input-side rotating member and the output-side rotating member of the first clutch C1 are the same when switching modes from the electric torque converter mode to the first forward speed of the parallel mode by operating similarly to the first embodiment.

Parallel Mode

In the present embodiment, in the parallel mode, the hybrid drive apparatus H includes a first forward speed, a second forward speed, and a third forward speed functioning as speed reduction stages that are established by directly linking the input shaft I and the motor-generator MG and; a fourth forward speed that is established similarly by directly linking the input shaft I and the motor-generator MG and that serves as a directly linked speed that transfers the rotational speed of the input shaft I to the output shaft O at the same speed; and a fifth forward speed, a sixth forward speed, and reverse, which increase the absolute value of the rotational speed of the input shaft I and transfer the result to the output shaft O and that serve as acceleration speeds that reduce the absolute value of the rotational speed of the motor-generator MG and transfer the resulting rotational speed to the output shaft O. Below, the operating state of the hybrid drive apparatus H at each of the shift speeds will be explained.

As shown in FIG. 11, in the first forward speed, the first clutch C1, the second clutch C2, and the third brake B1 are engaged. In addition, as shown in FIG. 10 and FIG. 13, in the first forward speed, by engaging the first clutch C1 and the second clutch C2, the input shaft I (engine E) and the motor-generator MG are directly linked to the second sun gear s3 of the second planetary gear apparatus P2, and these rotate integrally. Additionally, by engaging the first brake B1, the absolute value of the rotational speed of the second sun gear s3 of the second planetary gear apparatus P2 is reduced, and the resulting rotational speed is transferred to the ring gear r2 of the second planetary gear mechanism P2 to be output from the output shaft O. Among the plurality of shift speeds in the parallel mode, the gear change ratio of the first forward speed is set so as to be the highest.

As shown in FIG. 11, in the second forward speed, the first clutch C1, the second clutch C2, and the third brake B3 are engaged. In addition, as shown in FIG. 10 and FIG. 13, in the second forward speed, similar to the first forward speed, by engaging the first clutch C1 and the second clutch C2, the input shaft I (engine E) and the motor-generator MG are directly linked to the second sun gear s3 of the second planetary gear apparatus P2, and these rotate integrally. Additionally, by engaging the third brake B3, the absolute value of the rotational speed of the second sun gear s3 of the second planetary gear apparatus P2 is reduced, and the resulting rotational speed is transferred to the ring gear r2 of the second planetary gear apparatus P2 to be output from the output shaft O. The gear change ratio of this second forward speed is set so as to be smaller than the gear change ratio of the first forward speed.

As shown in FIG. 11, in the third forward speed, the first clutch C1, the second clutch C2, and the second brake B2 are engaged. In addition, as shown in FIG. 10 and FIG. 13, in the third forward speed, similar to the first forward speed, by engaging the first clutch C1 and the second clutch C2, the input shaft I (engine E) and the motor-generator MG are directly linked to the second sun gear s3 of the second planetary gear apparatus P2, and these rotate integrally. Additionally, by engaging the second brake B2, the absolute value of the rotational speed of the second sun gear s3 of the planetary gear apparatus P2 is reduced, and the resulting rotational speed is transferred to the ring gear r2 of the second planetary gear apparatus P2 to be output from the output shaft O. The gear change ratio of this third forward speed is set so as to be smaller than the gear change ratio of the second forward speed.

As shown in FIG. 11, in the fourth forward speed, the first clutch C1, second clutch C2, and the third clutch C3 are engaged. In addition, as shown in FIG. 10 and FIG. 13, in the fourth forward speed, similar to the first forward speed, by engaging the first clutch C1 and the second clutch C2, the input shaft I (engine E) and the motor-generator MG are directly linked to the second sun gear s3 of the second planetary gear apparatus P2, and these rotate integrally. Furthermore, by engaging the third clutch C3, the first planetary gear apparatus P1 and the second planetary gear apparatus P2 form a direct link, and the whole rotates integrally, the rotational speeds of the input shaft I and the motor-generator MG are transferred to the output shaft O at the same speed, and output. Therefore, this fourth forward speed has a gear change ratio of 1. Note that the hybrid drive apparatus H of the present embodiment, similar to the first embodiment described above, is also structured such that a shift speed having a gear change ratio of 1 cannot be realized while the input shaft I (engine E) is separated, and it is not possible to switch directly from the fourth forward speed of the parallel mode to the electric travel mode. Therefore, similar to the control processing that has been explained in the section "1-6. Special control processing" according to the first embodiment described above, when switching from the fourth forward speed in the parallel mode to the electric travel mode, control for switching to the electric travel mode is carried out after switching to the third forward speed or the fifth forward speed of the parallel mode.

As shown in FIG. 1, in the fifth forward speed, the first clutch C1, the third clutch C3, and the second brake B2 are engaged. In addition, as shown in FIG. 10 and FIG. 13, in the fifth forward speed, by engaging the first clutch C1, the motor-generator MG is directly linked to the second sun gear s3 of the second planetary gear apparatus P2, and these rotate integrally. Additionally, by engaging the third clutch C3 and the second brake B2, the absolute value of the rotational speed of the input shaft I (engine E) is increased, the resulting rotational speed is transferred to the carrier ca1 of the first planetary gear apparatus P1, and then transferred to the second sun gear s3 of the second planetary gear apparatus P2 via the first clutch C1 along with the rotation of the motor-generator MG. Then, the absolute value of the rotational speed of the second sun gear s3 of the second planetary gear apparatus P2 is reduced and the resulting rotational speed is transferred to the ring gear r2 of the second planetary gear apparatus P2 to be output from the output shaft O. As this time, the gear ratios of the first planetary gear apparatus P1 and the second planetary gear apparatus P2 are set such that the absolute value of the rotational speed of the input shaft I is increased and the resulting rotational speed is transferred to the ring gear r2 of the second planetary gear apparatus P2. Therefore, the gear change ratio of this fifth forward speed is less than 1.

As shown in FIG. 11, in the sixth forward speed, the first clutch C1, the third clutch C3, and the third brake B3 are engaged. In addition, as shown in FIG. 10 and FIG. 13, in the sixth forward speed, by engaging the first clutch C1, the motor-generator MG is directly linked to the second sun gear s3 of the second planetary gear apparatus P2, and these rotate integrally. Then, by engaging the third clutch C3 and the third brake B3, the absolute value of the rotational speed of the input shaft I (engine E) is increased and the resulting rotational speed is transferred to the carrier ca1 of the first planetary gear apparatus P1, and then this resulting rotational speed is transferred to the second sun gear s3 of the second planetary gear apparatus P2 via the first clutch C1 along with the rotation of the motor-generator MG. Additionally, the absolute value of the rotational speed of the second sun gear s3 of the second planetary gear apparatus P2 is reduced, and the resulting rotational speed is transferred to the ring gear r2 of the second planetary gear apparatus P2 to be output from the output shaft O. At this time, the gear ratios of the first planetary gear apparatus P1 and the second planetary gear apparatus P2 are set such that the absolute value of the rotational speed of the input shaft I is increased and the resulting rotational speed is transferred to the ring gear r2 of the second planetary gear apparatus P2. In addition, the gear change ratio of the sixth forward speed is set so as to be smaller than the gear change ratio of the fifth forward speed.

As shown in FIG. 11, in reverse, the first clutch C1, the fourth clutch C4, and the first brake B1 are engaged. In addition, as shown in FIG. 10 and FIG. 13, in reverse, by the fourth clutch C4 engaging, the input shaft I (engine E) is directly linked to the carrier ca2 of the second planetary gear apparatus P2, and these rotate integrally. Additionally, by engaging the first brake B1, the rotation of the carrier ca2 of the second planetary gear apparatus P2 reverses, and the resulting rotation is transferred to the ring gear r2 to be output from the output shaft O. In this situation, by engaging the first clutch C1, the carrier ca1 of the first planetary gear apparatus P1 and the motor-generator MG also rotate in reverse.

Electric Travel Mode

In the present embodiment, in the electric travel mode, the hybrid drive apparatus H includes a first forward speed, a second forward speed, and a third forward speed, which serve as speed reduction stages in which the absolute value of the rotational speed of the motor-generator MG is reduced and the resulting rotational speed is output to the output shaft O. The first forward speed, the second forward speed, and the third forward speed of the electric travel mode are identical to the first forward speed, the second forward speed, and the third forward speed of the parallel mode described above, except that the input shaft I is separated from the second sun gear s3 of the second planetary gear apparatus P2 by disengaging the second clutch C2.

Examples of Alternative Structures

In the present embodiment, a structure was explained in which it is possible to realize more shift speeds than the first embodiment described above in the parallel mode and the electric travel mode by providing four rotating elements in the second planetary gear apparatus P2. A structure for increasing the shift speeds of the parallel mode and the electric travel mode beyond those of the first embodiment described above is not limited to the structures that are illustrated in FIG. 10 to FIG. 13. Thus, alternative examples of structures that enable increasing the speeds beyond those of the first embodiment described above by providing four rotating elements to either of the first planetary gear apparatus P1 and the second planetary gear apparatus P2, are explained below with reference to the velocity diagrams for the electric torque converter mode shown in FIG. 14 to FIG. 19. Note that in these velocity diagrams as well, "○" shows the rotational speed of the motor-generator MG, "Δ" shows the rotation velocity of the input shaft I (engine E), "☆" shows the rotational speed of the output shaft O, and "x" shows the brake.

Figure 14:
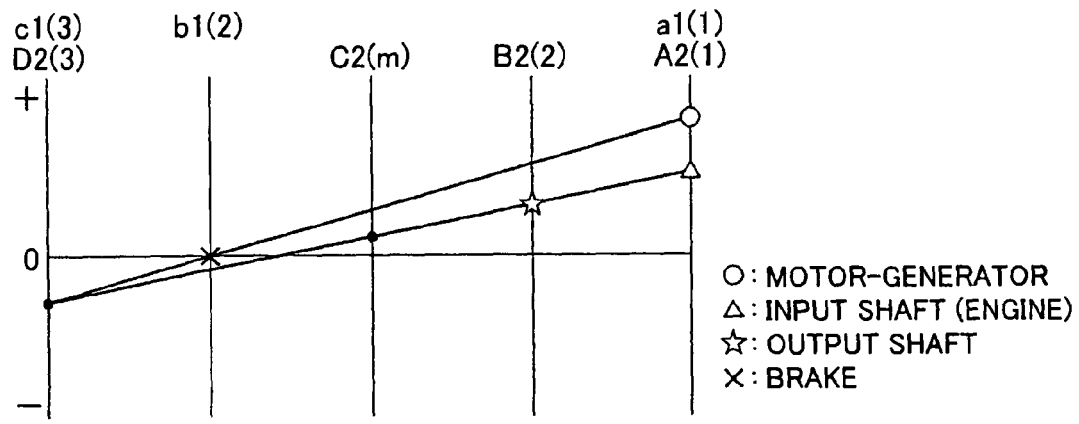
FIG. 14 is a velocity diagram that shows an example of another structure for the second embodiment.
Figure 15:
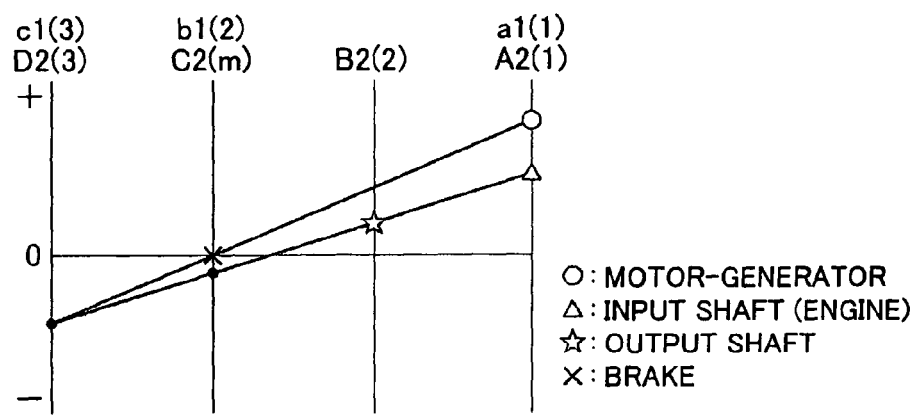
FIG. 15 is a velocity diagram that shows an example of another structure for the second embodiment.
Figure 16:
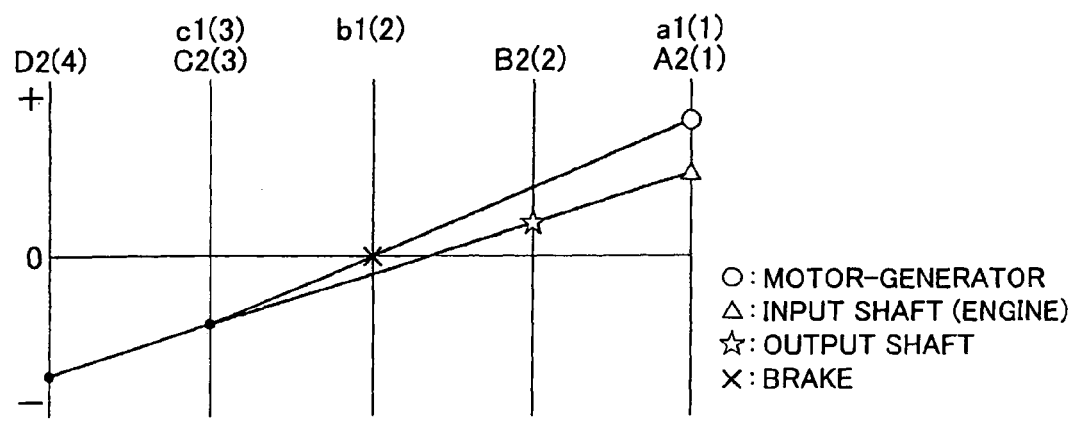
FIG. 16 is a velocity diagram that shows an example of another structure for the second embodiment.
Figure 17:
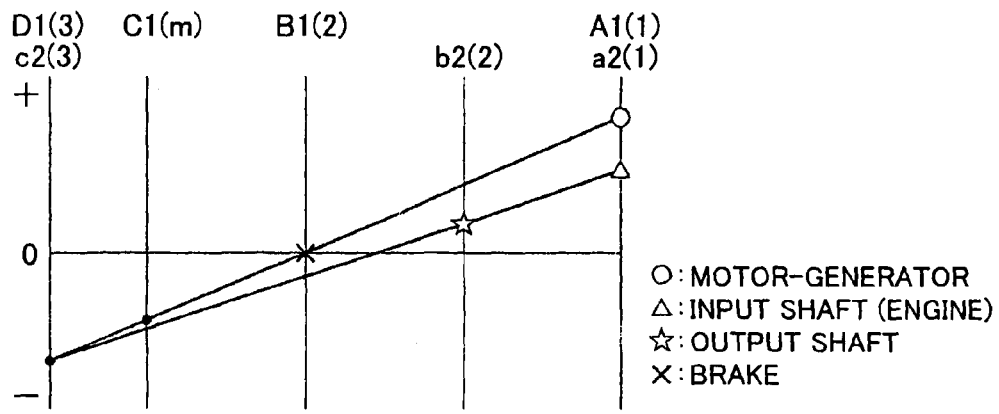
FIG. 17 is a velocity diagram that shows an example of another structure for the second embodiment.
Figure 18:
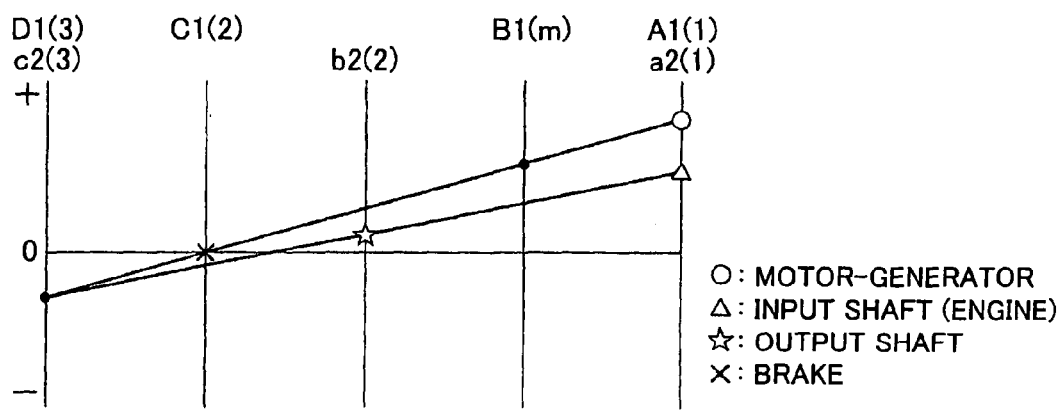
FIG. 18 is a velocity diagram that shows an example of another structure for the second embodiment.
Figure 19:
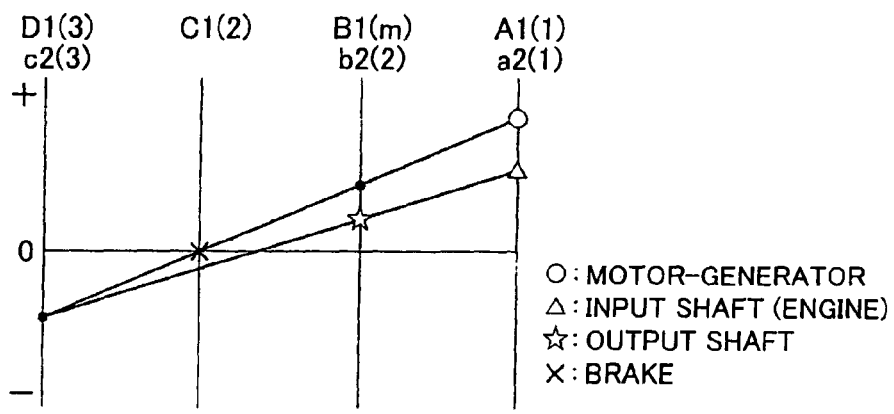
FIG. 19 is a velocity diagram that shows an example of another structure for the second embodiment.

Here, FIG. 14 to FIG. 16 illustrate an example in which the first planetary gear apparatus P1 is provided with three rotating elements and the second planetary gear apparatus P2 is provided with four rotating elements, and FIG. 17 to FIG. 19 illustrate an example in which the first planetary gear apparatus P1 is provided with four rotating elements and the second planetary gear apparatus P2 is provided with three rotating elements. However, all of these examples have the following points in common. Specifically, in the first planetary gear apparatus P1, a first rotating element (1) is connected to the motor-generator MG, a second rotating element (2) is held stationary on the case Ds, and in this state, a gear ratio is set such that the absolute value of the rotational speed of a third rotating element (3) is reduced with respect to the absolute value of the rotational speed of the first rotating element (1). In addition, in the second planetary gear apparatus P2, the input shaft I is connected to a first rotating element (1), the output shaft O is connected to a second rotating element (2), and the third rotating element (3) of the first planetary gear apparatus P1 is connected to a third rotating element (3). Note that the disposition of the ordinates that correspond to each of the rotating elements in these velocity diagrams is determined by the setting of the gear ratios of the first planetary gear apparatus P1 and the second planetary gear apparatus P2. In addition, the specific structures of each of the rotating elements of the first planetary gear apparatus P1 and the second planetary gear apparatus P2 can adopt any type of structure in which the number of rotating elements that are necessary in each of the examples can be realized.

"a1", "b1", and "c1", which are disposed in the order of rotational speed shown above each of the ordinates of the velocity diagrams that are shown in FIG. 14, respectively correspond to the first rotating element (1), the second rotating element (2), and the third rotating element (3) of the first planetary gear apparatus P1. In addition, "A2", "B1", "C2", and "D2", which are disposed in the order of rotational speed therebelow, respectively correspond to the first rotating element (1), the second rotating element (2), the intermediate rotating element (m), and the third rotating element (3) of the second planetary gear apparatus P2. In addition, in the example shown in FIG. 14, in the direction from the high-speed side to the low-speed side of the rotational speeds (from the right side to the left side in the figure), the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the second rotating element (2) of the second planetary gear apparatus P2; the ordinate that corresponds to the intermediate rotating element (m) of the second planetary gear apparatus P2; the ordinate that corresponds to the second rotating element (2) of the first planetary gear apparatus P1; and the ordinate that corresponds to the third rotating element (3) of the first planetary gear apparatus P1 and the second planetary gear apparatus P2.

Note that, expressing similar to the above, in the examples shown in FIG. 12, in the direction from the high-speed side to the low-speed side of the rotational speeds (from the right side to the left side in the figure), the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the second rotating element (2) of the second planetary gear apparatus P2; the ordinate that corresponds to the second rotating element (2) of the first planetary gear apparatus P1; the ordinate that corresponds to the intermediate rotating element (m) of the second planetary gear apparatus P2; and the ordinate that corresponds to the third rotating element (3) of the first planetary gear apparatus P1 and the second planetary gear apparatus P2. Therefore, the example shown in FIG. 14 differs from the example shown in FIG. 12 on the point that the disposition of the ordinate that corresponds to the second rotating element (2) of the first planetary gear apparatus P1 and the ordinate that corresponds to the intermediate rotating element (m) of the second planetary gear apparatus P2, that is, the disposition of the third ordinate and the fourth ordinate from the high-speed side to the low-speed side rotation speed, are interchanged.

"a1", "b1", and "c1", which are disposed in the order of rotational speed shown on the upper side of each of the ordinates of the velocity diagrams that are shown in FIG. 15, respectively correspond to the first rotating element (1), the second rotating element (2), and the third rotating element (3) of the first planetary gear apparatus P1. In addition, on the lower stand, "A2", "B1", "C2", and "D2" respectively correspond to the first rotating element (1), the second rotating element (2), the intermediate rotating element (m), and the third rotating element (3) of the second planetary gear apparatus P2. In addition, in the examples shown in FIG. 15, in the direction from the high-speed side to the low-speed side of the rotational speeds (from the right side to the left side in the figure), the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the second rotating element (2) of the second planetary gear apparatus P2; the ordinate that corresponds to the second rotating element (2) of the first planetary gear apparatus P1 and the intermediate rotating element (m) of the second planetary gear apparatus P2; and the ordinate that corresponds to the third rotating element (3) of the first planetary gear apparatus P1 and the second planetary gear apparatus P2. That is, the example that is shown in FIG. 15 differs from the example shown in FIG. 12 on the point that the ordinate that corresponds to the second rotating element (2) of the first planetary gear apparatus P1 coincides with the position of the ordinate that corresponds to the intermediate rotating element (m) of the second planetary gear apparatus P2.

"a1", "b1", and "c1", which are disposed in the order of rotational speed shown on the upper side of each of the ordinates of the velocity diagrams that are shown in FIG. 16, respectively correspond to the first rotating element (1), the second rotating element (2), and the third rotating element (3) of the first planetary gear apparatus P1. In addition, "A2", "B1", and "C2", which are displayed in the order of rotational speed therebelow, respectively correspond to the first rotating element (1), the second rotating element (2), and the third rotating element (3) of the second planetary gear apparatus P2. Note that "D2" follows the third rotating element (3) in the order of rotation speed, and here is the fourth rotating element (4). In addition, in the examples shown in FIG. 16, in the direction from the high-speed side to the low-speed side of the rotational speeds (from the right side to the left side in the figure), the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the second rotating element (2) of the second planetary gear apparatus P2; the ordinate that corresponds to the second rotating element (2) of the first planetary gear apparatus P1; the ordinate that corresponds to the third rotating element (3) of the first planetary gear apparatus P1 and the second planetary gear apparatus P2; and the ordinate that corresponds to the fourth rotating element (4) of the second planetary gear apparatus P2. That is, the example shown in FIG. 16 differs from the example shown in FIG. 12 on the point that the second planetary gear apparatus P2 has a fourth rotating element (4) that follows the third rotating element (3) in order of rotational speed instead of the intermediate rotating element (m).

"A1", "B1", "C1", and "D1", which are disposed in the order of rotational speed shown on the upper side of each of the ordinates of the velocity diagrams that are shown in FIG. 17, respectively correspond to the first rotating element (1), the second rotating element (2), the intermediate rotating element (m), and the third rotating element (3) of the first planetary gear apparatus P1. In addition, "a2", "b2", and "c2", which are disposed in the order of rotational speed therebelow, respectively correspond to the first rotating element (1), the second rotating element (2), and the third rotating element (3) of the second planetary gear apparatus P2. In addition, in the examples shown in FIG. 17, in the direction from the high-speed side to the low-speed side of the rotational speeds (from the right side to the left side in the figure), the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the second rotating element (2) of the second planetary gear apparatus P2; the ordinate that corresponds to the second rotating element (2) of the first planetary gear apparatus P1; the ordinate that corresponds to the intermediate rotating element (m) of the first planetary gear apparatus P1; and the ordinate that corresponds to the third rotating element (3) of the first planetary gear apparatus P1 and the second planetary gear apparatus P2. Note that the example shown in FIG. 17 differs from the example shown in FIG. 12 on the point that the first planetary gear apparatus P1 has an intermediate rotating element (m), and that this is disposed between the ordinate that corresponds to the second rotating element (2) of the first planetary gear apparatus P1 and the ordinate that corresponds to the third rotating element (3) of the first planetary gear apparatus P1 and the second planetary gear apparatus P2.

"A1", "B1", "C1", and "D1", which are disposed in the order of rotational speed shown on the upper side of each of the ordinates of the velocity diagrams that are shown in FIG. 18, respectively correspond to the first rotating element (1), the intermediate rotating element (m), the second rotating element (2), and the third rotating element (3) of the first planetary gear apparatus P1. In addition, "a2", "b2", and "c2", which are disposed in the order of rotational speed therebelow, respectively correspond to the first rotating element (1), the second rotating element (2), the intermediate rotating element (m), and the third rotating element (3) of the second planetary gear apparatus P2. In addition, in the examples shown in FIG. 18, in the direction from the high-speed side to the low-speed side of the rotational speeds (from the right side to the left side in the figure), the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the intermediate rotating element (m) of the first planetary gear apparatus P1; the ordinate that corresponds to the second rotating element (2) of the second planetary gear apparatus P2; the ordinate that corresponds to the second rotating element (2) of the first planetary gear apparatus P1; and the ordinate that corresponds to the third rotating element (3) of the first planetary gear apparatus P1 and the second planetary gear apparatus P2. That is, the example shown in FIG. 18 differs from the example shown in FIG. 12 on the point that the first planetary gear apparatus P1 has an intermediate rotating element (m), and this is disposed between the ordinate that corresponds to the first rotating element (1) of the first planetary gear apparatus P1 and the second planetary gear apparatus P2 and the ordinate that corresponds to the second rotating element (2) of the second planetary gear apparatus P2.

"A1", "B1", "C1", and "D1", which are disposed in the order of rotational speed shown on the upper side of each of the ordinates of the velocity diagrams that are shown in FIG. 19, respectively correspond to the first rotating element (1), the intermediate rotating element (m), the second rotating element (2), and the third rotating element (3) of the first planetary gear apparatus P1. In addition, "a2", "b2", and "c2", which are disposed in the order of rotational speed therebelow, respectively correspond to the first rotating element (1), the second rotating element (2), and the third rotating element (3) of the second planetary gear apparatus P2. In addition, in the examples shown in FIG. 19, in the direction from the high-speed side to the low-speed side of the rotational speeds (from the right side to the left side in the figure), the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the intermediate rotating elements (m) of the first planetary gear apparatus P1 and the second rotating element (2) of the second planetary gear apparatus P2; the ordinate that corresponds to the second rotating element (2) of the first planetary gear apparatus P1; and the ordinate that corresponds to the third rotating element (3) of the first planetary gear apparatus P1 and the second planetary gear apparatus P2. That is, the example shown in FIG. 19 differs from the example shown in FIG. 12 on the point that the first planetary gear apparatus P1 has an intermediate rotating element (m), and this is disposed so as to coincide with the ordinate that corresponds to the second rotating element (2) of the second planetary gear apparatus P2.

Third Embodiment

Next, a third embodiment of the present invention will be explained. The hybrid drive apparatus H according to this embodiment is structured such that the carrier ca1, which is the "second rotating element (2)" of the first planetary gear apparatus P1 and the carrier ca2, which is the "third rotating element (3)" of the second planetary gear apparatus P2, are connected so as to rotate integrally, and the ring gear r1, which is the "third rotating element (3) of the first planetary gear apparatus P1, is selectively held stationary on the case Ds by the first brake B1. On this point, the structure of the present embodiment differs from the structure of the first embodiment, that is, the structure in which the "third rotating element (3) (sun gear s1)" of the first planetary gear apparatus P1 and the "third rotating element (3) (sun gear s2)" of the second planetary gear apparatus P2 are connected so as to rotate integrally, and the "second rotating element (2) (ring gear r1)" of the first planetary gear apparatus P1 is selectively held stationary on the case Ds by the first brake B1.

In addition, the hybrid drive apparatus H according to the present embodiment also differs from the first embodiment on the point that it is structured such that the first planetary gear apparatus P1 is structured by a single pinion planetary gear mechanism and the second planetary gear apparatus P2 is structured by a double pinion planetary gear mechanism. In addition, accompanying such a change in the structure, the hybrid drive apparatus H according to the present embodiment also differs from the first embodiment on the points that the present the motor-generator MG is disposed on the engine E side and the first planetary gear apparatus P1 and the second planetary gear apparatus P2 can be disposed adjacent to each other. Below, the hybrid drive apparatus H according to the present embodiment will be explained by focusing on the differences with the first embodiment described above. Note that the systems structure of the hybrid drive apparatus H according to the present embodiment is similar to that shown in FIG. 2, and thus the explanation of this point is omitted. In addition, for the other structures as well, the present embodiment is similar to the first embodiment described above with respect to points that are not particularly explained.

Each of the Structures of the Hybrid Drive Apparatus H

Figure 20:
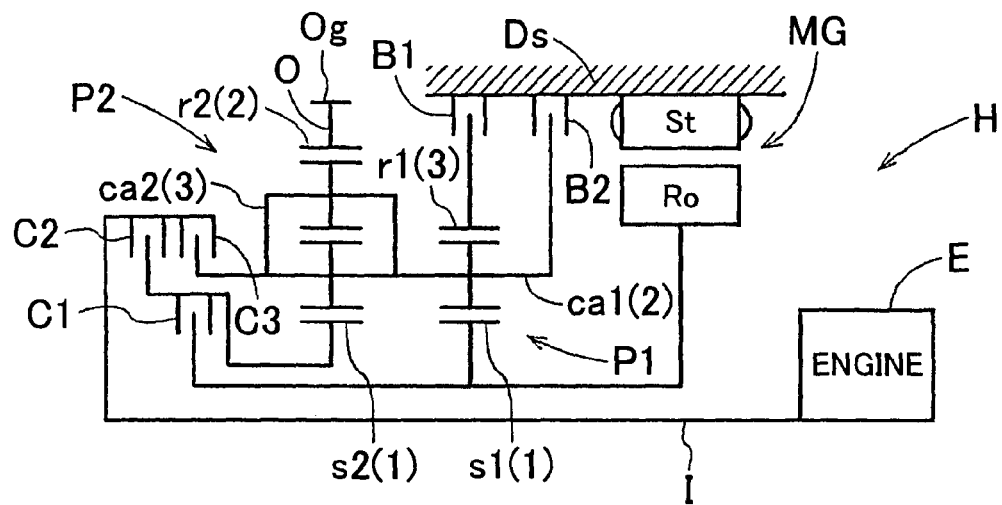
FIG. 20 is a skeletal diagram of the hybrid drive apparatus according to a third embodiment of the present invention.

FIG. 20 is a skeleton diagram that shows the structure of the hybrid drive apparatus according to the present embodiment. As shown in this figure, similar to the first embodiment, this hybrid drive apparatus H is provided with an input shaft I that is connected to an engine E, an output shaft O that is connected to the wheels W (refer to FIG. 2), a motor-generator MG, a first planetary gear apparatus P1, and a second planetary gear apparatus P2. In addition, these structures are accommodated in a case Ds, which serves as a non-rotating member that is fastened to the vehicle body. However, the structure of the first planetary gear apparatus P1 and the second planetary gear apparatus P2 in the hybrid drive apparatus H of the present embodiment differs from that in the first embodiment.

The first planetary gear apparatus P1 is structured by a single pinion planetary gear mechanism that is disposed concentrically to the input shaft I. Specifically, the first planetary gear apparatus P1 includes as rotating elements a carrier ca1 that supports a plurality of pinion gears and a sun gear s1 and a ring gear r1 that each mesh with the pinion gears. The sun gear s1 is connected to the motor-generator MG so as to rotate integrally therewith. In addition, the carrier ca1 is connected to the carrier ca2 of the second planetary gear apparatus P2 so as to rotate integrally therewith. The carriers ca1 and ca2 are selectively held stationary on the case Ds via the second brake B2, and selectively connected to the input shaft I via the third clutch C3. In addition, the ring gear r1 is selectively held stationary on the case Ds by the first brake B1. In the present embodiment, the sun gear s1, the carrier ca1, and the ring gear r1 respectively correspond to the "first rotating element (1)", the "second rotating element (2)", and the "third rotating element (3) of the first planetary gear apparatus P1 in the present invention.

The second planetary gear apparatus P2 is structured by a double pinion planetary gear mechanism that is disposed coaxially with the input shaft I. Specifically, the second planetary gear apparatus P2 includes as rotating elements a carrier ca2 that supports a plurality of pinion gears and a sun gear s2 arid a ring gear r2 that mesh with the pinion gears. The sun gear s2 is selectively connected to the sun gear s1 of the first planetary gear apparatus P1 via a first clutch C1 and is selectively connected to the input shaft I via a second clutch C2. Specifically, the rotation of the input shaft I is selectively transferred to this sun gear s2 by a second clutch C2 and the rotation of the motor-generator MG is selectively transferred to this sun gear s2 by a first clutch C1. In addition, the ring gear r2 is connected to the output shaft O so as to rotate integrally therewith. Additionally, the carrier ca2 is connected to the carrier ca1 of the first planetary gear apparatus P1 so as to rotate integrally therewith. As explained above, carriers ca1 and ca2 are selectively held stationary on the case Ds via the second brake B2, and selectively connected to the output shaft I via the third clutch C3. In the present embodiment, the sun gear s2, ring gear r2, and the carrier ca2 respectively correspond to the "first rotating element (1)", the "second rotating element (2)" and the "third rotating element (3)" of the second planetary gear apparatus P2 in the present invention.

Figure 21:
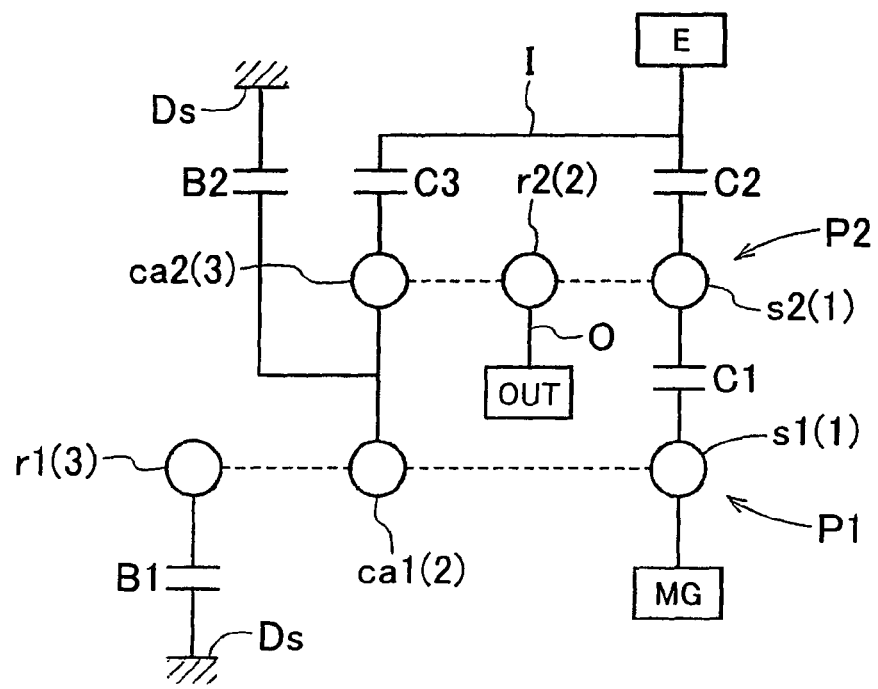
FIG. 21 is a schematic drawing that shows the connection state of each of the essential components of the third embodiment.

FIG. 21 is a schematic diagram that is more simply represents the connection state of each of the essential structures of this hybrid drive apparatus H. In this drawing, each of the rotating elements of the first planetary gear apparatus P1 and the second planetary gear apparatus P2 are disposed horizontally in order to rotational speed and shown connected by broken lines, and the essential elements that are connected to each of these rotating elements is shown connected by a solid line. As shown in the figure, the first planetary gear apparatus P1 includes, in order of rotational speed, a sun gear s1, a carrier ca1, and a ring gear r1. In addition, the second planetary gear apparatus P2 includes, in order of rotational speed, a sun gear s2, a ring gear r2, and a carrier ca2. Here, carrier ca1 of the first planetary gear apparatus P1 and the carrier ca2 of the second planetary gear apparatus P2 are connected so as to rotate integrally.

In addition, the sun gear s1 of the first planetary gear apparatus P1 is connected to the motor-generator MG so as to rotate integrally therewith, and can be selectively connected to the sun gear s2 of the second planetary gear apparatus P2 via the first clutch C1. The carrier ca1 of the first planetary gear apparatus P1 and the carrier ca2 of the second planetary gear apparatus P2, which are connected together, can be selectively connected to the input shaft I via the third clutch C3, and can be selectively held stationary on the case Ds via the second brake B2. The ring gear r1 of the first planetary gear apparatus P1 can be selectively held stationary on the case Ds via the first brake B1. The sun gear s2 of the second planetary gear apparatus P2 can be selectively connected to the sun gear s1 of the first planetary gear apparatus P1 via the first clutch C1, and can be selectively connected to the input shaft I via the second clutch C2. The ring gear r2 of the second planetary gear apparatus P2 is connected to the output shaft O so as to rotate integrally therewith.

As shown in FIG. 20, by using the structure described above, in this hybrid drive apparatus H, the motor-generator MG is disposed more toward the engine E side than the first planetary gear apparatus P1, and the first planetary gear apparatus P1 and the second planetary gear apparatus P2 are disposed adjacently. Thereby, it is possible to dispose the motor-generator MG, which generally has a larger diameter than the gear train of the first planetary gear apparatus P1 and the second planetary gear apparatus P2, at a position on the engine E side that corresponds to the position of a torque converter of a conventional automatic transmission. Therefore, it becomes possible to make a hybrid drive apparatus H that is compact compared with the conventional automatic transmission. In addition, because it is possible to make the gear train of the first planetary gear apparatus P1 and the second planetary gear apparatus P2 and the like a unit that is separate from the motor-generator MG, it is possible to improve the assembly characteristics of the hybrid drive apparatus H.

The Operating Modes of the Hybrid Drive Apparatus H

Figures 22, 23:
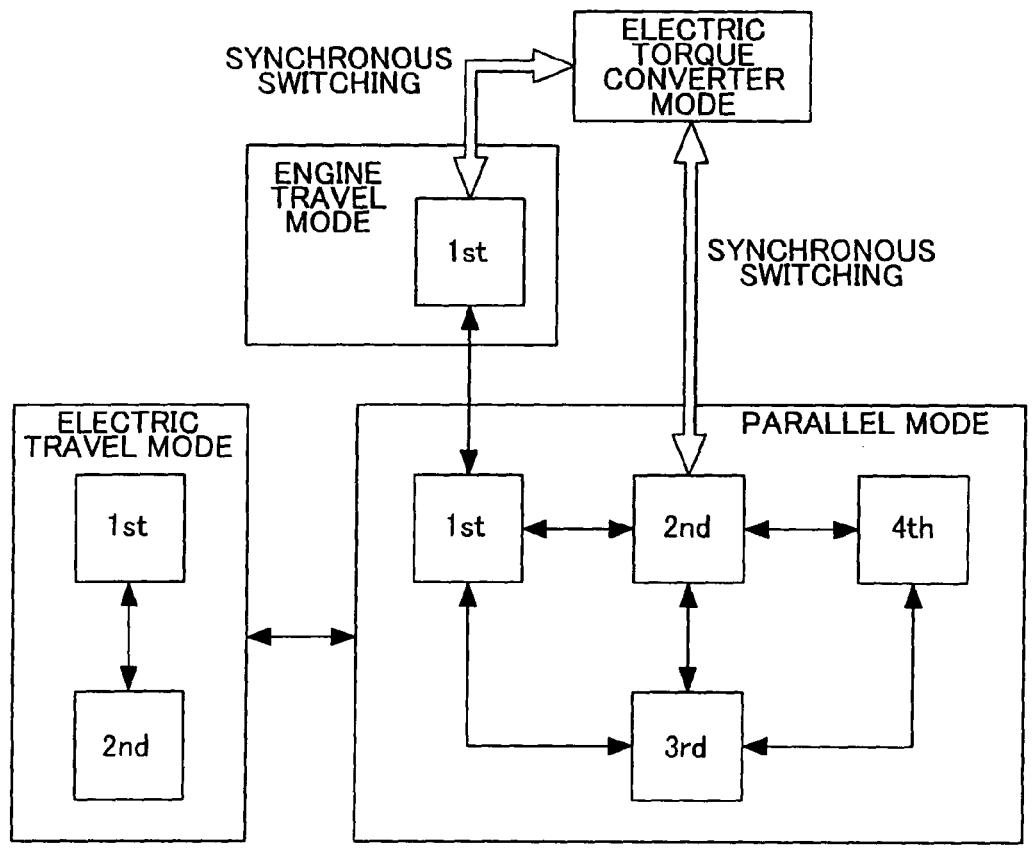
FIG. 22 is a drawing that shows the operating table of the third embodiment.
FIG. 23 is a drawing that shows the relationship between the operating modes and the shift speeds that are available for switching in the third embodiment.
Figure 24:
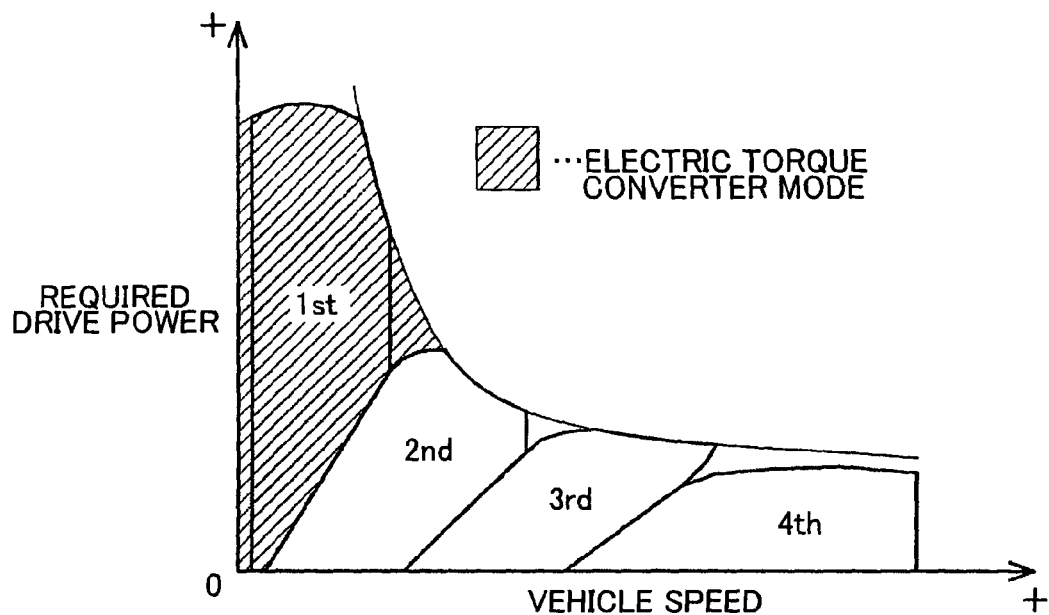
FIG. 24 is a drawing that shows an example of a control map of the third embodiment.

Next, the operating modes that can be realized by the hybrid drive apparatus H according to the present embodiment will be explained. FIG. 22 is an operating diagram that shows a plurality of working modes and the operating state of each of the friction engagement elements C1, C2, C3, B1, and B2 at one or more shift speeds that are provided with each of the operating modes. In this figure, "○" represents the state in which each of the friction engagement elements is engaged, and no mark represents a state in which each of the friction engagement elements is disengaged. In addition, FIG. 23 is a drawing that shows the relationships between the modes available for switching and the shift speeds. Note that the wide arrows in the figure show the relationship in which synchronous switching is possible. FIG. 24 is a drawing that shows an example of a control map that determines the relationship between the speed of the vehicle (vehicle speed), the required drive power, and the assigned range of each of the shift speeds in the electric torque converter mode and the parallel mode. In this figure as well, the abscissa axis is the vehicle speed and the axis of ordinate is the required drive power, which is based on the accelerator operation and the like by the driver.

Figure 25:
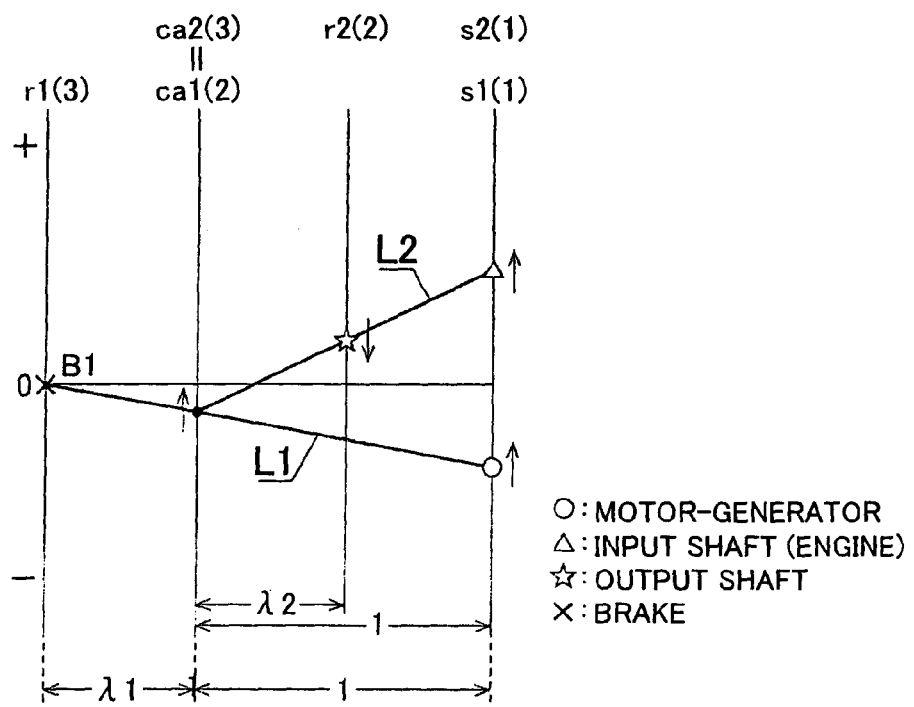
FIG. 25 is a velocity diagram for the electric torque converter mode of the third embodiment.
Figure 26:
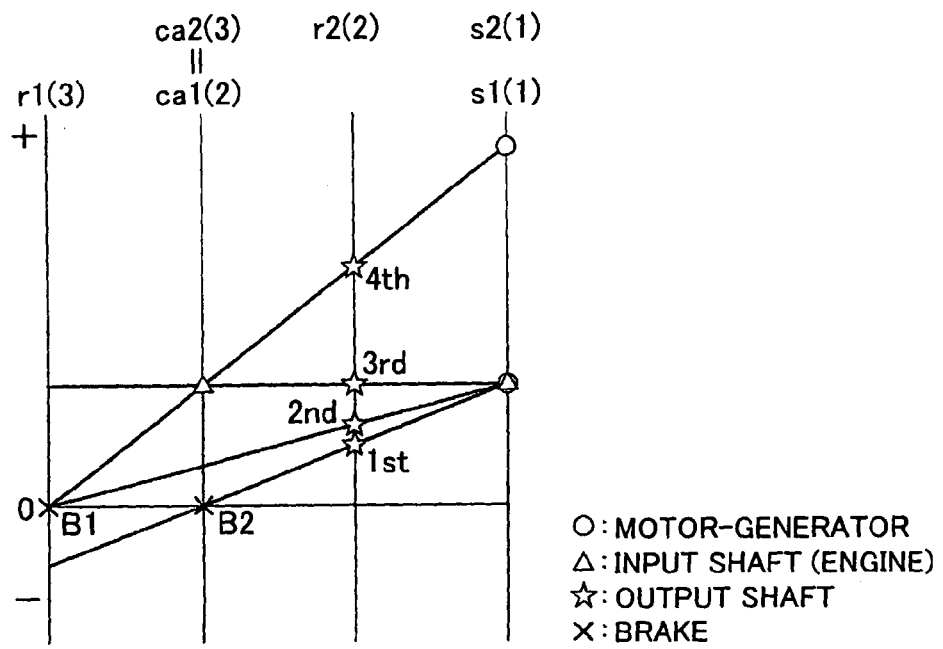
FIG. 26 is a velocity diagram for the parallel mode of the third embodiment.
Figure 27:
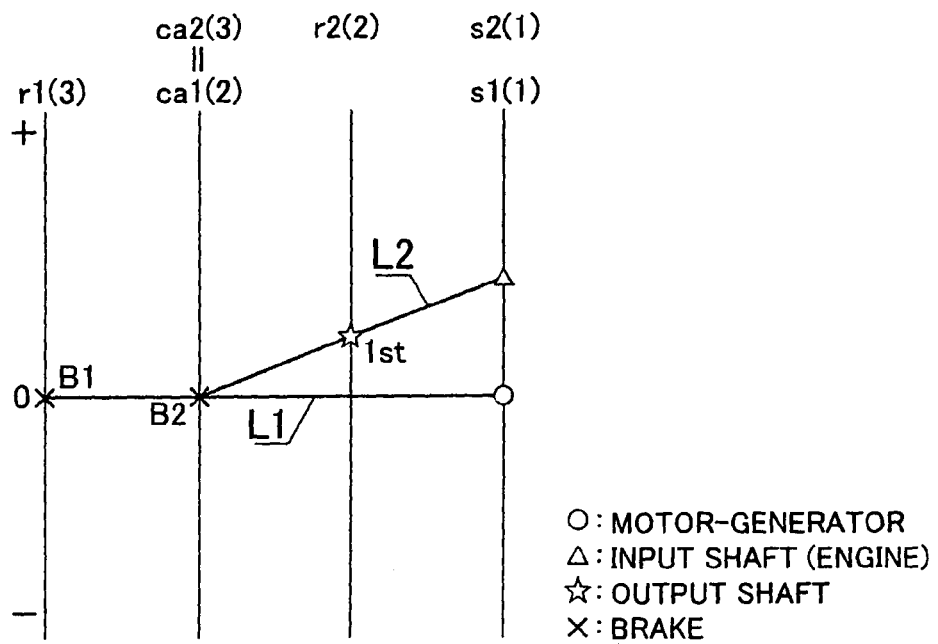
FIG. 27 is a velocity diagram for the engine travel mode of the third embodiment.

In addition, FIG. 25, FIG. 26, and FIG. 27 show velocity diagrams of the first planetary gear apparatus P1 and the second planetary gear apparatus P2, where FIG. 25 shows the velocity diagram for the electric torque converter mode and FIG. 26 shows the velocity diagram for the parallel mode, and FIG. 27 shows the velocity diagram for the engine travel mode. Note that "1st" and "2nd" in FIG. 26 are the same as the velocity diagram for the electric travel mode. In these velocity diagrams, axis of ordinates correspond to the rotational speeds of each of the rotating elements. Specifically, "0" shown corresponding to the axis of ordinate shows that the rotational speed is nil, the side above the "0" is a positive rotational speed and the side below "0" is negative rotational speed. In addition, each of the plurality of ordinates that are disposed in parallel corresponds to each of the rotating elements of the first planetary gear apparatus P1 and the second planetary gear apparatus P2. Specifically, "s1", "ca1", and "r1", which are shown above each of the ordinates, respectively correspond to the sun gear s1, carrier ca1, and the ring gear r1 of the first planetary gear apparatus P1, and "s2" "r2", "and ca2" respectively correspond to the sun gear s2, ring gear r2, and the carrier ca2 of the second planetary gear apparatus P2. In addition, the gaps in the ordinates that correspond to each of the rotating elements correspond to the gear ratios of the first planetary gear apparatus P1 and the second planetary gear apparatus P2. In addition, in FIG. 25 and FIG. 27, the straight line L1 shows the operating state of the first planetary gear apparatus P1, and the straight line L2 shows the operating state of the second planetary gear apparatus P2. In addition, in FIG. 26, each of the straight lines shows the operating states of the first planetary gear apparatus P1 and the second planetary gear apparatus P2 in each of the shift speeds. Note that in these velocity diagrams "○" shows the rotational speed of the motor-generator MG, "Δ" shows the rotational speed of the input shaft I (engine E), "☆" shows the rotational speed of the output shaft O, and "×" shows the brake.

Note that in FIG. 22 to FIG. 27, "1st" denotes the first forward speed of the parallel mode, the electric travel mode, and the electric torque converter mode. In addition, "2nd" denotes the second forward speed of the parallel mode and the electric travel mode. Additionally, "3rd" and "4th" respectively denote the third forward speed and the fourth forward speed in the parallel mode.

As shown in FIG. 22 to FIG. 27, this hybrid drive apparatus H is structured so as to include three operating modes, that is, the "electric torque converter mode", the "parallel mode", and the "electric travel mode", and furthermore, includes an "engine travel mode" in which travel is possible by using only the drive power of the engine E, without using the motor-generator MG. Thereby, this hybrid drive apparatus H can switch between a total of four operating modes. In addition, this hybrid drive apparatus H includes four shift speeds in the parallel mode, and includes two shift speeds in the electric travel mode. In addition, the switching between these operating modes and within each of these operating modes is carried out by engaging and disengaging each of the friction engagement elements C1, C2, C3, B1, and B2 by controlling the hydraulic control apparatus 13 using control instructions from the switching control means 36 of the control apparatus ECU. At this time, the switching control apparatus 36 outputs control instructions to the hydraulic control apparatus 13 according to the result of selecting the operating mode and the shift speed that has been carried out by the mode-shift speed selecting means 37 depending on the control map that is shown in FIG. 24. Note that at this time, the control apparatus ECU carries out control of the rotational speed and rotational torque of the motor-generator MG, and control of the rotational speed and the rotational torque of the engine E, and the like. In the present embodiment, the mode-shift speed selecting means 37 selects the operating mode and the shift speed that are regulated depending on the vehicle speed and the required force output that have been obtained by the vehicle speed detecting means 35 and the required drive power detecting means 40 according to the control map that is shown in FIG. 24. Specifically, the mode-shift speed selecting means 37 selects the electric torque converter mode when the vehicle is accelerating from a standstill or and when the vehicle speed is extremely low. In addition, in other conditions, the mode-shift speed selecting means 37 selects each of the shift speeds for the parallel mode and the electric travel mode according to the vehicle speed and the required drive power and the like. Note that the electric travel mode is selected in the case in which the engine stop conditions identifying means 41 has identified that the engine stop conditions have been satisfied. In addition, the engine travel mode is selected in the case in which conditions such as the vehicle accelerating from a standstill in the electric torque converter mode and the state of charge of the battery being very low are satisfied. Below, the operating states of the hybrid drive apparatus H in each operating mode will be explained in detail.

Electric Torque Converter Mode

As shown in FIG. 22, in the electric torque converter mode, the second clutch C2 and the first brake B1 are engaged. Thereby, the ring gear r1 of the first planetary gear apparatus P1 is held stationary on the case Ds, and the sun gear s2 of the second planetary gear apparatus P2 is connected to the input shaft I so as to rotate integrally therewith.

At this time, as shown by the straight line L1 in FIG. 25, in the first planetary gear apparatus P1, in order of rotational speed, the rotational speed of the ring gear r1, which is on one side, becomes nil with respect to the sun gear s1, which is on the other side. Therefore, the absolute value of the rotational speed of the sun gear s1, which is connected to the motor-generator MG so as to rotate integrally therewith, is reduced, and the resulting rotational speed is transferred to the carrier ca1, which is intermediate in the order of rotational speed. Note that at this time, because the motor-generator MG has a negative rotation (the rotation speed is negative) that is opposite to that of the input shaft I (engine E), the carrier ca1 also rotates negatively. Here, the carrier ca1 of the first planetary gear apparatus P1 and the carrier ca2 of the second planetary gear apparatus P2 are connected so as to rotate integrally. Therefore, the first planetary gear apparatus P1 reduces the absolute value of the rotational speed of the motor-generator MG, and the resulting rotational speed is transferred to the carrier ca2 of the second planetary gear apparatus P2. Thereby, the rotational torque of the motor-generator MG, which has been amplified according to the gear change ratio due to the first planetary gear apparatus P1, is transferred to the carrier ca2 of the second planetary gear apparatus P2. Specifically, in the present embodiment, the first planetary gear apparatus P1 is a single pinion type, and thus, as shown in the lower portion of FIG. 25, where the gear ratio of the first planetary gear apparatus P1 (the tooth ratio of the sun gear s1 and the ring gear r1=[number of teeth in sun gear s1]/[number of teeth in ring gear r1]) is $\lambda 1$, a relationship is established in which: rotational torque of the ring gear r2:rotational torque of the carrier ca2:rotational torque of the sun gear s2 (motor-generator MG)=1:(1+$\lambda$):1. Therefore, in the case in which, for example, the gear ratio $\lambda 1$=0.5 approximately, a rotational torque that is about three times the rotational torque of the motor-generator MG is transferred to the carrier ca2 of the second planetary gear apparatus P2 via the carrier ca1. Note that this gear ratio $\lambda 1$ can be appropriately set by taking into consideration, for example, the characteristics of the motor-generator MG and the weight of the vehicle and the like.

In addition, as shown by the L2 in FIG. 25, in the second planetary gear apparatus P2, the ring gear r2, which is intermediate in the order of rotational speed, rotates integrally with the output shaft O, and the sun gear s2, which is at one side in the order of the rotational speed, rotates integrally with the input shaft I. In addition, the rotation of the motor-generator MG, which has been reduced by the first planetary gear apparatus P1 as described above, is transferred to the carrier ca2, which is on the other side in the order of rotational speed. Therefore, the second planetary gear apparatus P2 combines the rotation of the motor-generator MG after reduction and the rotation of the input shaft I (engine E) and outputs the resulting rotation to the output shaft O. Specifically, in the second planetary gear apparatus P2, the rotational torque of the motor-generator MG, which is transferred to the carrier ca2 via the first planetary gear apparatus P1, serves as a resistive force to the rotational torque of the input shaft I (engine E), which is transferred to the sun gear s2, and these rotating torques are combined and transferred to the output shaft O. At this time, the carrier ca2, which rotates integrally with the carrier ca1 of the first planetary gear apparatus P1, rotates negatively and the sun gear s2, which rotates integrally with the engine E and the input shaft I, rotates positively, and thus the absolute value of the rotational speed of the ring gear r2, which is between these in order of rotational speed, is reduced with respect to the absolute value of the rotational speed of the sun gear s2. Therefore, the second planetary gear apparatus P2 reduces the absolute value of the rotational speed of the input shaft I and the resulting rotational speed is transferred to the output shaft O. Thereby, the rotational torque of the input shaft I is amplified and transferred to the output shaft O. Specifically, in the present embodiment, because the second planetary gear apparatus P2 is a double pinion type, as shown in the lower portion of the FIG. 25, where the gear ratio of the second planetary gear apparatus P2 (tooth ratio of the sun gear s2 and the ring gear r2=[number of teeth of the sun gear s2]/[number of teeth of the ring gear r2]) is $\lambda 2$, a relationship is established in which rotational torque of the carrier ca2:rotational torque of the ring gear r2 (output shaft O):rotational torque of the sun gear s1 (input shaft I)=(1−$\lambda 2$):1:$\lambda 2$. Therefore, in the case in which, for example, the gear ratio $\lambda 2$=0.5 approximately, about half of the rotational torque of the sun gear s2 (input shaft I) is distributed to the carrier ca2 (the amplified rotational torque of the motor-generator MG), and thereby a rotational torque that is about twice the rotational torque of the input shaft I (engine E) is transferred to the output shaft O. Note that this gear ratio $\lambda 2$ can be appropriately set by taking into consideration the characteristics of the engine E and the motor-generator MG and the vehicle weight and the like.

In addition, this hybrid drive apparatus H functions as an electric torque converter by operating as follows. Specifically, when the vehicle is starting, by gradually increasing the positive direction rotational torque by negatively rotating the motor-generator MG to generate power, the reaction force is increased by gradually increasing the positive direction rotational torque of the negatively rotating carrier ca2 of the second planetary gear apparatus P2, and the rotational speed of this carrier ca2 is increased (i.e., the absolute value of the negative direction rotation speed is reduced). Thereby, the vehicle can be smoothly started by gradually increasing the rotational speed of the ring gear r2 of the second planetary gear apparatus P2, which is connected to the output shaft O. At this time, it is possible to transfer an output torque that is about (1/$\lambda 2$) times the engine torque to the output shaft O. In addition, at this time, because the rotational torque of the motor-generator MG, which has been amplified by the first planetary gear apparatus P1, acts as a reaction force, even in the case in which an motor-generator MG whose output torque is comparatively small is used, it is possible to obtain a sufficient reaction force. Note that the upward and downward marks shown at the side of each of the rotating elements in FIG. 25 shows the direction of the rotational torque of each of the rotating elements during such a start.

In addition, this hybrid drive apparatus H is structured so as to enable synchronous switching in which, as shown in FIG. 23, when switching modes from the electric torque converter mode to the second forward speed of the parallel mode, the engaging of the first clutch C1 is carried out while the rotational speeds of the input-side rotation member and output-side rotating member of the first clutch C1 are the same. Furthermore, the hybrid drive apparatus H according to the present embodiment is structured so as to enable synchronous switching in which, when switching the mode to the first forward speed of the engine travel mode, the engaging of the second brake B2 is carried out while the rotational speed of the rotating side member of the second brake B2 is nil. Specifically, as shown in FIG. 20, in the present embodiment, the sun gear s2 of the second planetary gear apparatus P2, which rotates integrally with the input shaft I (engine E) while the second clutch C2 is engaged, and the sun gear s1 of the first planetary gear apparatus P1, which rotates integrally with the motor-generator MG, correspond to the input-side rotating member and the output-side rotating member of the first clutch C1. In addition, the carriers ca1 and ca2 of the first planetary gear apparatus P1 and the second planetary gear apparatus P2, which rotate integrally, correspond to the rotating side member of the second brake B2.

In the electric torque converter mode, by further increasing the rotational speed by increasing the positive direction rotational torque of the motor-generator MG (i.e., the absolute value of the negative direction rotational speed is reduced) from the state that is shown in FIG. 25, as shown in FIG. 27, it is possible to make the rotational speed of the motor-generator MG nil. At this time, by continuing the engagement of the first brake B1 as-is, the straight line L1 becomes horizontal, and all of the three rotating elements of the first planetary gear apparatus P1 cease to rotate and stop. Therefore, because the rotational speed of the carriers ca1 and ca2 of the first planetary gear apparatus P1 and the second planetary gear apparatus P2, which are the rotating side members of the second brake B2, becomes nil, it is possible to engage the second brake B2 without causing shock or the like. In addition, as shown in FIG. 22, by engaging the second brake B2, it is possible to switch from the electric torque converter mode to the first forward speed of the engine travel mode, and therefore, it is possible to realize synchronous switching therebetween.

In addition, from the state in which the straight line that is shown in FIG. 27 has becomes horizontal, the rotational speed is increased by increasing the positive direction rotational torque by further running the motor-generator MG without engaging the second brake B2. It is thereby possible to make the rotational speed of the motor-generator MG and the rotational speed of the input shaft I match, like the straight line that represents the state of the second forward speed in the velocity diagram in FIG. 26. In this state, because the rotational speed of the sun gear s2 of the second planetary gear apparatus P2 and the rotational speed of the sun gear s1 of the planetary gear apparatus P1, which are the input-side rotating member and the output-side rotating member of the first clutch C1, match, it is possible to engage the first clutch C1 without causing shock or the like. In addition, as shown in FIG. 22, by engaging the first clutch C1, it is possible to switch from the electric torque converter mode to the second forward speed of the parallel mode, and therefore, it is possible to realize synchronous switching therebetween. Note that in the hybrid drive apparatus H of the present embodiment, it is possible to carry out synchronous switching that changes to the parallel mode while the positive direction rotational torque is generated in the motor-generator MG. That is, according to this structure, when switching from the electric torque converter mode to the parallel mode, the direction of the rotational torque of the motor-generator MG does not change. Therefore, it is possible to prevent any gear grinding noise due to the change of the meshing direction of the gears of the first planetary gear apparatus P1, and thereby it is possible to carry out synchronous switching more quietly and smoothly.

Note that synchronous switching that is realized by engaging the second brake B2 and synchronous switching that is realized by engaging first clutch C1 are both realized in a process in which the rotational speed of the output shaft O is increased by increasing the rotational speed of the motor-generator MG when travelling in the electric torque converter mode. Specifically, according to the present embodiment, when the vehicle is accelerating from a standstill, first a state that enables synchronous switching from the electric torque converter mode to the first forward speed of the engine travel mode is attained, and here, when the vehicle further accelerates without switching the mode, a state is attained that enables synchronous switching from the electric torque converter mode to the second forward speed of the parallel mode. In addition, in switching to either of these modes, the shock that accompanies the engagement of the friction engagement elements does not occur, and it is possible to switch smoothly. Note that in switching the mode from the electric torque converter mode, the control processing for determining whether to select the first forward speed of the engine travel mode or the second forward speed of the parallel mode will be explained in detail by using the flow chart in the "3-7. Special control processing" below.

Engine Travel Mode

The engine travel mode is a mode that enables traveling by using only the drive power of the engine E, without using the motor-generator MG. In the present embodiment, the hybrid drive apparatus H includes only a first forward speed in the engine travel mode. As shown in FIG. 22, in the first forward speed of the engine travel mode, the second clutch C2, the first brake B1, and the second brake B2 are engaged. As shown in FIG. 23, the first forward speed of this engine travel mode enables switching between the electric torque converter mode and the first forward speed of the parallel mode. Specifically, the first forward speed of the engine travel mode is realized from the electric torque converter mode by engaging the second brake B2. As described above, switching from this electric torque converter mode to the first forward speed can be carried out by using synchronous switching. In addition, the first forward speed of the engine travel mode is realized from the first forward speed of the parallel mode by disengaging the first clutch C1 and engaging the first brake B1.

In addition, as shown in FIG. 20 and FIG. 27, in the first forward speed of the engine travel mode, by engaging the second clutch C2, the input shaft I (engine E) is directly linked to the sun gear s2 of the second planetary gear apparatus P2 and rotates integrally therewith. In addition, by engaging the first brake B1 and the second brake B2, the rotation of the all of the rotating elements of the first planetary gear apparatus P1 is stopped. In this state, the carrier ca2 of the second planetary gear apparatus P2, which is held stationary on the case Ds by the second brake B2, acts as a reaction force point on the rotational torque of the input shaft I (engine E), and the rotational torque of the motor-generator MG becomes unnecessary. In addition, the absolute value of the rotational speed of the sun gear s2 of the second planetary gear apparatus P2, which is connected to the input shaft I, is reduced, the resulting rotational speed is transferred to the ring gear r2 of the second planetary gear apparatus P2 to be output from the output shaft O.

Parallel Mode

Each of the shift speeds of the parallel mode of the hybrid drive apparatus H according to the present embodiment is structured almost identically to those of the first embodiment described above. Specifically, in the parallel mode, this hybrid drive apparatus H has a first forward speed and a second forward speed that function as speed reduction stages that are established while the input shaft I and the motor-generator MG are directly linked; a third forward speed that functions as a directly linked speed that is similarly established while the input shaft I and the motor-generator MG are directly linked, and the rotational speed of the input shaft I is transferred to the output shaft O at the same speed; and a fourth forward speed that functions as an acceleration speed in which the absolute value of the rotational speed of the input shaft I is increased and the resulting rotational speed is transferred to the output shaft O and the absolute value of the rotational speed of the motor-generator MG is decreased and the resulting rotational speed is transferred to the output shaft O. Below, the operating state of the hybrid drive apparatus H in each of the shift speeds will be explained.

As shown in FIG. 22, in the first forward speed of the parallel mode, the first clutch C1, the second clutch C2, and the second brake B2 are engaged. As shown in FIG. 23, this first forward speed can switch between the first forward speed of the engine travel mode, and the second forward speed and the third forward speed of the parallel mode. Specifically, the first forward speed of the parallel mode is realized from the first forward speed of the engine travel mode by disengaging the first brake B1 and engaging the first clutch C1. In addition, the first forward speed of the parallel mode is realized from the second forward speed of the parallel mode by disengaging the first brake B1 and engaging the second brake B2. In addition, the first forward speed of the parallel mode is realized from the third forward speed by disengaging the third clutch C3 and engaging the second brake B2. In addition, the parallel mode is able to switch with the electric torque converter mode. Additionally, the first forward speed of the electric travel mode is realized from the first forward speed of the parallel mode by disengaging the second clutch C2.

In addition, as shown in FIG. 20 and FIG. 26, in the first forward speed of the parallel mode, by engaging the first clutch C1 and the second clutch C2, the input shaft I (engine E) and the motor-generator MG are directly linked to the sun gear s2 of the second planetary gear apparatus P2, and rotates integrally therewith. In addition, by engaging the second brake B2, the absolute value of the rotational speed of the sun gear s2 of the second planetary gear apparatus P2 is reduced, the resulting rotational speed is transferred to the ring gear r2 of the second planetary gear apparatus P2 to be output from the output shaft O. Among the plurality of shift speeds of the parallel mode, the gear change ratio of the first forward speed is set so as to be the largest. In addition, this gear change ratio is identical to that of the first forward speed of the engine travel mode.

As shown in FIG. 22, in the second forward speed of the parallel mode, the first clutch C1, the second clutch C2, and the first brake B1 are engaged. As shown in FIG. 23, this second forward speed enables switching between the electric torque converter mode and the first forward speed, the second forward speed, and the fourth forward speed of the parallel mode. Specifically, the second forward speed of the parallel mode is realized from the electric torque converter mode by engaging the first clutch C1. In addition, the second forward speed of the parallel mode is realized from the first forward speed of the parallel mode by disengaging the second brake B2 and engaging the first brake B1. In addition, the second forward speed of the parallel mode is realized from the third forward speed by disengaging the third clutch C3 and engaging the first brake B1. In addition, the second forward speed of the parallel mode is realized from the fourth forward speed by disengaging the third clutch C3 and engaging the second clutch C2. In addition, the parallel mode is able to switch with the electric travel mode. Additionally, the second forward speed of the electric travel mode is realized from the second forward speed of the parallel mode by disengaging the second clutch C2.

In addition, as shown in FIG. 20 and FIG. 26, in the second forward speed of the parallel mode, similar to the first forward speed, by engaging the first clutch C1 and the second clutch C2, the input shaft I (engine E) and the motor-generator MG are directly linked to the second gear s2 of the second planetary gear apparatus P2, and these rotate integrally therewith. In addition, by engaging the first brake B1, the absolute value of the rotational speed of the sun gear s2 of the second planetary gear apparatus P2 is reduced, the resulting rotational speed is transferred to the ring gear r2 of the second planetary gear apparatus P2 to be output to the output shaft O. The gear change ratio of the second forward speed of this parallel mode is set so as to be smaller than the gear change ratio of the first forward speed of the parallel mode.

As shown in FIG. 22, in the third forward speed, the first clutch C1, the second clutch C2, and the third clutch C3 are engaged. As shown in FIG. 23, this third forward speed can switch between the first forward speed, the second forward speed, and the fourth forward speed of the parallel mode. Specifically, the third forward speed is realized from the first forward speed of the parallel mode by disengaging the second brake B2 and engaging the third clutch C3. In addition, the third forward speed is realized from the second forward speed of the parallel mode by disengaging the first brake B1 and engaging the third clutch C3. In addition, the third forward speed is realized from the fourth forward speed by disengaging the first brake B1 and engaging the second clutch C2. Note that the parallel mode is able to switch to the electric travel mode, but similar to the first embodiment described above, in this embodiment as well, it is not possible to switch directly to the electric travel mode from the third forward speed of the parallel mode. Therefore, when switching from the third forward speed of the parallel mode to the electric travel mode, control is carried out to switch to the electric travel mode after switching to the second forward speed or the fourth forward speed of the parallel mode. The control processing at this time is carried out similarly to the control processing that was explained in "1-6. Special control processing" according to the first embodiment described above.

In addition, as shown in FIG. 20 and FIG. 26, in the third forward speed, similar to the first forward speed of the parallel mode, by engaging the first clutch C1 and the second clutch C2, the input shaft I (engine E) and the motor-generator MG are directly linked to the sun gear s2 of the second planetary gear apparatus P2, and these rotate integrally therewith. Furthermore, by engaging the third clutch C3, the first planetary gear apparatus P1 and the second planetary gear apparatus P2 are in a directly linked state in which the whole rotates integrally, and the rotation speeds of the input shaft I and the motor-generator MG are transferred and output to the output shaft while they are the same and output. Therefore, the gear change ratio of this third forward speed becomes 1.

As shown in FIG. 22, in the fourth forward speed, the first clutch C1, the third clutch C3, and the first brake B1 are engaged. As shown in FIG. 23, this fourth forward speed can switch between the second forward speed and the third forward speed of the parallel mode. Specifically, the fourth forward speed is realized from the second forward speed by disengaging the second clutch C2 and engaging the third clutch C3. In addition, the fourth forward speed is realized from the third forward speed by disengaging the second clutch C2 and engaging the first brake B1. In addition, the parallel mode is able to switch with the electric travel mode. Additionally, the second forward speed of the electric travel mode is realized from the fourth forward speed of the parallel mode by disengaging the third clutch C3.

In addition, as shown in FIG. 20 and FIG. 26, in the fourth forward speed, by engaging the first clutch C1, the motor-generator MG is directly linked to the sun gear s2 of the second planetary gear apparatus p2, and rotates integrally wherewith. In addition, by engaging the third clutch C3 and the first brake B1, the absolute value of the rotational speed of the input shaft I (engine E) is increased and the resulting rotational speed is transferred to the ring gear r2 of the second planetary gear apparatus P2 to be output from the output shaft O. Therefore, the gear change ratio of this fourth forward speed is less than 1.

Electric Travel Mode

Each of the shift speeds of the electric travel mode of the hybrid drive apparatus H according to the present embodiment are established almost identically to those of the first embodiment. Specifically, in the electric travel mode, this hybrid drive apparatus H has a first forward speed and a second forward speed that function as speed reduction stages in which the absolute value of the rotational speed of the motor-generator MG is reduced and the resulting rotational speed is transferred to the output shaft O. The first forward speed and the second forward speed of the electric travel mode are identical to the first forward speed and the second forward speed of the parallel mode according to the present embodiment, except that the input shaft I is separated from the sun gear s2 of the second planetary gear apparatus P2 by disengaging the second clutch C2.

In addition, as described above, the first forward speed of the electric travel mode is realized from the first forward speed of the parallel mode by disengaging the second clutch C2. In addition, the second forward speed of the electric travel mode is realized from the second forward speed of the parallel mode by disengaging the second clutch C2 and is realized from the fourth forward speed of the parallel mode by disengaging the third clutch C3. In addition, it is possible to switch between the first forward speed and the second forward speed of the electric travel mode by engaging either the first brake B1 or the second brake B2.

Special Control Processing

Figure 28:
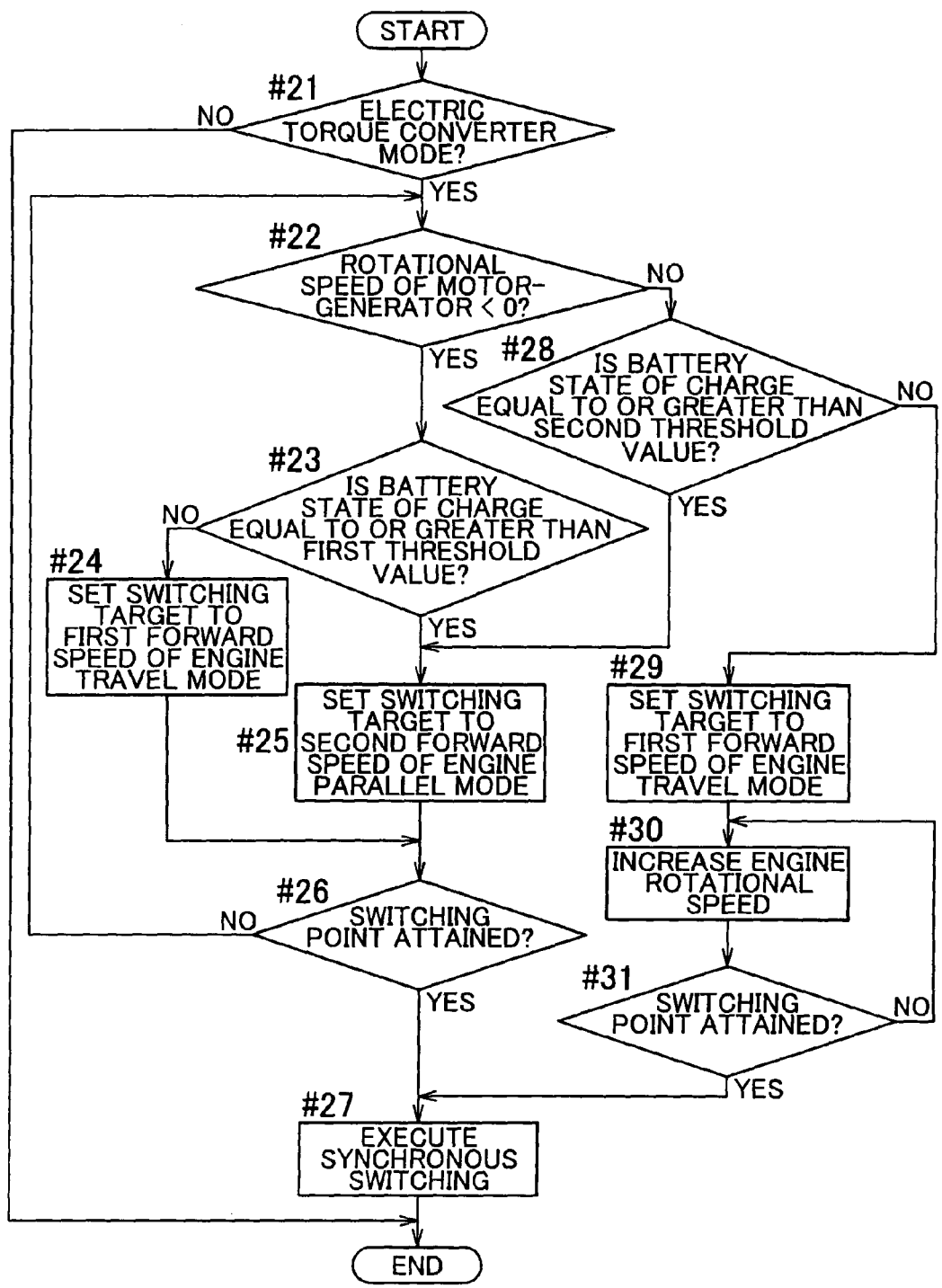
FIG. 28 is a drawing that shows a flowchart for the special control processing of the third embodiment.

Next, the control processing will be explained for determining which operating mode and shift speed to select when the hybrid drive apparatus H according to the present embodiment switches the mode from the electric torque converter mode in the case in which there is a plurality of operating modes that enable synchronous switching and shift speeds. Specifically, in the present embodiment, there are the first forward speed of the engine travel mode and the second forward speed of the parallel mode that function as operating modes and shift speeds that enable synchronous switching from the electric torque converter mode, and thus control processing is carried out to determine which to select. FIG. 28 is a flowchart showing this control processing. Briefly, this control processing carries out control in which a threshold value for the state of charge of the battery is used that differs depending on the rotational direction of the motor-generator MG. In the case in which the state of charge of the battery is higher than this threshold value, the second forward speed of the parallel mode, which uses the drive power of the motor-generator MG, is selected, and in the case in which the state of charge of the battery is equal to or less than this threshold value, the first forward speed of the engine travel mode, in which the drive power of the motor-generator MG is not used, is selected. This control processing is carried out by the control apparatus ECU performing this determination based on information from each of the portions of the vehicle and outputting command signals to each of the portions of the hybrid drive apparatus H such as the hydraulic control apparatus 13 and the like. This will be explained in detail below.

First, the control apparatus ECU determines whether or not the current state of the hybrid drive apparatus H is in the electric torque converter mode (step #21). In the case in which the current state is not in the electric torque converter mode (step #21: No), there is no need to carry out this control processing, and the processing ends. In addition, in the case in which the current state is in the electric torque converter mode (step #21: Yes), next, the control apparatus ECU determines whether or not the rotational speed of the motor-generator MG, which that has been detected by the motor-generator rotation detecting means 34, is less than nil (the rotational speed is negative) (step #22). In the case in which the rotational speed of the motor-generator MG is less than nil (step #22: Yes), the hybrid drive apparatus H is in the state as shown in the velocity diagram in FIG. 25. Therefore, in order to switch from this state to the first forward speed of the engine travel mode, it is necessary to raise the rotational speed while making the motor-generator MG generate electricity until the rotational speed of the motor-generator MG is nil, that is, until the state shown in FIG. 27 has been attained. In contrast, in order to switch from this state to the second forward speed of the parallel mode, after attaining the state in which the rotational speed of the motor-generator MG is nil (the state shown in FIG. 27), the motor-generator MG is further run, and as shown by the straight line that represents the state of the second forward speed of the velocity diagram in FIG. 26, it is necessary to raise the rotational speed of the motor-generator MG until the rotational speed of the motor-generator MG matches the rotational speed of the input shaft I (engine E). Specifically, in order to switch from the electric torque converter mode to the second forward speed of the parallel mode, it is necessary to run the motor-generator MG by using the electrical power that has been charged in the battery 11.

Thus, the control apparatus ECU determines whether or not the state of charge of the battery, which has been detected by the battery state detecting means 33, is equal to or greater than a predetermined first threshold value (step #23). Here, it is advantageous for the first threshold value to be set to a value that takes into account a certain degree of storage tolerance with respect to the lower limiting value of the state of charge in the range of use of the battery 11. In addition, in the case in which the state of charge of the battery is less than a predetermined first threshold value (step #23: No), because it can be determined that the state of charge of the battery 11 is low, the mode-shift speed selecting means 37 sets the first forward speed of the engine travel mode, which does not consume the electrical power of the battery 11, to the switching target (step #24). In contrast, in the case in which the state of charge of the battery is equal to or greater than the predetermined first threshold value (step #23: Yes), because it can be determined that the state of charge of the battery 11 is sufficient, the mode should move directly to the parallel mode without passing through the engine travel mode, and the mode-shift speed selecting means 37 sets the second forward speed of the parallel mode to the switching target (step #25). In addition, when the switching point of the operation mode that has been set to the switching target has been reached (step #26), synchronous switching to this operating mode is executed (step #27). Here, in the case in which the first forward speed of the engine travel mode has been set to the switching target, the switching point of the operating mode that has been set to the switching target is the point at which, as shown in the velocity diagram in FIG. 27, the rotational speed of the motor-generator MG becomes nil. In the case in which the second forward speed of the parallel mode is set to the switching target, as shown by the straight line that represents the state of the second forward speed in the velocity diagram in FIG. 26, the switching point of the operating mode that has been set to the switching target is the point at which the rotational speed of the motor-generator MG and the rotational speed of the engine E match. Note that the processing carries out the steps from #22 to #26 repeatedly until the switching point of the operating mode that has been set to the switching target has been reached, and the setting of the switching target is carried out depending on the state of charge of the battery at this time.

In contrast, in the case in which the rotational speed of the motor-generator MG, which has been detected by the motor-generator rotation detecting means 34, is equal to or greater than nil (step #22: Yes), the hybrid drive apparatus H attains a state in which the rotational speed of the motor-generator MG becomes higher than the state shown in the velocity diagram in FIG. 27. Therefore, in order to switch from this state to the second forward speed of the parallel mode, the motor-generator MG is then run from this state, and as shown by the straight line that represents the state of the second forward speed in the velocity diagram in FIG. 26, it is necessary to increase the rotational speed of the motor-generator MG until it matches the rotational speed of the input shaft I (engine E). In contrast, in order to switch from this state to the first forward speed of the engine travel mode, it is necessary to reduce the rotational speed of the motor-generator MG while causing the motor-generator MG to generate electricity until the rotational speed of the motor-generator MG becomes nil, that is, until the state that is shown in FIG. 27 has been reached.

Thus, the control apparatus ECU determines whether or not the state of the charge of the battery, which has been detected by the battery state detecting means 33, is equal to or greater than a predetermined second threshold value (step #28). Here, the second threshold value can be set to a value that is lower than the first threshold value. This means that while the rotational speed of the motor-generator MG is equal to or greater than nil, in comparison to the case of switching to the second forward speed of the parallel mode from a state in which the rotational speed of the motor-generator MG is less than nil, it is possible to set the storage tolerance of the battery 11 lower by an equivalent amount because little electrical power is necessary until the switching. Specifically, it is advantageous to set this second threshold value to a value that takes into account the tolerance to a degree that can ensure a predetermined amount of the state of charge with respect to the lower limiting value of the state of charge in the use range of the battery 11. In addition, as shown, for example, in the velocity diagram of FIG. 27, the storage tolerance of the electrical energy at this time is advantageously set to the electrical energy that is necessary in order to rise from the state in which the rotational speed of the motor-generator MG is nil to the state in which rotational speed of the motor-generator MG matches the rotational speed of the engine E. Note that these settings of the first threshold value and the second threshold value are simply examples, and naturally these can be set to other values. In addition, in the case in which the battery state of charge is equal to or greater than a predetermined second threshold value, (step #28: Yes), it is determined that the state of charge of the battery 11 is ensured to be equal to or greater than the necessary amount. Therefore, the rotational speed of the motor-generator MG continues to be raised in this manner and the mode moves to the parallel mode, and the mode-shift speed selecting means 37 sets the second forward speed of the parallel mode to the switching target (step #25).

In contrast, in the case in which the state of charge of the battery is less than a predetermined second threshold value (step #28: No), it is determined that the state of charge of the battery 11 is extremely low, and thus power consumption of the battery 11 is suppressed, and the mode-shift speed selecting means 37 sets the first forward speed of the engine travel mode to the switching target (step #29). However, in this case, when a rotational torque having a negative direction occurs in the motor-generator MG, because the rotational speed of the motor-generator MG nil, the travel state cannot be maintained as-is because the vehicle speed decreases. Thus, in this case, the control apparatus ECU increases the rotational speed of the engine E while maintaining the rotational torque of the motor-generator MG as-is (step #30). Thereby, the rotational speed of the sun gear s2 (input shaft I) of the second planetary gear apparatus P2, which is on one side in the order of rotational speed, increases, the rotational speed of the ring gear r2 (output shaft O) of the second planetary gear apparatus P2, which is intermediate in the order of rotational speed, is maintained at a constant, and the carriers ca1 and ca2 of the first planetary gear apparatus P1 and the second planetary gear apparatus P2, which are at the other side in the order of rotational speed, decreases. Thereby, using the ring gear r1 of the first planetary gear apparatus P1, which is held stationary by the first brake B1, as a fulcrum, the rotational speeds of the sun gear s1 of the first planetary gear apparatus P1 and the motor-generator MG, which is connected thereto, decrease. In addition, when the switching point of the operating mode, that is, the point at which the rotational speed of the motor-generator MG becomes nil, has been reached (step #31), synchronous switching to the first forward speed of the engine travel mode is executed (step #27). Note that until the switching point of the operating mode has been reached, the processing continues to carry out the processing of step #30. Then the processing ends.

Fourth Embodiment

Next, a fourth embodiment of the present invention will be explained. The hybrid drive apparatus H according to the present embodiment has a structure that is similar to that of the hybrid drive apparatus H according to the third embodiment described above, but the parallel mode, the electric travel mode, and the engine travel mode have more stages. The parallel mode has six shift speeds, the electric travel mode has 3 shift speeds, and the engine travel mode has two shift speeds. Below, the hybrid drive apparatus H according to this embodiment will be explained focused on the points of difference with the third embodiment. Note that the system structure of the hybrid drive apparatus H according to the present embodiment is similar to that shown in FIG. 2, and thus the explanation of these points is omitted. In addition, with regards to the other structures as well, points that are not specifically explained are identical to the third embodiment described above.

Structures of Each of the Components of the Hybrid Drive Apparatus H

Figures 29, 30:
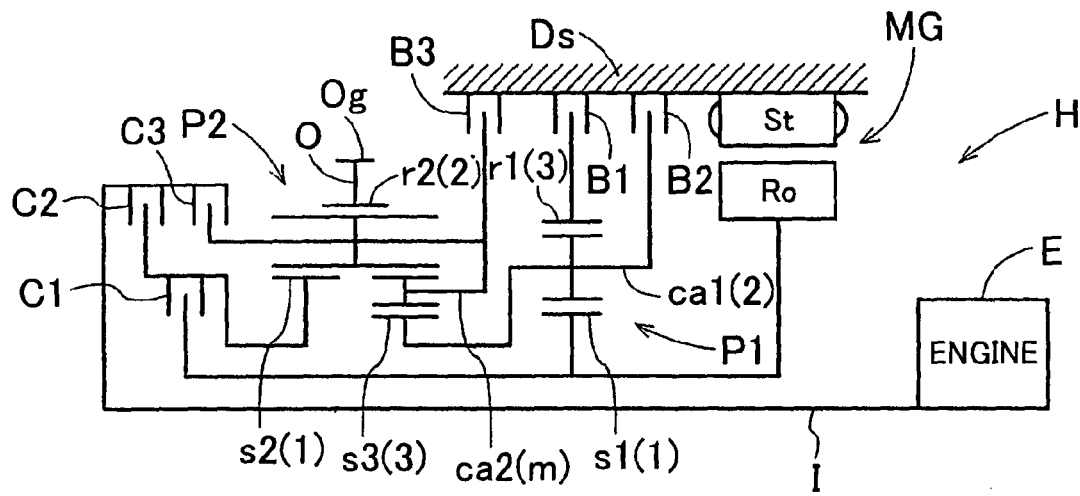
FIG. 29 is a skeletal diagram of the hybrid drive apparatus according to a fourth embodiment of the present invention.
FIG. 30 is a drawing that shows an operating diagram of the fourth embodiment.

FIG. 29 is a skeletal diagram that shows the structure of the hybrid drive apparatus H according to the present embodiment. As shown in this figure, similar to each of the embodiments described above, this hybrid drive apparatus H is also provided with an input shaft I that is connected to the engine E, an output shaft O that is connected to wheels (refer to FIG. 2), a motor-generator MG, a first planetary gear apparatus P1, and a second planetary gear apparatus P2. In addition, these structures are accommodated in a case Ds, which functions as a non-rotating member that is fastened to the vehicle body. However, in the hybrid drive apparatus H according to the present embodiment, while the structure of the first planetary gear apparatus P1 is similar to that of the third embodiment except for the point that the carrier ca1 is connected to the second sun gear s3 of the second planetary gear apparatus P2, the second planetary gear apparatus P2 is structured so as to have four rotating elements, and this point differs from the third embodiment described above. In addition, accompanying these differences, the number of rotating elements becomes larger than that of the third embodiment.

The second planetary gear apparatus P2 according to the present embodiment is structured by a Ravigneaux planetary gear apparatus that is disposed coaxially to the input shaft I. Specifically, the second planetary gear apparatus P2 has as rotating elements two sun gears, that is, a first sun gear s2 and a second sun gear s3, a ring gear r2, and a shared carrier ca2 that supports a long pinion gear that meshes with both the first sun gear s2 and the ring gear r2 and a short pinion gear that meshes with the long pinion gear and the second sun gear s3. The ring gear r2 is connected with the output shaft O so as to rotate integrally therewith. In addition, the first sun gear s2 is selectively connected to the sun gear s1 of the first planetary gear apparatus P1 via a first clutch C1, and is selectively connected to the input shaft I via a second clutch C2. Specifically, the rotational speed of the input shaft I is selectively transferred to this first sun gear s2 by the second clutch C2 and the rotation of the motor-generator MG is selectively transferred to this sun gear s2 by the first clutch C1. The second sun gear s3 is connected to the carrier ca1 of the first planetary gear apparatus P1 so as to rotate integrally therewith. The second sun gear s3 and the carrier ca1 of the first planetary gear apparatus P1 are selectively held stationary on the case Ds via a second brake B2. In addition, the carrier ca2 is selectively held stationary on the case Ds via a third brake B3, and is selectively connected to the input shaft via a third clutch C3. In the present embodiment, the first sun gear s2, the ring gear r2, and the second sun gear s3 respectively correspond to the "first rotating element (1)", the "second rotating element (2)", and the "third rotating element (3)" of the second planetary gear apparatus P2 in the present invention. In addition, the carrier ca2 corresponds to the "intermediate rotating element (m)" of the second planetary gear apparatus P2 in the present invention.

Note that similar to each of the friction engagement elements in each of the embodiments described above, a multi-plate brake that is operated by oil pressure that is supplied via a hydraulic control apparatus 13 can be used as the third brake B3.

Operating Modes of the Hybrid Drive Apparatus H

Figure 31:
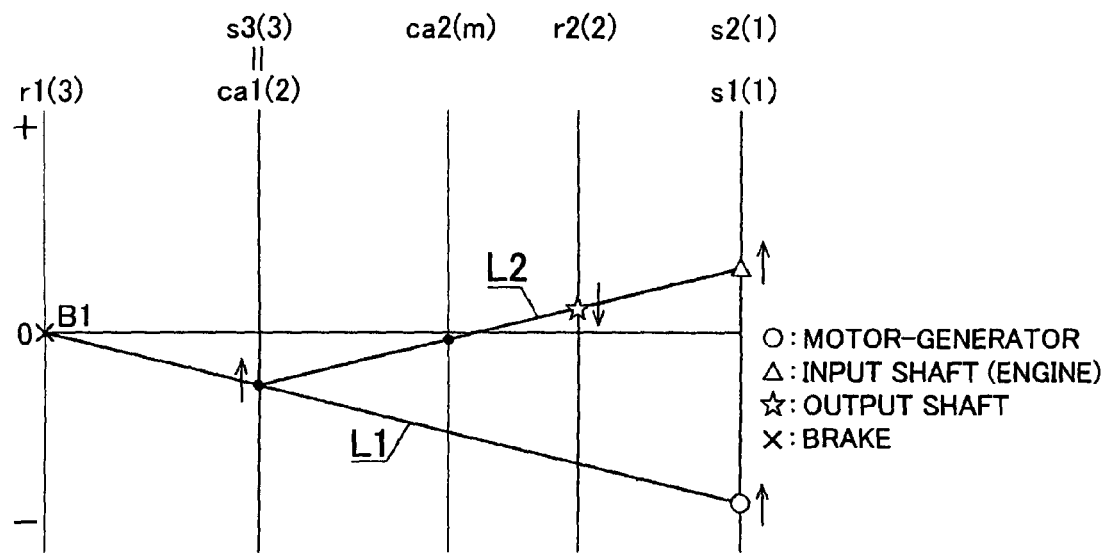
FIG. 31 is a velocity diagram for the electric torque converter mode of the fourth embodiment.
Figure 32:
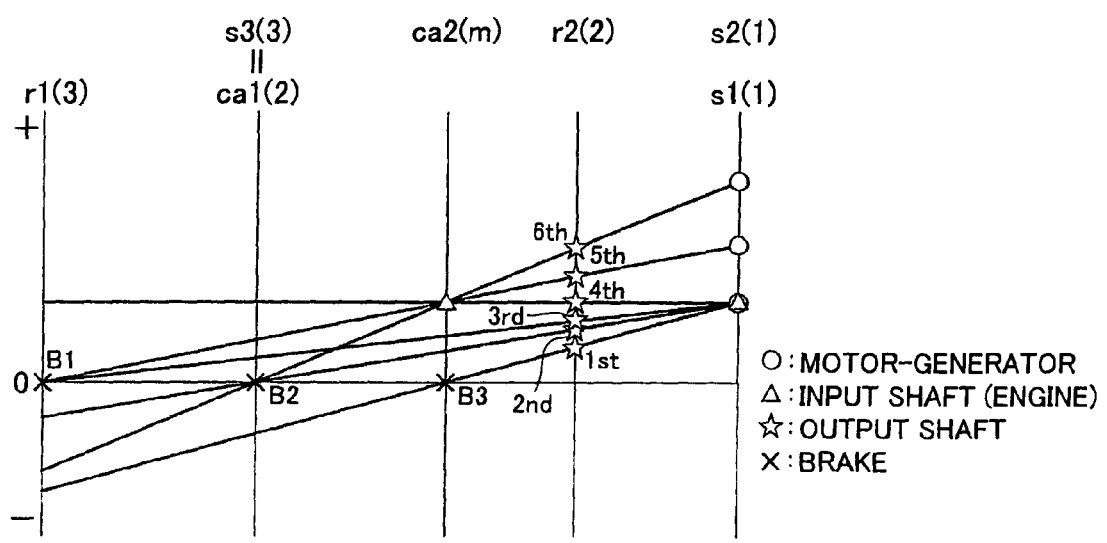
FIG. 32 is a velocity diagram for the parallel mode of the fourth embodiment.
Figure 33:
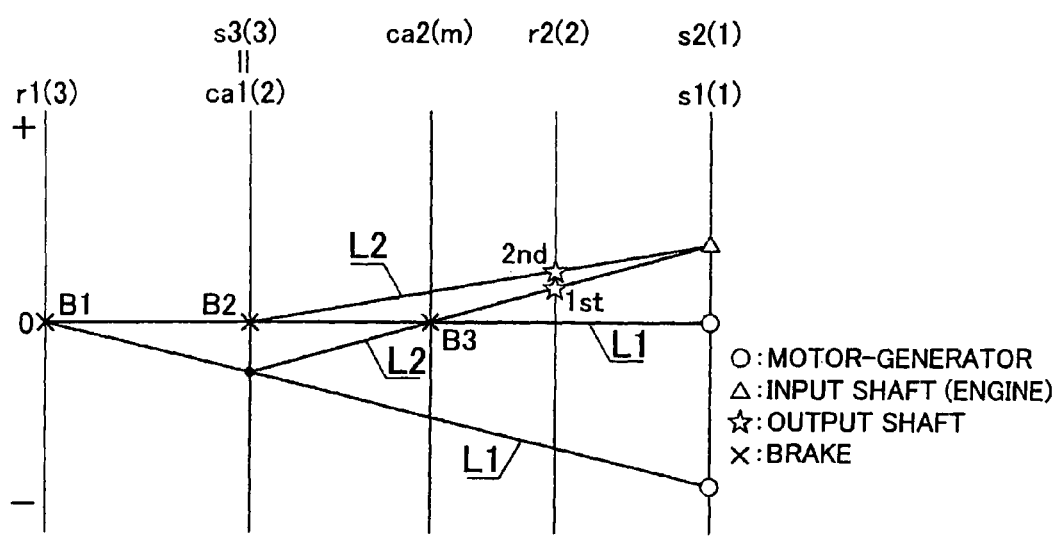
FIG. 33 is a velocity diagram of the engine travel mode of the fourth embodiment.

Next, the operating modes that can be realized by the hybrid drive apparatus H according to the present embodiment will be explained. FIG. 30 is an operating diagram that shows the plurality of operating modes and the operating states of each of the friction engagement elements C1, C2, C3, B1, B2, and B3 for each of the one or more shift speeds that are provided by each of the operating modes. In addition, FIG. 31, FIG. 32, and FIG. 33 respectively correspond to FIG. 25, FIG. 26, and FIG. 27, which are related to the third embodiment. Specifically, these figures show the velocity diagrams of the first planetary gear apparatus P1 and the second planetary gear apparatus P2, and FIG. 31 is the velocity diagram for the electric torque converter mode, FIG. 32 is the velocity diagram for the parallel mode, and FIG. 33 shows the velocity diagram of the engine travel mode. Note that "1st", "2nd", and "3rd" in FIG. 32 are common to the velocity diagram of the electric travel mode. In these velocity diagrams, similar to FIG. 25, FIG. 26, and FIG. 27, each of the plurality of ordinates that are disposed in parallel correspond to each of the rotating elements of the first planetary gear apparatus P1 and the second planetary gear apparatus P2. Specifically, "s1", "ca1", and "r1" that are shown above the ordinates correspond respectively to the sun gear s1, the carrier ca1, and the ring gear r1 of the first planetary gear apparatus P1, and "s2", "r2", "ca2", and "s3" respectively correspond to the first sun gear s2, the ring gear r2, the carrier ca2, and the second sun gear s3 of the second planetary gear apparatus P2. Additionally, in FIG. 31 and FIG. 33, the straight line L1 shows the operating state of the first planetary gear apparatus P1, and the straight line L2 shows the operating state of the second planetary gear apparatus P2. In addition, in FIG. 32, each of the straight lines show the operating state of the first planetary gear apparatus P1 and the second planetary gear apparatus P2 in each of the shift speeds.

Note that in FIG. 30 to FIG. 33, "1st" and "2nd" respectively show the first forward speed and the second forward speed of the parallel mode, the electric travel mode, and the engine travel mode. In addition, "3rd" shows the third forward speed in the parallel mode and the electric travel mode. Additionally, "4th", "5th", and "6th" respectively show the fourth forward speed, the fifth forward speed, and the sixth forward speed of the parallel mode.

As shown in FIG. 30 to FIG. 33, this hybrid drive apparatus H is similar to the third embodiment on the point that it is structured so as to enable switching between four operating modes, that is, the "electric torque converter mode", "the parallel mode", "the electric travel mode", and the "engine travel mode" using one motor-generator MG. In contrast, this hybrid drive apparatus H has more shift speeds than the third embodiment described above, and specifically, the parallel mode has six shift speeds, the electric travel mode has three shift speeds, and the engine travel mode has two shift speeds. Below, the operating state of the hybrid drive apparatus H in each of these operating modes will be explained in detail.

Electric Torque Converter Mode

In the present embodiment, as shown in FIG. 30, in the electric torque converter mode, the second clutch C2 and the first brake B1 are engaged. Thereby, the ring gear r1 of the first planetary gear apparatus P1 is held stationary on the case Ds, and the first sun gear s2 of the second planetary gear apparatus P2 is connected to the input shaft I so as to rotate integrally therewith. At this time, as shown by the straight line L1 in FIG. 31, in the first planetary gear apparatus P1, with respect to the sun gear s1, which is at one side in the order of the rotational speed, the rotational speed of the ring gear r1, which is at the other side, becomes nil. Therefore, the absolute value of the rotational speed of the sun gear s1, which is connected to the motor-generator MG so as to rotate integrally therewith, is reduced, and the resulting rotational speed is transferred to the carrier ca1, which is intermediate in the order of the rotational speed. Therefore, the first planetary gear apparatus P1 reduces the absolute value of the rotational speed of the motor-generator MG, and the resulting rotational speed is transferred to the second planetary gear apparatus P2. Thereby, the rotational torque of the motor-generator MG, which is amplified depending on the gear change ratio according to the first planetary gear apparatus P1, is transferred to the second s3 of the second planetary gear apparatus P2.

In addition, as shown by L2 in FIG. 31, in the second planetary gear apparatus P2, the ring gear r2, which is second in order of rotational speed, rotates integrally with the output shaft O, and the first sun gear s2, which is first in order of rotational speed, rotates integrally with the input shaft I. In addition, the rotation of the motor-generator MG, which has been reduced by the first planetary gear apparatus P1, is transferred to the second sun gear s3, which is fourth in order of rotational speed. In this mode, the carrier ca2, which is third in order of rotational speed, can rotate freely. Note that here, "order of rotational speed" is the order from the high-speed side to the low-speed side. By having such a structure, the second planetary gear apparatus P2 combines the rotation of the motor-generator MG after being reduced and the rotation of the input shaft I (engine E) and transfers the resulting rotation to the output shaft O. Specifically, in the second planetary gear apparatus P2, the rotational torque of the motor-generator MG, which has been transferred to the second sun gear s3 via the first planetary gear apparatus P1, acts as a reaction force on the rotational torque of the input shaft I (engine E), which has been transferred to the first sun gear s2, and thereby these rotational torques are combined and output to the output shaft O. At this time, the second sun gear s3 has a negative rotation, and the first sun gear s2, which rotates integrally with the engine E and the input shaft I, has a positive rotation. Thus, the absolute value of the rotational speed of the ring gear r2, which is intermediate between these in the order of rotational speed, is reduced with respect to the absolute value of the rotational speed of the first sun gear s2. Therefore, similar to the third embodiment described above, the second planetary gear apparatus P2 reduces the absolute value of the rotational speed of the input shaft I and transfers the resulting rotational speed to the output shaft O. Thereby, the rotational torque of the input shaft I is amplified, and the resulting rotational torque is transferred to the output shaft O.

In addition, this hybrid drive apparatus H can function as an electric torque converter by operating similarly to the third embodiment described above. In addition, by operating similarly to the third embodiment, when switching modes from the electric torque converter mode, this hybrid drive apparatus is also structured so as to enable synchronous switching to the third forward speed of the parallel mode and to the second forward speed of the engine travel mode. Note that in the present embodiment, the third forward speed of the parallel mode corresponds to the second forward speed of the parallel mode in the third embodiment, and the second forward speed of the engine travel mode corresponds to the first forward speed of the engine travel mode in the third embodiment. In addition, the present embodiment is further structured so as to enable synchronous switching, in which the engaging of the third brake B3 is carried out while the rotational speed of the rotating side member of the third brake B3 is nil when switching modes from the electric torque converter mode to the first forward speed of the engine travel mode. Here, the carrier ca2 of the second planetary gear apparatus P2 corresponds to the rotation side member of the third brake B3.

That is, in the electric torque converter mode, by raising the rotational speed by increasing the positive direction rotational torque of the motor-generator MG further (i.e., reducing the absolute value of the rotational speed in the negative direction) from the state shown in FIG. 31, as shown by the straight line L2 that represents the state of the first forward speed of the velocity diagram in FIG. 33, the rotational speed of the carrier ca2 of the second planetary gear apparatus P2, which is the rotating side member of the third brake B3, can be made nil. Therefore, it is possible to engage the third brake B3 without generating shock or the like. In addition, as shown in FIG. 30, by engaging the third brake B3, it is possible to switch from the electric torque converter mode to the first forward speed of the engine travel mode, and therefore, switching between these can be realized.

Engine Travel Mode

In this embodiment, the hybrid drive apparatus H has a first forward speed and a second forward speed in the engine travel mode. As shown in FIG. 30, in the first forward speed of the engine travel mode, the second clutch C2, the first brake B1 and the third brake B3 are engaged. In addition, as shown in FIG. 29 and FIG. 33, in the first forward speed of the engine travel mode, by engaging the second clutch C2, the input shaft I (engine E) is directly linked to the first sun gear s2 of the planetary gear apparatus P2, and rotates integrally therewith. In addition, by engaging the first brake B1 and the third brake B3, the rotation of the ring gear r1 of the first planetary gear apparatus P1 and the carrier ca2 of the second planetary gear apparatus P2 is stopped. In this state, the carrier ca2 of the second planetary gear apparatus P2, which is held stationary on the case Ds by the third brake B3, acts as a reaction force point on the rotational torque of the input shaft I (engine E), and the rotational torque of the motor-generator MG is not necessary. In addition, the absolute value of the rotational speed of the first sun gear s2 of the second planetary gear apparatus P2, which is connected to the input shaft I, is reduced, and the resulting rotational speed is transferred to the ring gear r2 of the second planetary gear apparatus P2 to be output from the output shaft O.

In addition, as shown in FIG. 30, in the second forward speed of the engine travel mode, the second clutch C2, the first brake B1, and the second brake B2 are engaged. In addition, as shown in FIG. 29 and FIG. 33, in the second forward speed o the engine travel mode, by engaging the second clutch C2, the input shaft I (engine E) is directly to the first sun gear s2 of the second planetary gear apparatus P2 and rotates integrally therewith. Additionally, by engaging the first brake B1 and the second brake B2, the rotation of all the rotating elements of the first planetary gear apparatus P1 is stopped. In this state, the second sun gear s3 of the second planetary gear apparatus P2, which is held stationary on the case Ds by the second brake B2, acts as a reaction force point on the rotational torque of the input shaft I (engine E), and the rotational torque of the motor-generator MG becomes unnecessary. In addition, the absolute value of the rotational speed of the sun gear s2 of the second planetary gear apparatus P2, which his connected to the input shaft I, is reduced and the resulting rotational speed is transferred to the ring gear r2 of the second planetary gear apparatus P2 to be output from the output shaft O.

Parallel Mode

In the present embodiment, in the parallel mode, the hybrid drive apparatus H has a first forward speed, a second forward speed, and a third forward speed functions as speed reduction stages that are established by directly linking the input shaft I and the motor-generator MG; a fourth forward speed that is similarly established by directly engaging the input shaft I and the motor-generator MG, and functions as a direct link stage in which the rotational speed of the input shaft I is transferred to the output shaft O at the same speed; and a fifth forward speed and a sixth forward speed function as an acceleration speed stage in which the absolute value of the rotational speed of the input shaft I is increased and the resulting rotational speed is transferred to the output shaft O and the absolute value of the rotational speed of the motor-generator MG is reduced and the resulting rotational speed is transferred to the output shaft O. Below, the operating state of the hybrid drive apparatus H at each of the shift speeds will be explained.

As shown in FIG. 30, in the first forward speed, the first clutch C1, the second clutch C2, and the third brake B3 are engaged. In addition, as shown in FIG. 29 and FIG. 30, in the first forward speed, by engaging the first clutch C1 and the second clutch C2, the input shaft I (engine E) and the motor-generator MG are directly linked to the first sun gear s2 of the second planetary gear apparatus P2, and these rotate integrally therewith. Additionally, by engaging the third brake B3, the absolute value of the rotational speed of the first sun gear s2 of the second planetary gear apparatus P2 is reduced, and the resulting rotational speed is transferred to the ring gear r2 of the second planetary gear apparatus P2 to be output from the output shaft O. The gear change ratio of this first forward speed is set so as to be the largest among the plurality of shift speeds of the parallel mode.

As shown in FIG. 30, in the second forward speed, the first clutch C1, the second clutch C2, and the second brake B2 are engaged. In addition, as shown in FIG. 29 and FIG. 32, in the second forward speed, similar to the first forward speed, by engaging the first clutch C1 and the second clutch C2, the input shaft I (engine E) and the motor-generator MG are directly linked to the first sun gear s2 of the second planetary gear apparatus P2, and rotate integrally therewith. Additionally, by engaging the second brake B2, the absolute value of the rotational speed of the first sun gear s2 of the second planetary gear apparatus P2 is reduced and the resulting rotational speed is transferred to the ring gear r2 of the second planetary gear apparatus P2 to be output from the output shaft O. The gear change ratio of this second forward speed is set so as to be smaller than the gear change ratio of the first forward speed.

As shown in FIG. 30, in the third forward speed, the first clutch C1, the second clutch C2, and the first brake B1 are engaged. In addition, as shown in FIG. 29 and FIG. 32, in the third forward speed, similar to the first forward speed, by engaging the first clutch C1 and the second clutch C2, the input shaft I (engine E) and the motor-generator MG are directly linked to the first sun gear s2 of the second planetary gear apparatus P2, and rotate integrally therewith. Additionally, by engaging the first brake B1, the absolute value of the rotational speed of the first sun gear s2 of the second planetary gear apparatus P2 is reduced, and the resulting rotational speed is transferred to the ring gear r2 of the second planetary gear apparatus P2 to be output to the output shaft O. The gear change ratio of this third forward speed is set so as to be smaller than the gear change ratio of the second forward speed.

As shown in FIG. 30, in the fourth forward speed, the first clutch C1, the second clutch C2, and the third clutch C3 are engaged. In addition, as shown in FIG. 29 and FIG. 32, in the fourth forward speed, similar to the first forward speed, by engaging the first clutch C1 and the second clutch C2, the input shaft I (engine E) and the motor-generator MG are directly linked to the first sun gear s2 of the second planetary gear apparatus P2, and these rotate integrally therewith. Furthermore, by engaging the third clutch C3, the first planetary gear apparatus P1 and the second planetary gear apparatus P2 are directly linked such that the whole rotates integrally, and the rotational speeds of the input shaft I and the motor-generator MG are transferred to the output shaft O at the same speed and output. Therefore, the gear change ratio of this fourth forward speed is 1. Note that the hybrid drive apparatus H of the present embodiment, similar to the first embodiment, is also structured such that a gear change ratio of 1 cannot be realized while the input shaft I (engine E) is separated, and it is not possible to switch directly from the fourth forward speed of the parallel mode to the electric travel mode. Therefore, similar to the control processing that was described in "1-6. Special control processing" according to the first embodiment described above, when switching from the fourth forward speed of the parallel mode to the electric travel mode, control is carried out in which the mode is switched to the electric travel mode after switching to the third forward speed or the fifth forward speed of the parallel mode.

As shown in FIG. 30, in the fifth forward speed, the first clutch C1, the third clutch C3, and the first brake B1 are engaged. In addition, as shown in FIG. 29 and FIG. 32, in the fifth forward speed, by engaging the first clutch C1, the motor-generator MG is directly linked to the first sun gear s2 of the second planetary gear apparatus P2, and rotates integrally therewith. Additionally, by engaging the third clutch C3 and the first brake B1, the absolute value of the rotational speed of the input shaft I (engine E) is reduced and the resulting rotational speed is transferred to the ring gear r2 of the second planetary gear apparatus p2 to be output from the output shaft O. Therefore, the gear change ratio of this fifth forward speed is less than 1.

As shown in FIG. 30, in the sixth forward speed, the first clutch C1, the third clutch C3, and the first brake B2 are engaged. In addition, as shown in FIG. 29 and FIG. 32, in the sixth forward speed, by engaging the first clutch C1, the motor-generator MG is directly linked to the first sun gear s2 of the second planetary gear apparatus P2, and rotates integrally therewith. Additionally, by engaging the third clutch C3 and the first brake B2, the absolute value of the rotational speed of the input shaft I (engine E) is reduced and the resulting rotational speed is transferred to the ring gear r2 of the second planetary gear apparatus p2 to be output from the output shaft O. The gear change ratio of this sixth forward speed is set so as to be less than the gear change ratio of the fifth forward speed.

Electric Travel Mode

In the present embodiment, in the electric travel mode, the hybrid drive apparatus H has a first forward speed, a second forward speed, and a third forward speed that function as speed reduction stages, in which the absolute value of the rotational speed of the motor-generator MG is reduced and the resulting rotational speed is transferred to the output shaft O. With the exception that the input shaft I is separated from the first sun gear s2 of the second planetary gear apparatus P2 by disengaging the second clutch C2, the first forward speed, the second forward speed, and the third forward speed of the electric travel mode are identical to the first forward speed, the second forward speed, and the third forward speed of the parallel mode described above.

Example of an Alternative Structure

In this present embodiment, a structure has been explained in which it is possible to realize more shift speeds than the third embodiment in the parallel mode, the electric travel mode, and the engine travel mode, by using four rotating elements in the second planetary gear apparatus P2. The structure for making the number of stages that the shift speeds that the parallel mode, the electric travel mode, and the engine travel mode have larger than that of the third embodiment is not limited to the structures that are disclosed in FIG. 29 to FIG. 33. Thus, an example of an alternative structure that enables having more stages than the first embodiment by making either the first planetary gear apparatus P1 or the second planetary gear apparatus P2 have four rotating elements will be explained below by using the velocity diagrams for the electric torque converter mode that is shown in FIG. 34 to FIG. 40. Note that in these velocity diagrams, "○" shows the rotational speed of the motor-generator MG, "Δ" shows the rotational speed of the input shaft I (engine E), "☆" shows the rotational speed of the output shaft O, and "×" shows the brake.

Figure 34:
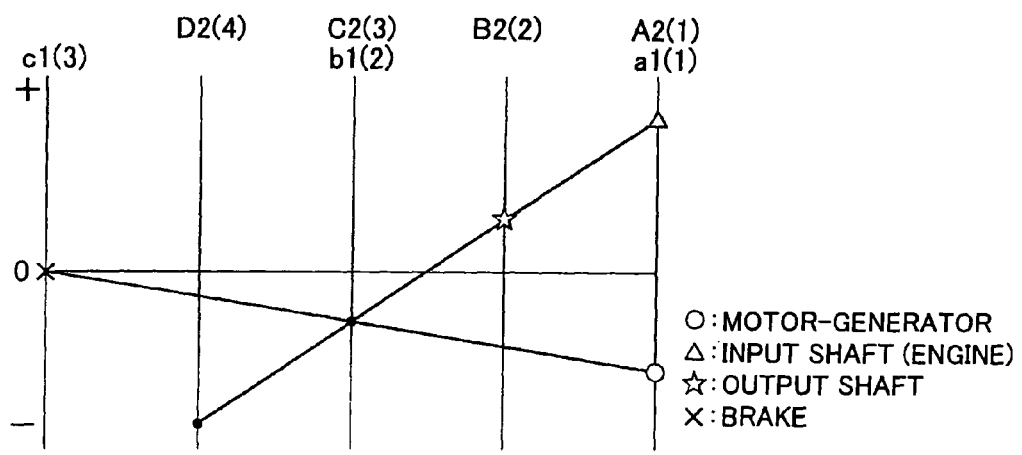
FIG. 34 is a velocity diagram that shows an example of another structure of the fourth embodiment.
Figure 35:
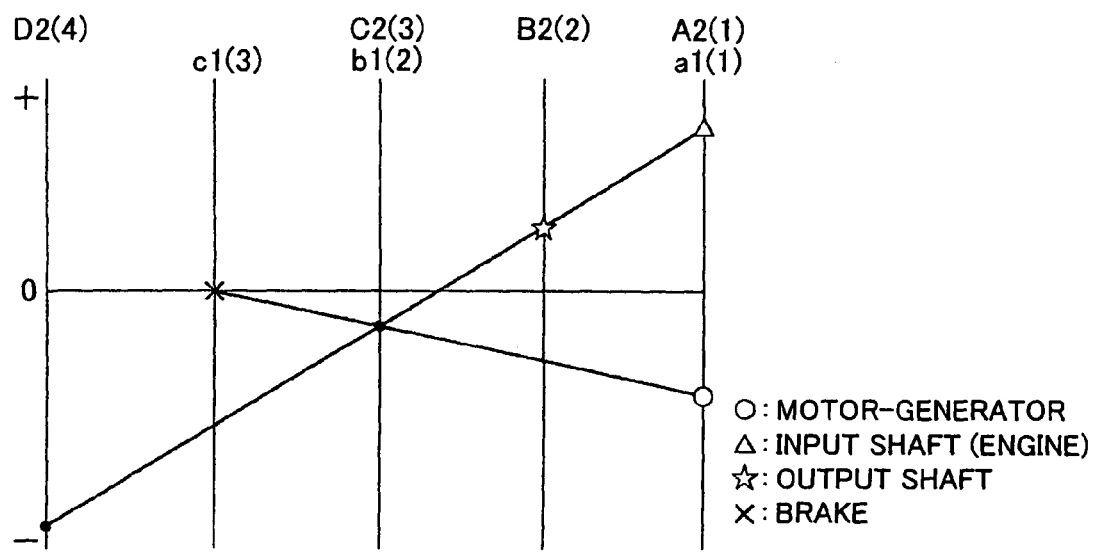
FIG. 35 is a velocity diagram that shows an example of another structure of the fourth embodiment.
Figure 36:
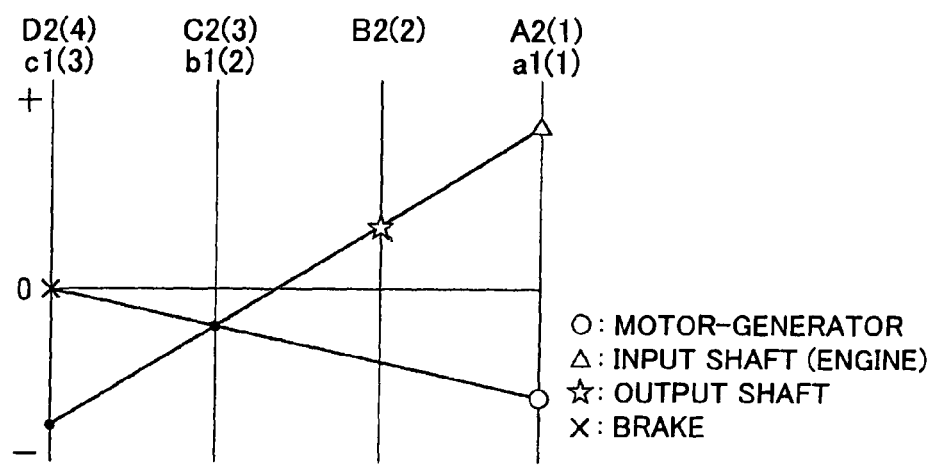
FIG. 36 is a velocity diagram that shows an example of another structure of the fourth embodiment.

Here, FIG. 34 to FIG. 36 show examples in which the first planetary gear apparatus P1 has three rotating elements and the second planetary gear apparatus P2 has four rotating elements, and FIG. 37 to FIG. 40 show an example in which the first planetary gear apparatus P1 has four rotating elements and the second planetary gear apparatus P2 has three rotating elements. However, all of these examples have the following points in common. Specifically, in the first planetary gear apparatus P1, the motor-generator MG is connected to the first rotating element (1), and the third rotating element (3) is held stationary on the case Ds by a brake. In addition, in the second planetary gear apparatus P2, the input shaft I is connected to the first rotation element (1), the output shaft O is connected to the second rotating element (2), and the second rotating element (2) of the first planetary gear apparatus P1 is connected to the third rotating element (3). Note that the disposition of the ordinates that correspond to each element in these velocity diagrams can be determined according to the setting of the gear ratios of the first planetary gear apparatus P1 and the second planetary gear apparatus P2. In addition, specific structures of each of the rotating elements of the first planetary gear apparatus P1 and the second planetary gear apparatus P2 can be applied to any type of structure that enables realizing the number of rotating elements that is necessary in each of the examples.

"a1", "b1", and "c1" that are disposed in order of the rotational speeds shown above and each of the ordinates in the velocity diagram that is shown in FIG. 34 respectively correspond to the first rotating element (1), the second rotating element (2), and the third rotating element (3) of the first planetary gear apparatus P1. In addition, "A2", "B2", and "C2" that are disposed in the order of rotational speed thereabove respectively correspond to the first rotating element (1), the second rotating element (2), and the third rotating element (3) of the second planetary gear apparatus P2. Note that because "D2" follows the third rotating element (3) in the order of rotational speed, here, it is denoted as a fourth rotating elements (4) (the examples shown in FIG. 35 and FIG. 36 are the same). In addition, in the example that is shown in FIG. 34, in the direction from the low-speed side to the high-speed side of the rotational speeds (from the right side to the left side in the figure) for the first planetary gear apparatus P1, the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the second rotating element (2) of the second planetary gear apparatus P2; the ordinate that corresponds to the second rotating element (2) of the first planetary gear apparatus P1 and the third rotating element (3) of the second planetary gear apparatus P2; the ordinate that corresponds to the fourth rotating element (4) of the second planetary gear apparatus P2; and the ordinate that corresponds to the third rotating elements (3) of the first planetary gear apparatus P1.

Note that when expressed by using wording similar to this, in the example that is shown in FIG. 31, in the direction from the high-speed side to the low-speed side of the rotational speeds (from the right side to the left side in the figure) for the first planetary gear apparatus P1, the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the second rotating element (2) of the second planetary gear apparatus P2; the ordinate that corresponds to the intermediate rotating element (m) of the second planetary gear apparatus P2; the ordinate that corresponds to the second rotating element (2) of the first planetary gear apparatus P1 and the third rotating element (3) of the second planetary gear apparatus P2; and the ordinate that corresponds to the third rotating elements (3) of the first planetary gear apparatus P1. Therefore the example that is shown in FIG. 34 differs from the example that is shown in FIG. 31 on the points that instead of an intermediate rotating element (m), the second planetary gear apparatus P2 has a fourth rotating element (4) that follows the third rotating element (3) in the order of rotational speed, and the ordinate that corresponds to this fourth rotating element (4) is disposed between the ordinate that corresponds to the second rotating element (2) of the first planetary gear apparatus P1 and the third rotating element (3) of the second planetary gear apparatus P2.

"a1", "b1", and "c1" that are disposed in order of rotational speed shown above and each of the ordinates of the velocity diagrams in FIG. 35 respectively correspond to the first rotating element (1), the second rotating element (2), and the third rotating element (3) of the first planetary gear apparatus P1. In addition, "A2", "B2", "C2", and "D2", which are disposed in the order of rotational speed thereabove, respectively correspond to the first rotating element (1), the second rotating element (2), the third rotating element (3), and the fourth rotating element (4) of the second planetary gear apparatus P2. In addition, in the example that is shown in FIG. 35, in the direction from the low-speed side to the high-speed side of the rotational speeds (from the right side to the left side in the figure) for the first planetary gear apparatus P1, the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the second rotating element (2) of the second planetary gear apparatus P2; the ordinate that corresponds to the second rotating element (2) of the first planetary gear apparatus P1 and the third rotating element (3) of the second planetary gear apparatus P2; the ordinate that corresponds to the third rotating element (3) of the first planetary gear apparatus P1; and the ordinate that corresponds to the fourth rotating elements (4) of the second planetary gear apparatus P2. That is, the example shown in FIG. 35 differs from the example that is shown in FIG. 31 on the point that, instead of an intermediate rotating element (m), the second planetary gear apparatus P2 has, a fourth rotating element (4) that follows the third rotating element (3) in order of rotational speed, and the ordinate that corresponds to this fourth rotating element (4) is disposed after the ordinate that corresponds, to the third rotating element (3) of the first planetary gear apparatus P1 in order of rotational speed.

"a1", "b1", and "c1" that are disposed in the order of rotational speed that is shown above and each of the ordinates in the velocity diagram that is shown in FIG. 36, respectively correspond to the first rotating element (1), the second rotating element (2), and the third rotating element (3) of the first planetary gear apparatus P1. In addition, "A2", "B2", "C2", and "D2", which are disposed in order of rotational speed thereabove, respectively correspond to first rotating element (1), the second rotating element (2), the third rotating element (3) and the fourth rotating element (4) of the second planetary gear apparatus P2. Additionally, in the example that is shown in FIG. 36, in the direction from the low-speed side to the high-speed side of the rotational speeds (from the right side to the left side in the figure) for the first planetary gear apparatus P1, the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the second rotating element (2) of the second planetary gear apparatus P2; the ordinate that corresponds to the second rotating element (2) of the first planetary gear apparatus P1 and the third rotating element (3) of the second planetary gear apparatus P2; and the ordinate that corresponds to the third rotating element (3) of the first planetary gear apparatus P1 and the fourth rotating elements (4) of the second planetary gear apparatus P2. That is, the example that is shown in FIG. 35 differs from the example that is shown in FIG. 31 on the point that, instead of an intermediate rotating element (m), the second planetary gear apparatus P2 has a fourth rotating element (4) that follows the third rotating element (3) in the order of rotational speed, and the ordinate that corresponds to this fourth rotating element (4) is disposed so as to coincide with the ordinate that corresponds to the third rotating element (3) of the first planetary gear apparatus P1.

Figure 37:
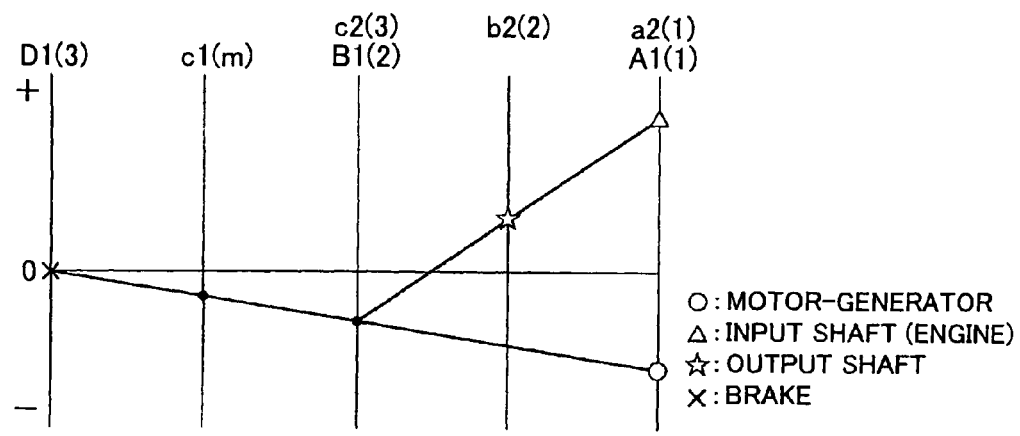
FIG. 37 is a velocity diagram that shows an example of another structure of the fourth embodiment.

"A1", "B1", "C1", and "D1" that are disposed in the order of rotational speed shown above and each of the ordinates in the velocity diagram that is shown in FIG. 37, respectively correspond to the first rotating element (1), the second rotating element (2), the intermediate rotating element (m), and the third rotating element (3) of the first planetary gear apparatus P1. In addition, "a2", "b2", and "c2", which are disposed in order of rotational speed thereabove, respectively correspond to first rotating element (1), the second rotating element (2), and the third rotating element (3) of the second planetary gear apparatus P2. Additionally, in the example that is shown in FIG. 37, in the direction from the low-speed side to the high-speed side of the rotational speeds (from the right side to the left side in the figure) for the first planetary gear apparatus P1, the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the second rotating element (2) of the second planetary gear apparatus P2; the ordinate that corresponds to the second rotating element (2) of the first planetary gear apparatus P1 and the third rotating element (3) of the second planetary gear apparatus P2; the ordinate that corresponds to the intermediate rotating element (m) of the first planetary gear apparatus P1; and the ordinate that corresponds to the third rotating element (3) of the first planetary gear apparatus P1. That is, the example that is shown in FIG. 37 differs from the example that is shown in FIG. 31 on the point that the first planetary gear apparatus P1 has an intermediate rotating element (m), and this is disposed between the ordinate that corresponds to the second rotating element (2) of the first planetary gear apparatus P1 and the third rotating element (3) of the second planetary gear apparatus P2, and the ordinate that corresponds to the third rotating element (3) of the first planetary gear apparatus P1.

Figure 38:
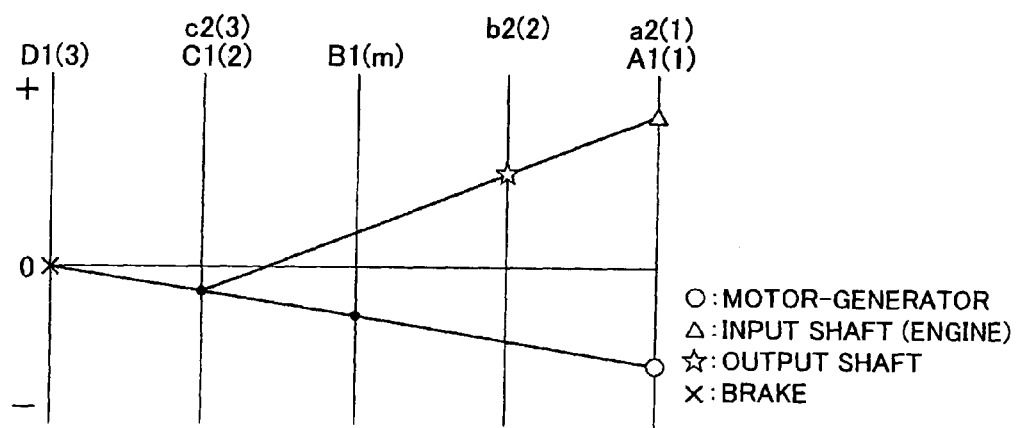
FIG. 38 is a velocity diagram that shows an example of another structure of the fourth embodiment.

"A1", "B1", "C1", and "D1" that are disposed in the order of rotational speed shown above and each of the ordinates in the velocity diagram that is shown in FIG. 38, respectively correspond to the first rotating element (1), the intermediate rotating element (m), the second rotating element (2), and the third rotating element (3) of the first planetary gear apparatus P1. In addition, "a2", "b2", "c2", which are disposed in order of rotational speed thereabove, respectively correspond to first rotating element (1), the second rotating element (2), and the third rotating element (3) the second planetary gear apparatus P2. Additionally, in the example that is shown in FIG. 38, in the direction from the low-speed side to the high-speed side of the rotational speeds (from the right side to the left side in the figure) for the first planetary gear apparatus P1, the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the second rotating element (2) of the second planetary gear apparatus P2; the ordinate that corresponds to the intermediate rotating element (m) of the first planetary gear apparatus P1; the ordinate that corresponds to the second rotating element (2) of the first planetary gear apparatus P1 and the third rotating element (3) of the second planetary gear apparatus P2; and the ordinate that corresponds to the third rotating element (3) of the first planetary gear apparatus P1. That is, the example that is shown in FIG. 38 differs from the example that is shown in FIG. 31 on the point that the first planetary gear apparatus P1 has an intermediate rotating element (m), and this is disposed between the ordinate that corresponds to the second rotating element (2) of the second planetary gear apparatus P2 and the ordinate that corresponds to the second rotating element (2) of the first planetary gear apparatus P1 and the third rotating element (3) of the second planetary gear apparatus P2.

Figure 39:
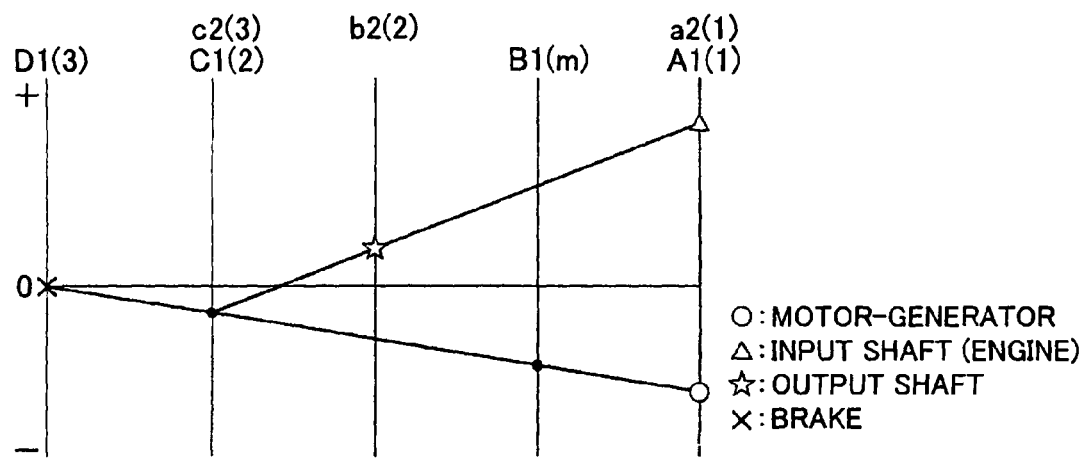
FIG. 39 is a velocity diagram that shows an example of another structure of the fourth embodiment.

"A1", "B1", "C1", and "D1" that are disposed in the order of rotational speed shown above and each of the ordinates in the velocity diagram that is shown in FIG. 39, respectively correspond to the first rotating element (1), the intermediate rotating element (m), the second rotating element (2), and the third rotating element (3) of the first planetary gear apparatus P1. In addition, "a2", "b2", "c2", which are disposed in order of rotational speed thereabove, respectively correspond to first rotating element (1), the second rotating element (2), and the third rotating element (3) the second planetary gear apparatus P2. Additionally, in the example that is shown in FIG. 39, in the direction from the low-speed side to the high-speed side of the rotational speeds (from the right side to the left side in the figure) for the first planetary gear apparatus P1, the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the intermediate rotating element (m) of the second planetary gear apparatus P1; the ordinate that corresponds to the second rotating element (2) of the second planetary gear apparatus P2; the ordinate that corresponds to the second rotating element (2) of the first planetary gear apparatus P1 and the third rotating element (3) of the second planetary gear apparatus P2; and the ordinate that corresponds to the third rotating element (3) of the first planetary gear apparatus P1. That is, the example that is shown in FIG. 39 differs from the example that is shown in FIG. 31 on the point that the first planetary gear apparatus P1 has an intermediate rotating element (m), and this is disposed between the ordinate that corresponds to the first rotating element (1) of the first planetary gear apparatus P1 and the second planetary gear apparatus P2 and the ordinate that corresponds to the second rotating element (2) of the second planetary gear apparatus P2.

Figure 40:
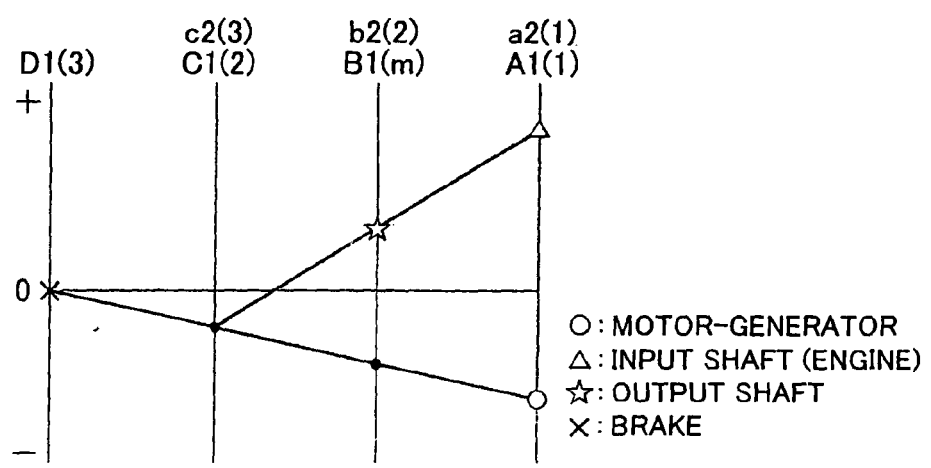
FIG. 40 is a velocity diagram that shows an example of another structure of the fourth embodiment.

"A1", "B1", "C1", and "D1" that are disposed in the order of rotational speed shown above and each of the ordinates in the velocity diagram that is shown in FIG. 40, respectively correspond to the first rotating element (1), the intermediate rotating element (m), the second rotating element (2), and the third rotating element (3) of the first planetary gear apparatus P1. In addition, "a2", "b2", "c2", which are disposed in order of rotational speed thereabove, respectively correspond to first rotating element (1), the second rotating element (2), and the third rotating element (3) of the second planetary gear apparatus P2. Additionally, in the example that is shown in FIG. 40, in the direction from the low-speed side to the high-speed side of the rotational speeds (from the right side to the left side in the figure) for the first planetary gear apparatus P1, the order of the disposition of the ordinates that correspond to each of the rotating elements is: the ordinate that corresponds to the first rotating element (1) of the first planetary gear apparatus P1 and the second planetary gear apparatus P2; the ordinate that corresponds to the intermediate rotating element (m) of the second planetary gear apparatus P1 and the second rotating element (2) of the second planetary gear apparatus P2; the ordinate that corresponds to the second rotating element (2) of the second planetary gear apparatus P1 and the third rotating element (3) of the second planetary gear apparatus P2; and the ordinate that corresponds to the third rotating element (3) of the first planetary gear apparatus P1. That is, the example that is shown in FIG. 40 differs from the example that is shown in FIG. 31 on the point that the first planetary gear apparatus P1 has an intermediate rotating element (m), and this is disposed so as to coincide with the ordinate that corresponds to the second rotating element (2) of the second planetary gear apparatus P2.

Figure 41:
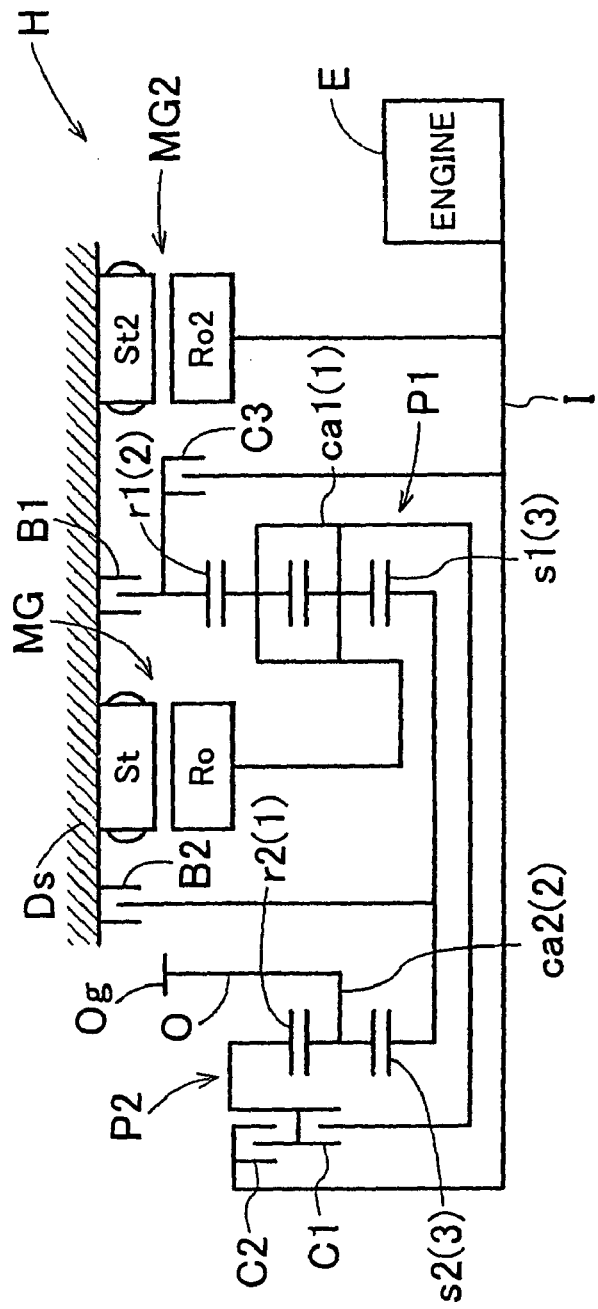
FIG. 41 is a skeletal diagram of the hybrid drive apparatus according to another embodiment of the present invention.
Figure 42:
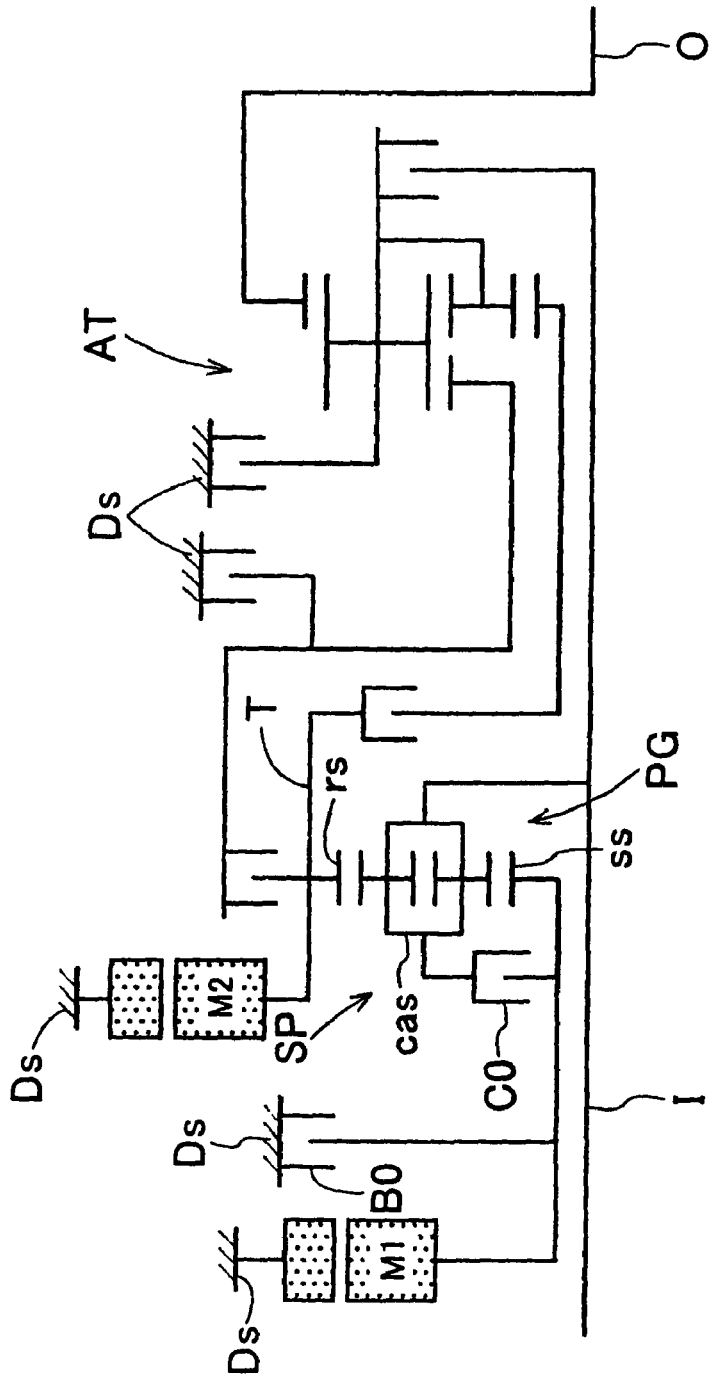
FIG. 42 is a skeletal diagram of a conventional hybrid drive apparatus.

Other Embodiments (1) In each of the embodiments described above, a structure was explained that was provided with only one motor-generator MG, which functioned as a rotary electric machine. However, a hybrid drive apparatus H that is structured so as to be provided with two or more motor-generators MG is also an advantageous embodiment of the present invention. For example, as shown in FIG. 41, it is advantageous to use a structure in which a second motor-generator MG is further provided, and the rotor Ro2 of this second motor-generator MG2 is connected to the input shaft I. According to this structure, in the parallel mode, it is possible to carry out travel that uses the rotational torque due to two motor-generators, that is motor-generator MG and motor-generator MG2. Note that in FIG. 41, a structure is illustrated in which the rotor Ro2 of the motor-generator MG2 is directly linked to the input shaft I, but a structure may be used in which this rotor Ro2 is connected to the input shaft I via a drive transfer member, such as a gear or a belt.

(2) In the first and second embodiments, an example of the case in which the hybrid drive apparatus H was structured so as to be able to switch between three operating modes, that is, the electric torque converter mode, the parallel mode, and the electric travel mode, was explained. In addition, in the third and fourth embodiments described above, an example was explained of the case in which the hybrid drive apparatus H was structured so as to be able to switch, in addition to these three operating modes, to an engine travel mode. However, structures of the hybrid drive apparatus H that are encompassed within an applicable scope of the present invention is not limited thereby. Specifically, a structure in which the hybrid drive apparatus H can realize only the electric torque converter mode or a structure in which the hybrid drive apparatus H can realize only one among the electric torque converter mode, the parallel mode, or the electric travel mode is also one advantageous embodiment of the present invention.

(3) In each of the embodiments explained above, an example of the case in which the hybrid drive apparatus H has a plurality of shift speeds in the parallel mode and the electric travel mode was explained. However, the applicable scope of the present invention is not limited thereby. Therefore, a structure in which one or both of the parallel mode and the electric travel mode have only one shift speed is one advantageous embodiment of the present invention.

(4) In addition, the structures of the first planetary gear apparatus P1 and the second planetary gear apparatus P2 that were explained in each of the embodiments described above, and the configuration of the friction engagement elements with respect to each of these rotating elements are simply examples, and all structures that enable the structure of the present invention by using other structures is included in the applicable scope of the present invention.

The present invention can be used as a drive apparatus for a hybrid vehicle.

Note that in the present application, the term "connect" includes both a structure in which the transfer of rotation is carried out directly and a structure in which the transfer of the rotation is carried out indirectly via one or more members. In addition, the term "order of rotational speeds" is either the order from the high-speed side to the low-speed side or the order from the low-speed side to the high-speed side, and either order can be obtained depending on the rotational state of each of the planetary gear apparatuses; however, in either case, the order of the rotating elements does not change. In addition, in the present application, in relation to a planetary gear apparatus that is provided with three rotating elements, that is, a sun gear, a carrier, and a ring gear, an apparatus that is obtained by a single planetary gear apparatus or by stacking a plurality of planetary gear apparatuses is called a "planetary gear apparatus". In addition, in the present application, the "rotary electric machine" is used conceptually to include any of an electric motor, a generator, and as necessary, a motor-generator that functions as both a motor and generator.

According to an exemplary aspect of the invention, in an electric torque converter mode in which the hybrid drive apparatus acts as an electric torque converter, the absolute value of the rotational speed of the rotary electric machine is reduced by the first planetary gear apparatus and the resulting rotational speed is transferred to the second planetary gear apparatus. Then, in the second planetary gear apparatus, the rotational torque of the input shaft (engine) is multiplied because the rotational torque that is transferred from the first planetary gear apparatus acts as a reacting force, and it is transferred to the output shaft. Therefore, even in the case in which a rotary electric machine that has a comparatively small output torque is used, the torque that results from multiplying the rotational torque of the rotary electric machine by the first planetary gear apparatus can be used as a reaction force. Thus, the multiplication factor of the engine torque generated when the hybrid drive apparatus functions as the electric torque converter is not reduced, and it is possible to transfer a large rotational torque to the output shaft side.

According to an exemplary aspect of the invention, the input shaft and the rotary electric machine are directly linked by engaging the first clutch, and by using the rotary electric machine that operates when the hybrid drive apparatus functions as the electric torque converter, it is possible to realize a parallel mode in which travel is carried out while the rotational torque of the input shaft (engine) is assisted by the rotational torque of the rotary electric machine.

According to an exemplary aspect of the invention, it is possible to make the shock due to the engagement of the first clutch extremely small when switching the mode from the electric torque converter mode to the parallel mode.

According to an exemplary aspect of the invention, it is possible to travel using the parallel mode over a wide travel speed range.

According to an exemplary aspect of the invention, travel at higher travel speeds becomes possible. In addition, because a structure is used in which the absolute value of the rotational speed of the rotary electric machine is reduced and the resulting rotational speed is transferred to the output shaft in such acceleration speeds as well, it is possible to transfer a sufficient regenerative torque to the rotary electric machine even at the acceleration speeds when regenerative braking control is carried out. Therefore, it is possible to increase the efficiency of the electric power generation by the rotary electric machine.

According to an exemplary aspect of the invention, by engaging the first clutch and disengaging the second clutch, by using the rotary electric machine that operates when the hybrid drive apparatus functions as the electric torque converter, it is possible to realize an electric travel mode in which travel is carried out by using only the rotational torque of the rotary electric machine while the engine is stopped.

According to an exemplary aspect of the invention, travel in the electric travel mode over a wide travel speed range becomes possible.

According to an exemplary aspect of the invention, the rotational torque of the rotary electric machine that is transferred to the second planetary gear apparatus via the first planetary gear apparatus acts as a reacting force, the reacting force and the rotation of the input shaft are combined by the second planetary gear apparatus, and it is possible to reduce the absolute value of the rotational speed of the input shaft and transfer the resulting rotational speed to the output shaft. Therefore, this hybrid drive apparatus can function as an electric torque converter that starts a vehicle while multiplying and outputting the rotational torque of the engine by gradually multiplying the rotational torque of the rotary electric machine to increase the reaction force.

In addition, at this time, the rotational torque, which has been multiplied by reducing the absolute value of the rotational speed of the rotary electric machine by the first planetary gear apparatus, acts as a reaction force, multiplies the rotational torque of the input shaft (engine) and transfers the resulting rotational torque to the output shaft. Therefore, even in the case in which a rotary electric machine that has a comparatively small output torque is used, it is possible to transfer a large rotational torque to the output shaft side without reducing the multiplication factor of the engine torque generated when the hybrid drive apparatus functions as the electric torque converter.

According to an exemplary aspect of the invention, it is possible to directly link the input shaft and the rotary electric machine by engaging the first clutch. Therefore, by using the rotary electric machine that operates when the hybrid drive apparatus functions as the electric torque converter, this hybrid drive apparatus can function as a parallel hybrid drive apparatus that runs while the rotational torque of the input shaft (engine) is assisted by the rotational torque of the rotary electric machine.

In addition, this hybrid drive apparatus is structured so as to enable synchronous switching in which, when switching from a state in which the hybrid drive apparatus functions as an electric torque converter to a state in which the hybrid drive apparatus functions as a parallel hybrid drive apparatus by engaging the first clutch, the engagement of the first clutch is carried out while the rotational speeds of the input-side rotating member and the output-side rotating member of the first clutch are the same. Therefore, when switching between these states, the shock due to the engagement of the first clutch can be made extremely small.

According to an exemplary aspect of the invention, it is possible to separate the input shaft from the second planetary gear apparatus by disengaging the second clutch. Therefore, by using the rotary electric machine that operates when the hybrid drive apparatus functions as the electric torque converter, this hybrid drive apparatus can function as an electric travel drive apparatus that runs by using only the rotational torque of the rotary electric machine while the engine is stopped.

According to an exemplary aspect of the invention, it is possible to obtain a structure that has a plurality of shift speeds when this hybrid drive apparatus functions as a parallel hybrid drive apparatus or as an electric travel drive apparatus.

In addition, this hybrid drive apparatus can function as an engine travel drive apparatus that travels using only the rotational torque of the input shaft (engine), and not using the rotational torque of the rotary electric machine. In addition, this hybrid drive apparatus is structured so as to enable synchronous switching in which, when switching from a state in which the hybrid drive apparatus functions as an electric torque converter to a state in which the hybrid drive apparatus functions as an engine travel drive apparatus by engaging the second brake, the engagement of the second brake is carried out while the rotational speeds of input-side rotating member and the output-side rotating member of the second brake are the same. Therefore, when switching between these states, it is possible to make the shock due to the engagement of the second brake extremely small.

According to an exemplary aspect of the invention, it is possible to obtain a structure that has many shift speeds when this hybrid drive apparatus functions as a parallel hybrid drive apparatus or an electric travel drive apparatus.

In addition, this hybrid drive apparatus can function as an engine travel drive apparatus that travels by using only the rotational torque of the input shaft (engine), and not using the rotational torque of the rotary electric machine. In addition, this hybrid drive apparatus is structured to enable synchronous switching in which, when switching from a state in which the hybrid drive apparatus functions as an electric torque converter to a state in which the hybrid drive apparatus functions as an engine travel drive apparatus by engaging the third brake, the engagement of the third brake is carried out while the rotational speeds of the input-side rotating member and the output-side rotating member of the third brake are the same. Therefore, when switching between these states, it is possible to make the shock due to the engagement of the third brake extremely small.

According to an exemplary aspect of the invention, it is possible to obtain a structure having a reverse shift speed when this hybrid drive apparatus functions as a parallel hybrid drive apparatus.

According to an exemplary aspect of the invention, the rotational torque of the rotary electric machine, which is transferred to the second planetary gear apparatus via the first planetary gear apparatus, acts as a reaction force, the reaction force and the rotation of the input shaft are combined by the second planetary gear apparatus, and it is possible to reduce the absolute value of the rotational speed of the input shaft and transfer the resulting rotation to the output shaft. Therefore, this hybrid drive apparatus can function as an electric torque converter that starts a vehicle while multiplying and outputting the rotational torque of the engine by gradually multiplying the rotational torque of the rotary electric machine and making the reaction force large.

According to an exemplary aspect of the invention, the rotational torque that has been multiplied by reducing the absolute value of the rotational speed of the rotary electric machine by using the first planetary gear apparatus can be transferred as a reacting force to the output shaft after multiplying the rotational torque of the input shaft (engine). Therefore, even in the case in which a rotary electric machine that has a comparatively small output torque is used, it is possible to transfer a large rotational torque to the output shaft side without reducing the multiplication factor of the engine torque generated when the hybrid drive apparatus functions as the electric torque converter.

What is claimed is:

1. A hybrid drive apparatus, comprising:
an engine;
an input shaft that is connected to the engine;
an output shaft that is connected to wheels;
a rotary electric machine;
a first planetary gear apparatus;

a second planetary gear apparatus, wherein in an electric torque converter mode:
the first planetary gear apparatus reduces an absolute value of a rotational speed of the rotary electric machine and transfers a first resulting rotational speed to the second planetary gear apparatus, and
the second planetary gear apparatus combines the first resulting rotational speed and a rotation of the input shaft, reduces an absolute value of a rotational speed of the input shaft, and transmits a second resulting rotational speed to the output shaft; and
a first clutch that selectively transfers a rotation of the rotary electric machine to a rotating element in the second planetary gear apparatus to which the rotation of the input shaft is transferred, wherein
while the first clutch is engaged, a parallel mode is established in which the input shaft and the rotary electric machine are directly linked.

2. The hybrid drive apparatus according to claim 1, structured so as to enable synchronous switching, in which, when switching modes from the electric torque converter mode to the parallel mode, engagement of the first clutch is carried out while rotational speeds of an input-side rotating member and an output-side rotating member of the first clutch are the same.

3. The hybrid drive apparatus according to claim 2, wherein the parallel mode has a plurality of shift speeds.

4. The hybrid drive apparatus according to claim 3, wherein the parallel mode further comprises an acceleration speed, in which the absolute value of the rotational speed of the input shaft is increased and the second resulting rotational speed is transferred to the output shaft, and also the absolute value of the rotational speed of the rotary electric machine is reduced and the first resulting rotational speed is transferred to the output shaft.

5. The hybrid drive apparatus according to claim 1, wherein the parallel mode has a plurality of shift speeds.

6. The hybrid drive apparatus according to claim 5, wherein the parallel mode further comprises an acceleration speed, in which the absolute value of the rotational speed of the input shaft is increased and the second resulting rotational speed is transferred to the output shaft, and also the absolute value of the rotational speed of the rotary electric machine is reduced and the first resulting rotational speed is transferred to the output shaft.

7. The hybrid drive apparatus according to claim 1, comprising:
a second clutch that selectively transfers the rotation of the input shaft to the rotating element of the second planetary gear apparatus; wherein
while the first clutch is engaged and the second clutch is disengaged, the input shaft is separated from the output shaft, and an electric travel mode is established in which the rotation of the rotary electric machine is transferred to the output shaft.

8. The hybrid drive apparatus according to claim 7, wherein the first planetary gear apparatus and the second planetary gear apparatus have a plurality of shift speeds in the electric travel mode.

9. A hybrid drive apparatus, comprising:
an engine;
an input shaft that is connected to the engine;
an output shaft that is connected to wheels;
a rotary electric machine;
a first planetary gear apparatus; and
a second planetary gear apparatus, wherein:
the first planetary gear apparatus and the second planetary gear apparatus each comprise at least three rotating elements, which are, in order of rotational speed, a first rotating element, a second rotating element, and a third rotating element;
in the first planetary gear apparatus, the first rotating element is connected to the rotary electric machine, the second rotating element is selectively held stationary on a non-rotating member, and in this state, a gear ratio is set such that an absolute value of a rotational speed of the third rotating element is reduced with respect to an absolute value of a rotational speed of the first rotating element; and
in the second planetary gear apparatus, the first rotating element is connected to the input shaft, the second rotating element is connected to the output shaft, and the third rotating element is connected to the third rotating element of the first planetary gear apparatus.

10. The hybrid drive apparatus according to claim 9, comprising a first clutch that selectively connects the first rotating element of the first planetary gear apparatus and the first rotating element of the second planetary gear apparatus.

11. The hybrid drive apparatus according to claim 9, comprising a second clutch that selectively connects the first rotating element of the second planetary gear apparatus and the input shaft.

12. The hybrid drive apparatus according to claim 9, comprising a third clutch that selectively connects the second rotating element of the first planetary gear apparatus and the input shaft.

13. The hybrid drive apparatus according to claim 9, comprising a first brake that selectively holds the second rotating element of the first planetary gear apparatus stationary on the non-rotating member.

14. The hybrid drive apparatus according to claim 9, comprising a second brake that selectively holds the third rotating element of the first planetary gear apparatus and the third rotating element of the second planetary gear apparatus, which are connected together, stationary on the non-rotating member.

15. The hybrid drive apparatus according to claim 9, wherein:
the second planetary gear apparatus comprises, in order of rotational speed, an intermediate rotating element between the second rotating element and the third rotating element; and
the hybrid drive apparatus further comprising:
a third brake that selectively holds the intermediate element of the second planetary gear apparatus stationary on the non-rotating member.

16. The hybrid drive apparatus according to claim 9, wherein:
the second planetary gear apparatus comprises, in order of rotational speed, an intermediate rotating element between the second rotating element and the third rotating element; and
the hybrid drive apparatus further comprising:
a fourth clutch that selectively connects the intermediate rotating element of the second planetary gear apparatus to the input shaft.

17. A hybrid drive apparatus, comprising:
an engine;
an input shaft that is connected to the engine;
an output shaft that is connected to wheels;
a rotary electric machine;
a first planetary gear apparatus; and
a second planetary gear apparatus, wherein:

the first planetary gear apparatus and the second planetary gear apparatus each comprise at least three rotating elements, which are, in order of rotational speed, a first rotating member, a second rotating element, and a third rotating element;

in the first planetary gear apparatus, the first rotating element is connected to the rotary electric machine, and the third rotating element is selectively held stationary on a non-rotating member; and in the second planetary gear apparatus, the first rotating element is connected to the input shaft, the second rotating element is connected to the output shaft, and the third rotating element is connected to the second rotating element of the first planetary gear apparatus.

18. The hybrid drive apparatus according to claim 17, further comprising a first clutch that selectively connects the first rotating element of the first planetary gear apparatus and the first rotating element of the second planetary gear apparatus.

19. The hybrid drive apparatus according to claim 17, further comprising a second clutch that selectively connects the first rotating element of the second planetary gear apparatus and the input shaft.

20. The hybrid drive apparatus according to claim 17, further comprising a first brake that selectively holds the third rotating element of the first planetary gear apparatus stationary on the non-rotating member.

21. The hybrid drive apparatus according to claim 17, further comprising a second brake that selectively holds the second rotating element of the first planetary gear apparatus and the third rotating element of the second planetary gear apparatus, which are connected together, stationary on the non-rotating member.

22. The hybrid drive apparatus according to claim 17, further comprising a third clutch that selectively connects the second rotating element of the first planetary gear apparatus and the third rotating element of the second planetary gear apparatus, which are connected together, to the input shaft.

23. The hybrid drive apparatus according to claim 17, wherein:

the second planetary gear apparatus further comprises, in order of rotational speed, an intermediate rotating element between the second rotating element and the third rotating element; and the hybrid drive apparatus further comprising:

a third clutch that selectively connects the intermediate rotating element of the second planetary gear apparatus to the input shaft.

24. The hybrid drive apparatus according to claim 17, wherein:

the second planetary gear apparatus comprises, in order of rotational speed, an intermediate rotating element between the second rotating element and the third rotating element; and the hybrid drive apparatus further comprising:

a third brake that selectively holds the intermediate rotating element of the second planetary gear apparatus stationary on the non-rotating member.

\* \* \* \* \*